US010685337B2

(12) United States Patent
Dunn et al.

(10) Patent No.: US 10,685,337 B2
(45) Date of Patent: Jun. 16, 2020

(54) ELECTRONIC PAYMENT CLEARING AND CHECK IMAGE EXCHANGE SYSTEMS AND METHODS

(71) Applicant: THE CLEARING HOUSE PAYMENTS COMPANY L.L.C., New York, NY (US)

(72) Inventors: John P. Dunn, East Islip, NY (US); Stephen Ledford, Alpharetta, GA (US); Steve H. Jackson, Hackensack, NJ (US); Albert G. Wood, Kings Park, NY (US)

(73) Assignee: THE CLEARING HOUSE PAYMENTS COMPANY L.L.C., New York, NY (US)

(*) Notice: Subject to any disclaimer, the term of this patent is extended or adjusted under 35 U.S.C. 154(b) by 0 days.

(21) Appl. No.: 15/711,524

(22) Filed: Sep. 21, 2017

(65) Prior Publication Data

US 2018/0012201 A1 Jan. 11, 2018

Related U.S. Application Data

(62) Division of application No. 14/229,326, filed on Mar. 28, 2014, now Pat. No. 9,799,011, which is a division of application No. 10/768,821, filed on Jan. 30, 2004, now Pat. No. 8,725,607.

(51) Int. Cl.
*G06Q 20/04* (2012.01)
*G06Q 20/02* (2012.01)
*G06Q 20/10* (2012.01)

(52) U.S. Cl.
CPC ........... *G06Q 20/042* (2013.01); *G06Q 20/02* (2013.01); *G06Q 20/04* (2013.01); *G06Q 20/0425* (2013.01); *G06Q 20/10* (2013.01)

(58) Field of Classification Search
CPC ...................................................... G06Q 40/00
(Continued)

(56) References Cited

U.S. PATENT DOCUMENTS 3,852,571 A 12/1974 Hal et al.
4,201,978 A 5/1980 Nally .................... 340/146.3 C
(Continued)

FOREIGN PATENT DOCUMENTS

CA 2131667 6/1995
EP 0 029 733 A2 6/1981
(Continued)

OTHER PUBLICATIONS

W. Morton, "E-Commerce (A Special Report): A Consumer's Guide—Payments—Check It Out: The Web is suddenly crowded with online-payment services; Here's how they compare," Wall Street Journal (Eastern Edition), New York, NY, Dec. 10, 2001, p. R.13.

(Continued)

*Primary Examiner* — Kirsten S Apple
(74) *Attorney, Agent, or Firm* — Merchant & Gould P.C.

(57) ABSTRACT

A system and corresponding method are provided. The system includes a plurality of first entities (such as banks), each first entity communicatively connected to at least one distributed traffic agent (DTA), a second entity (such as a central facility) communicatively connected to a DTA, and a communication network communicatively connecting the DTAs. A payload containing a data file (such as electronic check presentment data, electronic payment data, or any other data type) is communicated from one first entity to another through their respective DTAs via the communication network. In addition, a transmittal containing control information corresponding to the payload is communicated from the one first entity to the second entity through their respective DTAs via the communication network.

20 Claims, 19 Drawing Sheets

(58) Field of Classification Search
USPC ........................................................ 705/35
See application file for complete search history.

(56) References Cited

U.S. PATENT DOCUMENTS 4,205,780 A 6/1980 Burns et al. .................. 235/454
4,264,808 A 4/1981 Owens et al. ................ 235/379
4,268,715 A 5/1981 Atalla ............................ 178/22
4,270,042 A 5/1981 Case ............................ 235/379
4,321,672 A 3/1982 Braun et al. .................. 364/408
4,326,258 A 4/1982 de la Guardia ............... 364/515
4,404,649 A 9/1983 Nunley et al. ................ 364/900
4,417,136 A 11/1983 Rushby et al. ............... 235/379
4,457,015 A 6/1984 Nally et al. ..................... 382/45
4,491,725 A 1/1985 Pritchard ...................... 235/375
4,500,750 A 2/1985 Elander et al. ................. 380/26
4,523,330 A 6/1985 Cain ................................ 382/7
4,555,617 A 11/1985 Brooks et al. ................ 235/379
4,578,530 A 3/1986 Zeidler ........................... 380/26
4,602,936 A 7/1986 Topfl et al.
4,617,457 A 10/1986 Granzow et al.
4,652,990 A 3/1987 Pailen et al. .................. 364/200
4,672,377 A 6/1987 Murphy et al.
4,673,802 A 6/1987 Ohmae et al.
4,675,815 A 6/1987 Kuroki et al. .................. 379/37
4,680,803 A 7/1987 Dilella .............................. 382/9
4,694,147 A 9/1987 Amemiya et al. ............ 235/379
4,723,283 A 2/1988 Nagasawa et al. ............ 380/20
4,745,267 A 5/1988 Davis et al. .................. 235/379
4,747,058 A 5/1988 Ho ............................... 364/478
4,748,557 A 5/1988 Tamada et al. ............... 364/200
4,750,201 A 6/1988 Hodgson et al. ............. 379/144
4,755,940 A 7/1988 Brachtl et al. ................ 364/408
4,757,543 A 7/1988 Tamada et al. ................. 380/51
4,758,530 A 7/1988 Schubert
4,771,460 A 9/1988 Tamada et al. ................. 380/24
4,799,156 A 1/1989 Shavit et al. ................. 364/401
4,810,866 A 3/1989 Lord, Jr.
4,823,264 A 4/1989 Deming ........................ 364/408
4,843,220 A 6/1989 Haun ............................ 235/380
4,858,121 A 8/1989 Barber et al. ................. 364/406
4,882,779 A 11/1989 Rahtgen .......................... 380/24
4,888,812 A 12/1989 Dinan et al. ...................... 382/7
4,910,774 A 3/1990 Barakat ........................... 380/23
4,912,762 A 3/1990 Lee et al. ........................ 380/24
4,922,503 A 5/1990 Leone ........................ 370/85.13
4,926,325 A 5/1990 Benton et al. ................ 364/408
4,941,125 A 7/1990 Boyne ........................... 364/900
4,960,981 A 10/1990 Benton et al. ................ 235/379
4,961,142 A 10/1990 Elliott et al. .................. 364/408
4,962,531 A 10/1990 Sipman et al. ................. 380/24
4,977,595 A 12/1990 Ohta et al. ...................... 380/24
4,985,921 A 1/1991 Schwartz ........................ 380/24
5,003,594 A 3/1991 Shinagawa ..................... 380/24
5,014,311 A 5/1991 Schrenk .......................... 380/23
5,016,277 A 5/1991 Hamilton ........................ 380/49
5,053,607 A 10/1991 Carlson et al. ............... 235/379
5,054,096 A 10/1991 Belzer ............................ 382/41
5,081,680 A 1/1992 Bennett ........................... 380/50
5,091,968 A 2/1992 Higgins et al. ................. 382/30
5,093,787 A 3/1992 Simmons ...................... 364/406
5,095,480 A 3/1992 Fenner ......................... 370/94.1
5,111,395 A 5/1992 Smith et al. .................. 364/408
5,122,950 A 6/1992 Benton et al. ................ 364/408
5,123,047 A 6/1992 Rosenow ........................ 380/50
5,144,115 A 9/1992 Yoshida ........................ 235/379
5,159,548 A 10/1992 Caslavka ...................... 364/408
5,159,592 A 10/1992 Perkins ........................ 370/85.7
5,163,098 A 11/1992 Dahbura ......................... 380/24
5,168,444 A 12/1992 Cukor et al. .................. 364/401
5,170,466 A 12/1992 Rogan et al. ................. 395/145
5,173,594 A 12/1992 McClure ....................... 235/380
5,175,682 A 12/1992 Higashiyama et al. ....... 364/408
5,175,766 A 12/1992 Hamilton ........................ 380/49
5,185,798 A 2/1993 Hamada et al. ................ 380/23
5,187,750 A 2/1993 Behera ............................ 382/7
5,195,133 A 3/1993 Kapp et al. ....................... 380/9
5,198,975 A * 3/1993 Baker .................... G06K 17/00
235/379
5,200,993 A 4/1993 Wheeler et al. ................ 379/96
5,204,811 A 4/1993 Bednar et al. .................. 6/406
5,214,697 A 5/1993 Saito ................................ 380/4
5,220,501 A 6/1993 Lawlor et al. ................ 364/408
5,231,569 A 7/1993 Myatt et al.
5,233,547 A 8/1993 Kapp et al.
5,233,656 A 8/1993 Langrand et al. .............. 380/23
5,235,433 A 8/1993 Clarkson et al. ............. 358/434
5,237,158 A 8/1993 Kern et al. .................... 235/379
5,237,159 A * 8/1993 Stephens ................ G06Q 20/02
235/379
5,237,620 A 8/1993 Deaton et al.
5,241,600 A 8/1993 Hillis ............................. 380/23
5,256,863 A 10/1993 Ferguson et al. ............. 235/383
5,259,025 A 11/1993 Monroe et al. ................. 380/23
5,262,942 A 11/1993 Earle ............................ 364/408
5,265,007 A 11/1993 Barnhard, Jr. et al. ....... 364/408
5,274,567 A 12/1993 Kallin et al. ................. 364/478
5,283,829 A 2/1994 Anderson ....................... 380/24
5,287,497 A 2/1994 Behera .......................... 395/600
5,317,637 A 5/1994 Pichlmaier et al. ............ 380/25
5,321,238 A 6/1994 Kamata et al. ............... 235/379
5,321,751 A 6/1994 Ray et al. ....................... 380/23
5,321,816 A 6/1994 Rogan et al. ................. 395/200
5,326,959 A 7/1994 Perazza ......................... 235/379
5,329,589 A 7/1994 Fraser et al. .................... 379/91
5,337,358 A 8/1994 Axelrod et al. ................ 380/23
5,341,428 A 8/1994 Schatz ........................... 380/23
5,343,529 A 8/1994 Goldfine et al. ................ 380/23
5,345,090 A 9/1994 Hludzinski .................. 250/566
5,373,550 A 12/1994 Campbell et al. ............ 379/100
5,383,113 A 1/1995 Kight et al. .................. 364/401
5,396,558 A 3/1995 Ishiguro et al. ................ 380/25
5,408,531 A 4/1995 Nakajima ......................... 380/3
5,412,190 A * 5/1995 Josephson ............. G06Q 20/02
235/379
5,426,281 A 6/1995 Abecassis
5,434,928 A 7/1995 Wagner et al. ............... 382/187
5,436,970 A 7/1995 Ray et al. ....................... 380/23
5,440,634 A 8/1995 Jones et al. ..................... 380/24
5,444,794 A 8/1995 Uhland, Sr. ................... 382/137
5,446,796 A 8/1995 Ishiguro et al. ................ 380/24
5,453,601 A 9/1995 Rosen
5,454,575 A 10/1995 Del Buono ..................... 280/35
5,455,407 A 10/1995 Rosen
5,457,747 A 10/1995 Drexler et al. ................. 380/24
5,465,206 A 11/1995 Hilt et al. ..................... 364/406
5,473,143 A 12/1995 Vak et al. ..................... 235/380
5,479,510 A 12/1995 Olsen et al. .................... 380/24
5,484,988 A 1/1996 Hills et al. ................... 235/379
5,502,765 A 3/1996 Ishiguro et al. ................ 380/24
5,506,691 A 4/1996 Bednar et al. ................ 358/402
5,523,167 A 6/1996 Hunt et al.
5,524,073 A 6/1996 Stambler ......................... 380/24
5,528,705 A 6/1996 Reasoner, Jr. et al. ....... 382/306
5,532,464 A * 7/1996 Josephson ............. G06Q 20/02
235/379
5,539,822 A 7/1996 Lett ................................ 380/20
5,539,825 A 7/1996 Akiyama et al. ............... 380/24
5,544,043 A 8/1996 Miki et al. .................... 364/406
5,544,255 A 8/1996 Smithies et al. .............. 382/119
5,557,518 A 9/1996 Rosen .......................... 364/408
5,577,121 A 11/1996 Davis et al. .................... 380/24
5,590,038 A 12/1996 Pitroda ........................ 395/241
5,594,226 A 1/1997 Steger
5,596,642 A 1/1997 Davis et al. .................... 380/24
5,602,933 A 2/1997 Blackwell et al. ........... 382/116
5,602,936 A 2/1997 Green et al. .................. 382/140
5,604,640 A 2/1997 Zipf et al. ..................... 359/803
5,604,802 A 2/1997 Holloway ....................... 380/24
5,608,800 A 3/1997 Hoffmann et al. ............. 380/25
5,613,001 A 3/1997 Bakhoum ......................... 380/4
5,615,269 A 3/1997 Miceli ............................ 380/49
5,621,796 A 4/1997 Davis et al. .................... 380/24
5,621,797 A 4/1997 Rosen ............................ 380/24

(56) References Cited

U.S. PATENT DOCUMENTS

| | | | | |
|---|---|---|---|---|
| 5,623,547 | A | 4/1997 | Jones et al. | 380/24 |
| 5,625,694 | A | 4/1997 | Lee et al. | 380/23 |
| 5,629,981 | A | 5/1997 | Nerlikar | 380/25 |
| 5,633,930 | A | 5/1997 | Davis et al. | 380/24 |
| 5,642,419 | A | 6/1997 | Rosen | 380/23 |
| 5,649,117 | A | 6/1997 | Landry | 395/240 |
| 5,647,017 | A | 7/1997 | Smithies et al. | 382/119 |
| 5,649,116 | A | 7/1997 | McCoy et al. | 395/238 |
| 5,652,786 | A | 7/1997 | Rogers | 379/91.01 |
| 5,657,389 | A | 8/1997 | Houvener | 380/23 |
| 5,657,396 | A | 8/1997 | Rudolph et al. | 382/190 |
| 5,659,616 | A | 8/1997 | Sudia | 380/23 |
| 5,668,897 | A | 9/1997 | Stolfo | 382/283 |
| 5,673,333 | A | 9/1997 | Johnston | 382/137 |
| 5,677,955 | A | 10/1997 | Doggett et al. | 380/24 |
| 5,682,549 | A | 10/1997 | Tanaka et al. | 395/828 |
| 5,684,965 | A | 11/1997 | Pickering | 395/234 |
| 5,691,524 | A * | 11/1997 | Josephson | G06Q 20/02 235/375 |
| 5,699,528 | A | 12/1997 | Hogan | 395/240 |
| 5,703,344 | A | 12/1997 | Bezy et al. | |
| 5,708,810 | A | 1/1998 | Kern et al. | 395/712 |
| 5,710,887 | A | 1/1998 | Chelliah et al. | 395/226 |
| 5,715,298 | A | 2/1998 | Rogers | 379/91.01 |
| 5,717,868 | A * | 2/1998 | James | G06Q 20/10 705/35 |
| 5,732,400 | A | 3/1998 | Mandler et al. | 705/26 |
| 5,742,668 | A | 4/1998 | Pepe et al. | 379/58 |
| 5,742,888 | A | 4/1998 | Fuchiwaki et al. | 399/308 |
| 5,751,842 | A | 5/1998 | Riach et al. | 382/137 |
| 5,754,673 | A | 5/1998 | Brooks et al. | 382/112 |
| 5,760,916 | A | 6/1998 | Dellert et al. | 358/408 |
| 5,738,808 | A | 7/1998 | Josephson | 235/379 |
| 5,778,178 | A | 7/1998 | Arunachalam | 395/200.33 |
| 5,781,654 | A | 7/1998 | Carney | 382/137 |
| 5,783,808 | A * | 7/1998 | Josephson | G06Q 20/02 235/379 |
| 5,784,503 | A | 7/1998 | Bleecker, III et al. | 382/306 |
| 5,784,610 | A | 7/1998 | Copeland, III et al. | 395/615 |
| 5,787,403 | A | 7/1998 | Randle | 705/43 |
| 5,790,260 | A | 8/1998 | Myers | 358/296 |
| 5,790,790 | A | 8/1998 | Smith et al. | 395/200.36 |
| 5,793,869 | A | 8/1998 | Claflin, Jr. | 380/49 |
| 5,832,460 | A | 11/1998 | Bednar et al. | 705/27 |
| 5,832,463 | A | 11/1998 | Funk | 705/35 |
| 5,832,464 | A | 11/1998 | Houverner et al. | 705/45 |
| 5,848,400 | A | 12/1998 | Chang | 705/35 |
| 5,857,034 | A | 1/1999 | Tsuchiya et al. | 382/175 |
| 5,870,456 | A | 2/1999 | Rogers | 379/91.01 |
| 5,870,724 | A | 2/1999 | Lawlor et al. | 705/42 |
| 5,870,725 | A | 2/1999 | Bellinger et al. | 705/45 |
| 5,873,072 | A | 2/1999 | Kight et al. | 705/40 |
| 5,884,271 | A | 3/1999 | Pitroda | 705/1 |
| 5,893,080 | A | 4/1999 | McGurl et al. | 705/40 |
| 5,903,874 | A | 5/1999 | Leonard et al. | 705/14 |
| 5,903,880 | A | 5/1999 | Biffar | 705/39 |
| 5,903,881 | A | 5/1999 | Schrader et al. | 705/42 |
| 5,910,988 | A | 6/1999 | Ballard | 380/24 |
| 5,915,023 | A | 6/1999 | Bernstein | 380/24 |
| 5,917,965 | A * | 6/1999 | Cahill | G06K 9/033 382/305 |
| 5,920,847 | A | 7/1999 | Kolling et al. | 705/40 |
| 5,925,865 | A | 7/1999 | Steger | |
| 5,926,288 | A | 7/1999 | Dellert et al. | 358/487 |
| 5,930,778 | A | 7/1999 | Geer | 705/45 |
| 5,937,396 | A | 8/1999 | Konya | 705/43 |
| 5,940,844 | A | 8/1999 | Cahill et al. | |
| 5,956,700 | A | 9/1999 | Landry | 705/40 |
| 5,963,647 | A | 10/1999 | Downing et al. | 380/24 |
| 5,963,925 | A | 10/1999 | Kolling et al. | 705/40 |
| 5,973,731 | A | 10/1999 | Schwab | 348/161 |
| 5,978,780 | A | 11/1999 | Watson | 705/40 |
| 5,987,500 | A | 11/1999 | Arunachalam | 709/203 |
| 5,999,625 | A | 12/1999 | Bellare et al. | 380/24 |
| 6,006,208 | A | 12/1999 | Forst et al. | |
| 6,021,202 | A | 2/2000 | Anderson et al. | 380/25 |
| 6,029,150 | A | 2/2000 | Kravitz | 705/39 |
| 6,029,151 | A | 2/2000 | Nikander | 705/39 |
| 6,032,133 | A | 2/2000 | Hilt et al. | 705/40 |
| 6,032,137 | A | 2/2000 | Ballard | 705/75 |
| 6,036,344 | A | 3/2000 | Goldenberg | |
| 6,047,051 | A | 4/2000 | Ginzboorg et al. | |
| 6,049,785 | A | 4/2000 | Gifford | |
| 6,049,786 | A | 4/2000 | Smorodinsky | 705/40 |
| 6,055,567 | A | 4/2000 | Ganesan et al. | 709/219 |
| 6,058,382 | A | 5/2000 | Kasai et al. | 705/41 |
| 6,069,896 | A | 5/2000 | Borgstahl et al. | 370/401 |
| 6,070,150 | A | 5/2000 | Remington et al. | 705/34 |
| 6,076,068 | A | 6/2000 | DeLapa et al. | 705/14 |
| 6,076,074 | A | 6/2000 | Cotton et al. | 705/40 |
| 6,108,104 | A | 8/2000 | Tesavis | 358/434 |
| 6,115,509 | A | 9/2000 | Yeskel | 382/309 |
| 6,138,107 | A | 10/2000 | Elgamal | 705/39 |
| 6,145,738 | A | 11/2000 | Stinson et al. | 235/379 |
| 6,173,272 | B1 | 1/2001 | Thomas et al. | 705/42 |
| 6,181,837 | B1 | 1/2001 | Cahill et al. | |
| 6,189,785 | B1 | 2/2001 | Lowery | |
| 6,192,142 | B1 | 2/2001 | Pare, Jr. et al. | 382/115 |
| 6,192,407 | B1 | 2/2001 | Smith et al. | 709/229 |
| 6,199,077 | B1 | 3/2001 | Inala et al. | 707/501 |
| 6,202,054 | B1 | 3/2001 | Lawlor et al. | 705/42 |
| 6,209,095 | B1 | 3/2001 | Anderson et al. | 713/176 |
| 6,212,556 | B1 | 4/2001 | Arunachalam | 709/219 |
| 6,223,168 | B1 | 4/2001 | McGurl et al. | 705/40 |
| 6,230,148 | B1 | 5/2001 | Pare, Jr. et al. | 705/40 |
| 6,243,689 | B1 | 6/2001 | Norton | |
| 6,260,024 | B1 | 7/2001 | Shkedy | 705/37 |
| 6,269,348 | B1 | 7/2001 | Pare, Jr. et al. | 705/39 |
| 6,278,993 | B1 | 8/2001 | Kumar et al. | 707/3 |
| 6,282,523 | B1 | 8/2001 | Tedesco et al. | |
| 6,283,366 | B1 | 9/2001 | Hills et al. | |
| 6,285,991 | B1 | 9/2001 | Powar | 705/76 |
| 6,289,322 | B1 | 9/2001 | Kitchen et al. | 705/40 |
| 6,292,789 | B1 | 9/2001 | Schutzer | 705/40 |
| 6,301,379 | B1 * | 10/2001 | Thompson | G06Q 20/042 235/379 |
| 6,304,857 | B1 | 10/2001 | Heindel et al. | 705/34 |
| 6,317,745 | B1 | 11/2001 | Thomas et al. | 707/100 |
| 6,317,783 | B1 | 11/2001 | Freishtat et al. | 709/218 |
| 6,324,526 | B1 | 11/2001 | D'Agostino | 705/44 |
| 6,327,577 | B1 | 12/2001 | Garrison et al. | 705/40 |
| 6,330,544 | B1 | 12/2001 | Walker et al. | 705/14 |
| 6,334,116 | B1 | 12/2001 | Ganesan et al. | 705/34 |
| 6,338,050 | B1 | 1/2002 | Conklin et al. | 705/80 |
| 6,351,553 | B1 | 2/2002 | Hayosh | |
| 6,353,811 | B1 | 3/2002 | Weissman | 705/40 |
| 6,363,362 | B1 | 3/2002 | Burfield et al. | 705/40 |
| 6,385,595 | B1 | 5/2002 | Kolling et al. | 705/40 |
| 6,385,652 | B1 | 5/2002 | Brown et al. | 709/227 |
| 6,405,245 | B1 | 6/2002 | Burson et al. | 709/217 |
| 6,408,284 | B1 | 6/2002 | Hilt et al. | 705/40 |
| 6,411,939 | B1 | 6/2002 | Parsons | |
| 6,412,073 | B1 | 6/2002 | Rangan | 713/202 |
| 6,438,527 | B1 | 8/2002 | Powar | 705/40 |
| 6,442,590 | B1 | 8/2002 | Inala et al. | 709/204 |
| 6,477,565 | B1 | 11/2002 | Daswani et al. | 709/217 |
| 6,493,685 | B1 | 12/2002 | Ensel et al. | 705/40 |
| 6,510,451 | B2 | 1/2003 | Wu et al. | 709/203 |
| 6,517,587 | B2 | 2/2003 | Satyavolu et al. | 715/501.1 |
| 6,553,346 | B1 | 4/2003 | Walker et al. | 705/1 |
| 6,567,850 | B1 | 5/2003 | Freishtat et al. | 709/224 |
| 6,574,377 | B1 | 6/2003 | Cahill et al. | |
| 6,578,015 | B1 | 6/2003 | Haseltine et al. | 705/34 |
| 6,594,647 | B1 | 7/2003 | Randle et al. | |
| 6,594,766 | B2 | 7/2003 | Rangan et al. | 713/202 |
| 6,633,910 | B1 | 10/2003 | Rajan et al. | 709/224 |
| 6,647,376 | B1 | 11/2003 | Farrar et al. | 705/45 |
| 6,678,664 | B1 | 1/2004 | Ganesan | 435/6 |
| 6,694,300 | B1 | 2/2004 | Walker et al. | 705/14 |
| 6,725,425 | B1 | 4/2004 | Rajan et al. | 715/513 |
| 6,738,804 | B1 | 5/2004 | Lo | 709/219 |
| 6,748,367 | B1 | 6/2004 | Lee | 705/66 |
| 6,802,042 | B2 | 10/2004 | Rangan et al. | 715/501.1 |
| 6,826,545 | B2 | 11/2004 | Kawashima et al. | 705/40 |

(56) References Cited

U.S. PATENT DOCUMENTS

| | | | | |
|---|---|---|---|---|
| 6,842,782 | B1 | 1/2005 | Malik et al. | 709/224 |
| 6,856,974 | B1 | 2/2005 | Ganesan et al. | 705/40 |
| 6,856,975 | B1 | 2/2005 | Inglis | 705/51 |
| 6,859,212 | B2 | 2/2005 | Kumar et al. | 345/744 |
| 6,863,214 | B2 | 3/2005 | Garner, IV et al. | |
| 6,865,680 | B1 | 3/2005 | Wu et al. | 713/201 |
| 6,871,220 | B1 | 3/2005 | Rajan et al. | 709/218 |
| 6,910,023 | B1 | 6/2005 | Schibi | 705/64 |
| 6,932,268 | B1 | 8/2005 | McCoy et al. | 235/380 |
| 6,934,691 | B1 | 8/2005 | Simpson et al. | 705/34 |
| 6,945,453 | B1 | 9/2005 | Schwarz | 235/375 |
| 6,948,063 | B1 | 9/2005 | Ganesan et al. | 713/168 |
| 6,968,319 | B1 | 11/2005 | Remington et al. | 705/40 |
| 6,980,973 | B1 | 12/2005 | Karpenko | |
| 6,996,542 | B1 | 2/2006 | Landry | 705/40 |
| 7,004,382 | B2 | 2/2006 | Sandru | 235/379 |
| 7,013,310 | B2 | 3/2006 | Messing et al. | 707/104.1 |
| 7,028,008 | B2 | 4/2006 | Powar | 705/40 |
| 7,028,886 | B1 | 4/2006 | Maloney | 235/375 |
| 7,039,656 | B1 | 5/2006 | Tsai et al. | 707/201 |
| 7,076,458 | B2 | 7/2006 | Lawlor et al. | 705/35 |
| 7,085,997 | B1 | 8/2006 | Wu et al. | 715/501.1 |
| 7,089,208 | B1 | 8/2006 | Levchin et al. | 705/39 |
| 7,099,845 | B2 * | 8/2006 | Higgins | G06Q 20/02 705/35 |
| 7,107,244 | B2 | 9/2006 | Kight et al. | 705/40 |
| 7,110,969 | B1 | 9/2006 | Bennett et al. | |
| 7,110,993 | B2 | 9/2006 | Soulanille et al. | 707/3 |
| 7,120,602 | B2 | 10/2006 | Kitchen et al. | 705/40 |
| 7,146,338 | B2 | 12/2006 | Kight et al. | 705/42 |
| 7,155,508 | B2 | 12/2006 | Sankuratripati et al. | 709/224 |
| 7,158,955 | B2 | 1/2007 | Diveley et al. | 705/74 |
| 7,165,052 | B2 | 1/2007 | Diveley et al. | 705/74 |
| 7,165,723 | B2 * | 1/2007 | McGlamery | G06K 9/03 235/379 |
| 7,167,711 | B1 | 1/2007 | Dennis | 455/456.1 |
| 7,175,074 | B2 | 2/2007 | Mejias et al. | 235/379 |
| 7,177,846 | B2 | 2/2007 | Moenickheim et al. | 705/64 |
| 7,178,096 | B2 | 2/2007 | Rangan et al. | 715/500 |
| 7,181,430 | B1 | 2/2007 | Buchanan et al. | 705/45 |
| 7,191,150 | B1 | 3/2007 | Shao et al. | 705/38 |
| 7,191,151 | B1 | 3/2007 | Nosek | 705/39 |
| 7,200,551 | B1 | 4/2007 | Senez | 704/40 |
| 7,200,804 | B1 | 4/2007 | Khavari et al. | 715/513 |
| 7,203,845 | B2 | 4/2007 | Sokolic et al. | 713/194 |
| 7,213,003 | B1 | 5/2007 | Kight et al. | 705/40 |
| 7,225,156 | B2 | 5/2007 | Fisher et al. | 705/50 |
| 7,225,464 | B2 | 5/2007 | Satyavolu et al. | 726/10 |
| 7,236,950 | B2 | 6/2007 | Savage et al. | 705/34 |
| 7,240,031 | B1 | 7/2007 | Kight et al. | 705/40 |
| 7,249,080 | B1 | 7/2007 | Hoffman et al. | 705/36 |
| 7,249,094 | B2 | 7/2007 | Levchin et al. | 705/39 |
| 7,251,656 | B2 | 7/2007 | Keown et al. | 707/10 |
| 7,263,548 | B2 | 8/2007 | Daswani et al. | 709/217 |
| 7,296,004 | B1 | 11/2007 | Garrison et al. | 705/404 |
| 7,302,408 | B2 | 11/2007 | Engdahl et al. | 705/30 |
| 7,302,411 | B2 | 11/2007 | Ganesan et al. | 705/35 |
| 7,308,426 | B1 | 12/2007 | Pitroda | 705/35 |
| 7,313,813 | B2 | 12/2007 | Rangan et al. | 726/5 |
| 7,321,874 | B2 | 1/2008 | Dilip et al. | 705/37 |
| 7,321,875 | B2 | 1/2008 | Dilip et al. | 705/37 |
| 7,330,831 | B2 | 2/2008 | Biondi et al. | 705/36 |
| 7,334,128 | B2 | 2/2008 | Ganesan et al. | 713/168 |
| 7,356,502 | B1 | 4/2008 | LaBadie et al. | |
| 7,366,696 | B1 | 4/2008 | Ganesan et al. | 705/40 |
| 7,366,697 | B2 | 4/2008 | Kitchen et al. | 705/40 |
| 7,370,014 | B1 | 5/2008 | Vasavada et al. | 705/40 |
| 7,383,223 | B1 | 6/2008 | Dilip et al. | 705/39 |
| 7,383,226 | B2 | 6/2008 | Kight et al. | 705/40 |
| 7,392,223 | B1 | 6/2008 | Ganesan et al. | 705/40 |
| 7,395,319 | B2 | 7/2008 | Harris et al. | 709/219 |
| 7,415,610 | B2 | 8/2008 | Ganesan et al. | 713/168 |
| 7,424,520 | B2 | 9/2008 | Dawsani et al. | 709/217 |
| 7,426,638 | B2 | 9/2008 | Ganesan et al. | 713/168 |
| 7,447,347 | B2 * | 11/2008 | Weber | G06K 9/186 382/139 |
| 7,474,779 | B2 | 1/2009 | Duncan | |
| 7,490,063 | B2 | 2/2009 | Garrison et al. | 705/40 |
| 7,502,749 | B2 | 3/2009 | Ganesan et al. | 705/26 |
| 7,505,937 | B2 | 3/2009 | Dilip et al. | 705/37 |
| 7,526,448 | B2 | 4/2009 | Zielke et al. | 705/40 |
| 7,533,058 | B2 | 5/2009 | Kulakowski | 705/40 |
| 7,536,340 | B2 | 5/2009 | Dheer et al. | 705/37 |
| 7,558,795 | B2 | 7/2009 | Malik et al. | 707/10 |
| 7,606,752 | B2 | 10/2009 | Hazlehurst et al. | 705/35 |
| 7,606,787 | B2 | 10/2009 | Keown et al. | 707/1 |
| 7,610,245 | B2 | 10/2009 | Dent et al. | 705/40 |
| 7,636,686 | B2 | 12/2009 | Pierdinock et al. | 705/37 |
| 7,636,688 | B2 | 12/2009 | Kitchen et al. | 705/39 |
| 7,640,197 | B1 | 12/2009 | Gentry et al. | 705/35 |
| 7,644,023 | B2 | 1/2010 | Kumar et al. | 705/36 |
| 7,644,036 | B2 | 1/2010 | McCoy et al. | 705/39 |
| 7,653,598 | B1 | 1/2010 | Hamilton et al. | 705/40 |
| 7,657,484 | B2 | 2/2010 | Ganesan et al. | 705/40 |
| 7,660,766 | B1 | 2/2010 | Lawson et al. | 705/40 |
| 7,672,879 | B1 | 3/2010 | Kumar et al. | 705/30 |
| 7,685,525 | B2 | 3/2010 | Kumar et al. | 715/744 |
| 7,693,790 | B2 | 4/2010 | Lawlor et al. | 705/40 |
| 7,702,583 | B1 | 4/2010 | Hamilton et al. | 705/40 |
| 7,702,585 | B2 | 4/2010 | Lyda et al. | 705/40 |
| 7,711,626 | B2 | 5/2010 | Nanjundamoorthy et al. | 705/36 |
| 7,711,690 | B1 | 5/2010 | Garrison et al. | 707/102 |
| 7,725,389 | B1 | 5/2010 | D'Aquisto et al. | 705/39 |
| 7,729,283 | B2 | 6/2010 | Ferguson et al. | 370/254 |
| 7,729,969 | B1 | 6/2010 | Smith, III et al. | 705/36 |
| 7,729,996 | B2 | 6/2010 | Zito | 705/76 |
| 7,734,541 | B2 | 6/2010 | Kumar et al. | 705/39 |
| 7,752,130 | B2 | 7/2010 | Byrd et al. | 705/40 |
| 7,752,535 | B2 | 7/2010 | Satyavolu | 715/205 |
| 7,778,901 | B2 | 8/2010 | Ganesan et al. | 705/35 |
| 7,788,172 | B2 | 8/2010 | Kight et al. | 705/39 |
| 7,792,749 | B2 | 9/2010 | Ganesan | 705/40 |
| 7,886,156 | B2 | 2/2011 | Franchi | |
| 7,979,348 | B2 | 7/2011 | Thomas et al. | 705/39 |
| 8,032,932 | B2 | 10/2011 | Speyer et al. | |
| 8,073,772 | B2 | 12/2011 | Bishop et al. | |
| 8,327,429 | B2 | 12/2012 | Speyer et al. | |
| 8,369,601 | B2 | 2/2013 | Lugg | |
| 8,423,453 | B1 | 4/2013 | Elliott | |
| 8,688,580 | B1 | 4/2014 | Guenther et al. | |
| 8,725,607 | B2 | 5/2014 | Dunn et al. | |
| 8,725,609 | B2 | 5/2014 | Pawelczyk et al. | |
| 9,135,620 | B2 | 9/2015 | Chen et al. | |
| 9,195,984 | B1 | 11/2015 | Spector et al. | |
| 9,264,902 | B1 | 2/2016 | Ward et al. | |
| 9,600,817 | B2 | 3/2017 | Bondesen et al. | |
| 9,693,234 | B2 | 6/2017 | Cook | |
| 9,741,037 | B2 | 8/2017 | Garlick et al. | |
| 9,799,011 | B2 | 10/2017 | Dunn et al. | |
| 10,262,306 | B2 | 4/2019 | Pawelczyk et al. | |
| 10,387,879 | B2 | 8/2019 | Thomas et al. | |
| 2001/0000537 | A1 | 4/2001 | Inala et al. | 707/500 |
| 2001/0016034 | A1 | 8/2001 | Singh et al. | 379/88.17 |
| 2001/0023414 | A1 | 9/2001 | Kumar et al. | 705/35 |
| 2001/0024157 | A1 | 9/2001 | Hansmann et al. | 340/10.41 |
| 2001/0032182 | A1 | 10/2001 | Kumar et al. | 705/40 |
| 2001/0032183 | A1 | 10/2001 | Landry | 705/40 |
| 2001/0051907 | A1 | 12/2001 | Kumar et al. | 705/36 |
| 2002/0002536 | A1 | 1/2002 | Braco | 705/40 |
| 2002/0007323 | A1 | 1/2002 | Tamatsu | |
| 2002/0010612 | A1 | 1/2002 | Smith et al. | 705/8 |
| 2002/0010677 | A1 | 1/2002 | Kitchen et al. | 705/40 |
| 2002/0015480 | A1 | 2/2002 | Daswani et al. | 379/88.17 |
| 2002/0019808 | A1 | 2/2002 | Sharma | 705/40 |
| 2002/0019809 | A1 | 2/2002 | Kitchen et al. | 705/40 |
| 2002/0023108 | A1 | 2/2002 | Daswani et al. | 707/507 |
| 2002/0046167 | A1 | 4/2002 | Kitchen et al. | 705/40 |
| 2002/0046168 | A1 | 4/2002 | Kitchen et al. | 705/40 |
| 2002/0049671 | A1 | 4/2002 | Trende et al. | 705/40 |
| 2002/0049672 | A1 | 4/2002 | Kitchen et al. | 705/40 |
| 2002/0052840 | A1 | 5/2002 | Kitchen et al. | 705/40 |
| 2002/0059139 | A1 | 5/2002 | Evans | 705/40 |

(56) References Cited

U.S. PATENT DOCUMENTS

| | | | | |
|---|---|---|---|---|
| 2002/0059369 | A1 | 5/2002 | Kern et al. | 709/203 |
| 2002/0062282 | A1 | 5/2002 | Kight et al. | 705/40 |
| 2002/0065773 | A1 | 5/2002 | Kight et al. | 705/40 |
| 2002/0069161 | A1 | 6/2002 | Eckert et al. | |
| 2002/0077952 | A1 | 6/2002 | Eckert et al. | |
| 2002/0077961 | A1 | 6/2002 | Eckert et al. | |
| 2002/0077978 | A1 | 6/2002 | O'Leary et al. | 705/40 |
| 2002/0087454 | A1 | 7/2002 | Calo et al. | |
| 2002/0087455 | A1 | 7/2002 | Tsagarakis et al. | |
| 2002/0087461 | A1 | 7/2002 | Ganesan et al. | 705/39 |
| 2002/0087465 | A1 | 7/2002 | Ganesan et al. | 705/39 |
| 2002/0091635 | A1 | 7/2002 | Dilip et al. | 705/39 |
| 2002/0111886 | A1 | 8/2002 | Chenevich et al. | 705/30 |
| 2002/0128964 | A1 | 9/2002 | Baker et al. | 705/39 |
| 2002/0128968 | A1 | 9/2002 | Kitchen et al. | 705/40 |
| 2002/0143655 | A1 | 10/2002 | Elston et al. | |
| 2002/0174048 | A1 | 11/2002 | Dheer et al. | 705/36 |
| 2002/0184144 | A1 | 12/2002 | Byrd et al. | 705/40 |
| 2002/0194137 | A1 | 12/2002 | Park et al. | |
| 2003/0014489 | A1 | 1/2003 | Inala et al. | 709/204 |
| 2003/0018571 | A1 | 1/2003 | Eckert et al. | |
| 2003/0023552 | A1 | 1/2003 | Kight et al. | 705/40 |
| 2003/0037002 | A1* | 2/2003 | Higgins | G06Q 20/02<br>705/45 |
| 2003/0089768 | A1 | 5/2003 | Page | 235/379 |
| 2003/0120774 | A1 | 6/2003 | Satyavolu et al. | 709/224 |
| 2003/0126075 | A1 | 7/2003 | Mascavage, III et al. | 705/39 |
| 2003/0158811 | A1 | 8/2003 | Sanders et al. | 705/39 |
| 2003/0182206 | A1 | 9/2003 | Hendrix et al. | |
| 2003/0187925 | A1 | 10/2003 | Inala et al. | 709/204 |
| 2003/0191701 | A1 | 10/2003 | Haseltine et al. | 705/34 |
| 2003/0191711 | A1 | 10/2003 | Jamison et al. | 705/40 |
| 2003/0191832 | A1 | 10/2003 | Satyavolu et al. | 709/223 |
| 2003/0195844 | A1 | 10/2003 | Hogan | 705/40 |
| 2003/0208421 | A1* | 11/2003 | Vicknair | G06Q 20/042<br>705/35 |
| 2003/0208441 | A1 | 11/2003 | Poplawski et al. | 705/40 |
| 2003/0225705 | A1* | 12/2003 | Park | G06Q 20/382<br>705/64 |
| 2003/0236728 | A1 | 12/2003 | Sunderji et al. | 705/35 |
| 2004/0034594 | A1 | 2/2004 | Thomas et al. | 705/39 |
| 2004/0039701 | A1 | 2/2004 | Nakamura et al. | 705/42 |
| 2004/0059671 | A1 | 3/2004 | Nozaki et al. | 705/39 |
| 2004/0059672 | A1 | 3/2004 | Baig et al. | 705/40 |
| 2004/0059673 | A1 | 3/2004 | Kitchen et al. | 705/40 |
| 2004/0064407 | A1 | 4/2004 | Kight et al. | 705/40 |
| 2004/0064408 | A1 | 4/2004 | Kight et al. | 705/40 |
| 2004/0064409 | A1 | 4/2004 | Kight et al. | 705/40 |
| 2004/0064410 | A1 | 4/2004 | Kight et al. | 705/40 |
| 2004/0071333 | A1 | 4/2004 | Douglas et al. | |
| 2004/0078423 | A1 | 4/2004 | Satyavolu et al. | 709/203 |
| 2004/0078464 | A1 | 4/2004 | Rajan et al. | 709/224 |
| 2004/0083167 | A1 | 4/2004 | Kight et al. | 705/40 |
| 2004/0083171 | A1 | 4/2004 | Kight et al. | 705/40 |
| 2004/0088235 | A1 | 5/2004 | Ziekle et al. | 705/34 |
| 2004/0093305 | A1 | 5/2004 | Kight et al. | 705/40 |
| 2004/0133515 | A1 | 7/2004 | McCoy et al. | 705/40 |
| 2004/0139005 | A1 | 7/2004 | Ganesan | 705/39 |
| 2004/0139009 | A1 | 7/2004 | Kozee et al. | 705/40 |
| 2004/0139010 | A1 | 7/2004 | McMichael et al. | 705/40 |
| 2004/0139011 | A1 | 7/2004 | Kozee et al. | 705/40 |
| 2004/0143552 | A1 | 7/2004 | Weichert et al. | 705/64 |
| 2004/0148235 | A1 | 7/2004 | Craig et al. | |
| 2004/0148252 | A1 | 7/2004 | Fleishman | 705/39 |
| 2004/0215543 | A1 | 10/2004 | Betz et al. | 705/35 |
| 2004/0225609 | A1 | 11/2004 | Greene | 705/40 |
| 2004/0236653 | A1 | 11/2004 | Sokolic et al. | 705/35 |
| 2004/0236681 | A1 | 11/2004 | Modigliani et al. | 705/39 |
| 2005/0010483 | A1 | 1/2005 | Ling | 705/26 |
| 2005/0010523 | A1 | 1/2005 | Myklebust et al. | 705/40 |
| 2005/0086136 | A1 | 4/2005 | Love et al. | |
| 2005/0086165 | A1 | 4/2005 | Pawelczyk et al. | 705/40 |
| 2005/0119971 | A1 | 6/2005 | Zito | 705/40 |
| 2005/0137960 | A1* | 6/2005 | Brann | G06Q 40/04<br>705/37 |
| 2005/0137978 | A1 | 6/2005 | Ganesan et al. | 705/40 |
| 2005/0149439 | A1 | 7/2005 | Suisa | 705/44 |
| 2005/0154923 | A1 | 7/2005 | Lok et al. | |
| 2005/0171899 | A1 | 8/2005 | Dunn et al. | 705/39 |
| 2005/0171900 | A1 | 8/2005 | Onneken | 705/39 |
| 2005/0177505 | A1 | 8/2005 | Keeling et al. | 705/40 |
| 2005/0182720 | A1 | 8/2005 | Willard et al. | |
| 2005/0187867 | A1 | 8/2005 | Sokolic et al. | 705/39 |
| 2005/0192901 | A1 | 9/2005 | McCoy et al. | 705/40 |
| 2005/0198377 | A1 | 9/2005 | Ferguson et al. | 709/238 |
| 2005/0203835 | A1 | 9/2005 | Nhaissi et al. | 705/39 |
| 2005/0203844 | A1 | 9/2005 | Ferguson et al. | 705/40 |
| 2005/0210297 | A1 | 9/2005 | Wu et al. | 713/202 |
| 2005/0222954 | A1 | 10/2005 | Keown et al. | 705/40 |
| 2006/0047724 | A1 | 3/2006 | Messing et al. | 707/204 |
| 2006/0106717 | A1 | 5/2006 | Randle et al. | 705/45 |
| 2006/0136595 | A1 | 6/2006 | Satyavolu | 709/229 |
| 2006/0184451 | A1 | 8/2006 | Ganesan et al. | 705/40 |
| 2006/0195398 | A1 | 8/2006 | Dheer et al. | 705/40 |
| 2006/0230343 | A1 | 10/2006 | Armandpour et al. | 715/517 |
| 2006/0253340 | A1 | 11/2006 | Levchin et al. | 705/26 |
| 2006/0253463 | A1 | 11/2006 | Wu et al. | 707/10 |
| 2006/0282381 | A1 | 12/2006 | Ritchie | |
| 2007/0011090 | A1 | 1/2007 | Baker et al. | 705/39 |
| 2007/0067239 | A1 | 3/2007 | Dheer et al. | 705/40 |
| 2007/0088821 | A1 | 4/2007 | Sankuratripati et al. | 709/224 |
| 2007/0094151 | A1 | 4/2007 | Moenickheim et al. | 705/64 |
| 2007/0100748 | A1 | 5/2007 | Dheer et al. | 705/39 |
| 2007/0106612 | A1 | 5/2007 | O'Brien et al. | 705/44 |
| 2007/0121840 | A1 | 5/2007 | Ganesan et al. | 379/114.01 |
| 2007/0125840 | A1 | 6/2007 | Law et al. | 235/379 |
| 2007/0130347 | A1 | 6/2007 | Rangan et al. | 709/227 |
| 2007/0131758 | A1 | 6/2007 | Mejias et al. | 235/379 |
| 2007/0162769 | A1 | 7/2007 | Sokolic et al. | 713/194 |
| 2007/0179885 | A1 | 8/2007 | Bird et al. | 705/39 |
| 2007/0180380 | A1 | 8/2007 | Khavari et al. | 715/704 |
| 2007/0208645 | A1 | 9/2007 | Hoffman et al. | 705/36 |
| 2007/0230371 | A1 | 10/2007 | Tumminaro | 370/259 |
| 2007/0233615 | A1 | 10/2007 | Tumminaro | 705/75 |
| 2007/0239601 | A1 | 10/2007 | Ganesan et al. | 705/40 |
| 2007/0244811 | A1 | 10/2007 | Tumminaro | 705/39 |
| 2007/0255620 | A1 | 11/2007 | Tumminaro et al. | 705/14 |
| 2007/0255652 | A1 | 11/2007 | Tumminaro et al. | 705/39 |
| 2007/0255653 | A1 | 11/2007 | Tumminaro et al. | 705/39 |
| 2007/0255662 | A1 | 11/2007 | Tumminaro | 705/79 |
| 2008/0015982 | A1 | 1/2008 | Sokolic et al. | 705/39 |
| 2008/0032741 | A1 | 2/2008 | Tumminaro | 455/558 |
| 2008/0033878 | A1 | 2/2008 | Krikorian et al. | |
| 2008/0052226 | A1 | 2/2008 | Agarwal et al. | 705/39 |
| 2008/0082454 | A1 | 4/2008 | Dilip et al. | 705/76 |
| 2008/0086403 | A1 | 4/2008 | Dilip et al. | 705/35 |
| 2008/0086426 | A1 | 4/2008 | Dilip et al. | 705/75 |
| 2008/0091663 | A1 | 4/2008 | Inala et al. | 707/3 |
| 2008/0097899 | A1 | 4/2008 | Jackson et al. | 705/39 |
| 2008/0133407 | A1 | 6/2008 | Guillory et al. | 705/40 |
| 2008/0263069 | A1 | 10/2008 | Harris et al. | 707/100 |
| 2008/0275816 | A1 | 11/2008 | Hazlehurst | 705/40 |
| 2008/0288376 | A1 | 11/2008 | Panthaki et al. | 705/30 |
| 2008/0288400 | A1 | 11/2008 | Panthaki et al. | 705/40 |
| 2008/0301022 | A1 | 12/2008 | Patel et al. | 705/35 |
| 2008/0301023 | A1 | 12/2008 | Patel et al. | 705/35 |
| 2008/0306846 | A1 | 12/2008 | Ferguson | 705/34 |
| 2008/0319880 | A1 | 12/2008 | D'Aquisto et al. | |
| 2009/0006205 | A1 | 1/2009 | Bixler et al. | |
| 2009/0006582 | A1 | 1/2009 | Dawsani et al. | 709/219 |
| 2009/0024505 | A1 | 1/2009 | Patel et al. | 705/35 |
| 2009/0063197 | A1 | 3/2009 | Lisle | |
| 2009/0076950 | A1 | 3/2009 | Chang et al. | 705/39 |
| 2009/0119190 | A1 | 5/2009 | Realini | 705/30 |
| 2009/0125446 | A1 | 5/2009 | Saunders et al. | |
| 2009/0132289 | A1 | 5/2009 | Stenman et al. | |
| 2009/0138394 | A1 | 5/2009 | Garrison et al. | 705/35 |
| 2009/0222369 | A1 | 9/2009 | Zoldi et al. | |
| 2009/0265241 | A1 | 10/2009 | Bishop et al. | |
| 2009/0265774 | A1 | 10/2009 | Malik et al. | 726/7 |
| 2009/0271854 | A1 | 10/2009 | Hazlehurst et al. | 726/7 |
| 2009/0287601 | A1 | 11/2009 | Tumminaro et al. | 705/39 |
| 2009/0287613 | A1 | 11/2009 | Pierdinock et al. | 705/36 |
| 2009/0319410 | A1 | 12/2009 | Kight et al. | 705/34 |

(56) References Cited

U.S. PATENT DOCUMENTS

2009/0319425 A1 12/2009 Tumminaro et al. ........... 705/42
2010/0004990 A1 1/2010 Hazlehurst et al. ....... 705/14.25
2010/0005025 A1 1/2010 Kumar et al. ................. 705/40
2010/0017332 A1 1/2010 Kight et al. .................... 705/64
2010/0030687 A1 2/2010 Panthaki et al.
2010/0100462 A1 4/2010 Lyda et al. ...................... 705/30
2010/0100466 A1 4/2010 Garrison et al. ................ 705/34
2010/0100467 A1 4/2010 McCoy et al. .................. 705/34
2010/0138243 A1 6/2010 Carroll
2010/0198645 A1 8/2010 Heiss et al.
2011/0125613 A1 5/2011 Franchi
2011/0202415 A1 8/2011 Casares et al.
2011/0295746 A1 12/2011 Thomas et al. ................. 705/42
2012/0284175 A1 11/2012 Wilson et al.
2013/0262296 A1 10/2013 Thomas et al.
2013/0268839 A1 10/2013 Lefebvre et al.
2013/0293363 A1 11/2013 Plymouth et al.
2014/0067677 A1 3/2014 Ali et al.
2014/0089182 A1* 3/2014 Short ...................... H04L 63/08 705/40
2014/0164246 A1 6/2014 Thomas et al.
2014/0188728 A1 7/2014 Dheer et al.
2014/0289106 A1 9/2014 Pawelczyk et al.
2015/0046319 A1 2/2015 Thomas et al.
2015/0161597 A1 6/2015 Subramanian et al.
2015/0254665 A1 9/2015 Bondesen et al.
2015/0324801 A1 11/2015 Thomas et al.
2016/0019536 A1 1/2016 Ortiz et al.
2016/0092872 A1 3/2016 Prakash et al.
2016/0358163 A1 12/2016 Kumar et al.
2016/0359829 A1 12/2016 Gulledge
2017/0004501 A1 1/2017 Ledford et al.
2017/0221066 A1 8/2017 Ledford et al.
2017/0344960 A1 11/2017 Garlick et al.
2017/0344964 A1 11/2017 Garlick et al.
2017/0353420 A1 12/2017 Garlick et al.
2017/0372319 A1 12/2017 Garlick et al.
2018/0012199 A1 1/2018 Dunn et al.
2018/0012200 A1 1/2018 Dunn et al.
2018/0174140 A1 1/2018 Garlick et al.
2019/0043052 A1 2/2019 Ledford et al.
2019/0220833 A1 7/2019 Pawelczyk et al.

FOREIGN PATENT DOCUMENTS

EP 0 593 209 A2 4/1994
EP 0 661 654 A2 7/1995
GB 2 328 310 A 2/1999
GB 2533379 A 6/2016
GB 2533380 A 6/2016
GB 2533432 A 6/2016
GB 2533562 A 6/2016
GB 2537087 A 10/2016
WO WO 90/04837 5/1990
WO WO 91/06058 5/1991
WO 93/02424 A1 2/1993
WO WO 95/12859 5/1995
WO WO 97/07468 2/1997
WO WO 97/22060 6/1997
WO WO 1998/018095 4/1998
WO WO 98/47100 10/1998
WO WO 98/58356 12/1998
WO WO 99/56219 11/1999
WO WO 02/17196 A1 2/2002
WO 03/060749 A1 7/2003
WO WO 2007/053123 A2 5/2007
WO WO 2007/056274 A2 5/2007
WO WO 2008/027620 3/2008
WO WO 2008/027621 3/2008
WO 2008/060725 A2 5/2008
WO WO 2009/114876 9/2009
WO WO 2009/152184 12/2009
WO 2016/097672 A1 6/2016
WO 2016/097673 A1 6/2016
WO 2016/097674 A1 6/2016
WO 2016/097675 A1 6/2016

OTHER PUBLICATIONS

B. Scheschuk, "Pay It on the Net (electronic commerce payment solutions)," CMA Management, Hamilton, Jun. 2001, vol. 75, Issue 4, 4 pages.

P. Beckett, "Credit-card Firms Get Into Web Game," Asian Wall Street Journal, Apr. 3, 2001, p. N1.

A. Brooks, "Still Waiting for the E-Mail and Faxes to Start Coming in?," New York Times (East Coast Late Edition), New York, NY, Dec. 19, 1996, p. C7.

A. Roth, "Banks Fund B2B Payment System Effort," American Banker, Apr. 24, 2001, one page.

Kingson et al., "E-Processing by Banks: Idea Gains Ground," American Banker, Apr. 26, 2001, two pages.

E. Wing, "Cracking the Code," Washington Business Journal (Trends in Technology), vol. 20, No. 11, Jul. 20-26, 2001, two pages.

"The Remaining Barriers to ePayments and Straight-through Processing," Research Conducted Oct. 2001-Mar. 2002 by the Clearing House, pp. 1-22.

"New Universal Payment Identification Code Will Become Industry Standard for I-Enabled Payments," United Payment Identification Code, The Clearing House Press Release, Apr. 24, 2001, two pages.

"NYCH Project Shows Promise for Facilitating E-Payments," Pulse, Association for Financial Professionals, Mar. 2002, two pages.

E. Messmer,"Banks Turn to Web for Check Processing," Network World, Framingham, Jun. 19, 2000, vol. 17, Issue 25, pp. 53 and 54.

Check Adjustment Request Federal Reserve Bank, Form: FRBADJ (Sep. 1993), one page.

"Electronic Check Adjustments: Are You Using FedLine?," The Federal Reserve Bank of St. Louis, http://www.stlouisfed.com/publications/pq/1998/a/pq1998a5.html (downloaded Jun. 23, 2005), pp. 1-3.

Check Adjustment Quick Reference Guide, Federal Reserve System, Financial Services, Jul. 1996, 10 pages.

EP 03 72 8532 *European Search Report* dated Feb. 15, 2008, 3 pages.

"By-law No. 7 Respecting the Large Value Transfer System," *Canada Gazette,* Part I, vol. 132, No. 16 (Canadian Government Publishing, online: Archive 1998, Part I http://canadagazette.gc.ca/partI/1998/19980418/pdf/g1-13216.pdf, Apr. 18, 1998, 71 pages.

"Real-Time Gross Settlement Systems," http://www.bis.org/publ/cpss22/pdf, *Bank for International Settlements*; Basle, Mar. 1997, 66 pages.

Carey, T.W., "Quicken versus Money," *PC World,* vol. 14, No. 4, p. 162(6), Apr. 1996, 8 pages.

Cummings, S., "Home Banking with Quicken," New York: *MIS Press,* pp. 24-29, 34-37, and 52-59, 1996, 15 pages.

Lee et al., NOVAHID: A Novel Architecture for Asynchronous Hierarchical, Distributed, Real-Time Payments Processing, *IEEE Journal on selected areas in communications,* vol. 12, No. 6, 1994, pp. 1072-1087, 16 pages.

American National Standard for Financial Image Interchange: Architecture, Overview, and System Design Specification, American National Standards Institute, Inc., ANSI/ABA X9.46-1995 Version 0.13 (Draft), pp. 1-225.

American National Standard for Financial Image Interchange: Architecture, Overview, and System Design Specification, American National Standards Institute, Inc., ANSI/ABA X9.46-1997, pp. 1-231.

D. Minoli, *Imaging in Corporate Environments: Technology and Communication,* McGraw-Hill Osborne, Feb. 1, 1994, pp. 1-297.

*About FSTC,* Financial Services Technology Consortium, http://www.fstc.org/about/history.cfm, Downloaded Feb. 27, 2003, 2 pages.

*American National Standard for Financial Image Interchange: Architecture, Overview and System Design Specification,* American Bankers Association, American National Standards Institute, Inc., pp. 1-202 (1994).

(56) References Cited

OTHER PUBLICATIONS

Anderson, *Re: Electronic Check and Check Law,* Letter to Robert Ballen, 2 pages (Apr. 8, 1996).
*AT&T Global Offers One-Step Imaging* (*AT&T Global Information Solutions*), American Banker, vol. 159, No. 39, p. 14A(1) (Feb. 28, 1994).
*AT&T Partners with Fiserv to Form Single Source Provider for Leading Image Item Processing Solutions,* PR Newswire, p. 913, col. 11 (1995).
*Image Can Be . . . Everything!,* At Your Service, A Newsletter from the Federal Reserve Bank of Kansas City, pp. 1-6 (1995).
*Baby Boomers, Generation X are Both Addicted to the ATM,* AT&T News Release, http://www.att.com/news/0295/950228.nca.html, Downloaded Nov. 15, 2002, 3 pages.
*Banctec Inc. Has Received Another Order for Its Image Statement Processing Product.* (*First National Bank of Chicago Orders ImageFirst*), Financial Services Report, vol. 8, No. 22, p. 5(2) (Nov. 13, 1991).
Banet, *Document Image Processing, 1991: The Imaging Edge,* Seybold Report on Publishing Systems, vol. 20, No. 19, p. 22(8) (Jun. 24, 1991).
*Banks to Check Out Imaging* (*Solutions*), Communicationsweek International, No. 093, p. 46 (Oct. 19, 1992).
Barthel, *NCR and Unisys Exchange Check Images in a Pivotal Test.* (*Computer Makers Test Compatibility of Check Imaging Systems*), American Banker, vol. 158, No. 67, p. 3(1) (Apr. 8, 1993).
Barthel, Unisys, *Banctec Offer PC-based Imaging: High-tech Check Statements Produced; Community Banks are Market,* Banctec Systems Inc., American Banker, vol. 157, No. 195, p. 3(1) (Oct. 8, 1992).
Bartholomew, *More Checks on Checks—Bank of America Plans to Convert to an IBM Imaging System that Screens Checks Faster and More Thoroughly,* Informationweek, No. 504, p. 32 (Dec. 5, 1994).
*Bill Processing: US West Re-engineers with $7.2 Million Unisys Image-based Remittance Processing Solution,* EDGE, On& About AT&T, vol. 10, No. 378 (Oct. 23, 1995).
Blankenhorn, *Cincinnati Bell and Unisys Go Into Bank Imaging,* Cincinnati Bell Information Systems, Inc., Newsbytes, p. NEW10240020 (Oct. 24, 1990).
Block, *USAA Federal Gets Imaging System,* USAA Federal Savings Bank, Cincinatti Bell Information Systems Inc., Brief Article, American Banker, vol. 159, No. 49, p. 6A(1) (Mar. 14, 1994).
Booker, *Bank to Test Scalable NCR Imaging for Check Processing,* Computerworld, p. 66 (Dec. 14, 1992).
Brown, *Imaging May Dramatically Alter Bank Data Networks,* Network World, vol. 6, No. 19, p. 6(2) (May 15, 1989).
Buchok, *OCR Gets Processing Credit,* Computing Canada, vol. 19, No. 26, p. 30(1) (Dec. 20, 1993).
*Chase's New Image* (*Chase Manhattan Awards 12-yrs Image-processing Contract to Flserv; Contract Could Generate $40 mil/yr in Revenue for Flserv*), Information Week, No. 517. p. 14 (Mar. 6, 1995).
*Current Check Flow,* PowerPoint Presentation, Check[1].ppt, pp. 1-4.
*FSTC Projects, Check Image Exchange Project* (*a.k.a Interbank Check Imaging Project*), Financial Services Technology Consortium, http://www.fstc.org/projects/imaging/index.cfm, Downloaded Oct. 30, 2002, 6 pages.
*Check-Image Interchange Inches Closer* (*New York Clearing House, Chase Manhattan Bank and Federal Reserve Bank of Boston All Launch Check-image Interchange Program*), Bank Technology News, vol. 10, No. 1, p. 19+ (Jan. 1997).
*Checks & Checking: Check Imaging at the Teller Station,* Bank Technology News, vol. 9, No. 10, p. 37 (Oct. 1996).
*Chemical Chooses IBM Check Imaging* (*Chemical Banking Corp to Install IBM's ImagePlus High Performance Transaction System to Process 9 Mil Checks Daily*), Bank Technology News, vol. 8, No. 9, p. 11 (Sep. 1995).
*Cincinnati Bell: CBIS & Unisys in Major Imaging Agreement,* EDGE, On & About AT&T, vol. 5, No. 118, 1 page (Oct. 20, 1990).
*Cincinnati Bell Information Systems* (*Integrator Briefs*), Computer Reseller News, No. 534, p. 129 (Jul. 12, 1993).
*Computerm Announces Remote Check Imaging Support for VMC 8200 High-speed Channel Extension System,* PR Newswire, p. 40LAM012 (Apr. 8, 1996).
*Computerm Eases Remote Imaging,* Introduces Remote Image Solution, Brief Article, American Banker, vol. 158, No. 156, p. 13A(1) (Aug. 16, 1993).
*Computerm Enables Boatmen's Bancshares to Execute Remote Check Imaging,* PR Newswire, p. 408LAM013 (Apr. 8, 1996).
Cooney, *Frame—Relay—Comes to Computerm Extenders,* Network World, p. 14 (Jun. 28, 1993).
Cortese, *Image Yields Interest at Banks,* Collaboration Results in Imaging System to Automate Check Processing, Computerworld, p. 6 (Mar. 19, 1990).
Costanzo, *As Banks Cling to the Conventional, Check-imaging Struts Its Stuff,* Bank Technology News, p. 1 (Mar. 1994).
Crockett, *Systematics to Use Deposited-check Imaging; Installation at Firm's N.J. Center Would Be the First by an Outsourcer,* Systematics Financial Services Inc., Unisys Corp., American Banker, vol. 158, No. 95, p. 3(1) (May 19, 1993).
Crone, *Reducing Data Processing Costs with a Remote Item Processing System,* Bank Administration, vol. 62, No. 10, pp. 44-46 (Oct. 1986).
*Unisys Acquires VisualImpact Solution for Check Processing, Archive & Image Delivery,* Business Wire, p. 9181204 (Sep. 19, 1997).
*Unisys Provides Services to Bank of the West to Support Retail Banking,* Business Wire, p. 9180098 (Sep. 19, 1995).
Cantwell, *Data Compression Over Frame Relay Implementation Agreement FRF.9,* Frame Relay Forum Technical Committee, pp. 1-28 (Jan. 22, 1996).
Defendants' Final Invalidity Construction Pursuant to Fourth Amended Docket Control Order and Patent Local Rules 3-3 and 3-6, Datatreasury Corporation, Civil Action No. 5:03-CV-039 (DF), Served Dec. 13, 2005, pp. 1-21.
Defendants Ingenico S.A. and Ingenico, Inc.'s Preliminary Invalidity Contentions, DataTreasury Corporation, Civil Action No. 502CV095, dated Dec. 9, 2002, pp. 1-224.
Defendants' Preliminary Invalidity Construction Pursuant to Patent Local Rules 3-3 and 3-4, DataTreasury Corporation, Civil Action 502-CV-094-DF, Served Oct. 15, 2002, 94 pages.
Depompa, *IBM Adds Image-based Processing,* MIS Week, vol. 11, No. 12, p. 12(1) (Mar. 19, 1990).
*3174 Network Processor,* Specification Sheet, http://ecc400.com/ibm/controllers/314.prod.htm, Downloaded Oct. 7, 2002.
*Broadway & Seymour to Invest in Two Strategic Initiatives,* Business Wire, p. 03151248 (Mar. 15, 1995).
*ECheck:Homepage,* http://www.echeck.org, Downloaded Feb. 27, 2003.
*Electronic Imaging '88,* International Electronic Imaging Exposition & Conference (Advance Printing of Paper Summaries), Anaheim, California, Mar. 28-31, 1988, 26 pages.
*Electronic Imaging '88,* International Electronic Imaging Exposition & Conference (Advance Printing of Paper Summaries), Boston, Massachusetts, Oct. 3-6, 1988, 11 pages.
IdeaCopTM OpenOpposition Prior Art Report for U.S. Pat. No. 5,910,988 by PatenTrakkerTM, Email regarding USPTO Reexam C.N. 90/007,829, Requested Date: Nov. 25, 2005, from "PT" <admin@patentrakker.com>, pp. 1-13 (May 10, 2006).
*Encryption and Digital Signature Explained,* Northern Telecom Inc., 4 pages (no date available).
*Computerm Earns MCI "Level 1" Approval; Computerm's Industry Exclusive Native Frame—Relay Interface Passes Test for Interoperability with MCI's Frame—Relay Services,* Business Wire, p. 4121139 (Apr. 1995).
Evans, *The End of Paper Wait: Document Imaging* (includes related articles on successful document imaging implementations at Borgess Medical Center, the Huntington Internal Medicine Group, the University of Alabama Health Services Foundation and Quest Diagnostics)(Industry Trend or Event), Health Management Technology, vol. 18, No. 2, p. 15(5) (Feb. 1997).
Fassett, *Impact of Imaging,* Bank Management, vol. 67, No. 11, p. 56 (Nov. 1991).

(56) References Cited

OTHER PUBLICATIONS

*Request for Proposal for Check Image Processing and Archival and Retrieval Systems for the Federal Reserve,* Federal Reserve Bank of Boston, Version 1.0, Apr. 21, 1994.
*NCR Demonstrates Systems for Insurance and Accounting Industry,* AT&T News Release, http://www.att.com/news/0592/920531.nca.html, Downloaded Nov. 15, 2002, 3 pages.
*NCR Demonstrates Full Line of Retail Products at NFR Conference,* AT&T News Release, http://www.att.com/news/0193/930118.ncd.html, Downloaded Nov. 15, 2002, 3 pages.
*Introducing the Age of Document-Image Processing,* FileNetTM Brochure, FileNet Corporation, 14 pages (1984).
*Financial EDI Over the Internet,* A Pilot Conducted by BankAmerica and Lawrence Livemore National Laboratory, http://www.bofa.com/batoday/edi_briefing.html, Downloaded Mar. 2, 1996, 7pages.
*Financial Services Technology Consortium—Interbank Check Imaging Project—White Paper* (Draft), FSTC, pp. 1-30 (Jun. 20, 1994).
Fisher, *IBM, Customers Continue Work on Document Image Processor,* Datamation, vol. 34, No. 19, p. 23(2) (Oct. 1, 1988).
Fitch, *Digital Image Systems Speed Return Items, Exceptions,* Corporate Cashflow, pp. 8 & 10 (May 1996).
Fitch, *Check Image Capture Speeds Up Positive Pay Reconcilement,* Corporate Cashflow, pp. 7 & 11 (Feb. 1995).
*Nixdorf Computer Introduces DCPA Image—A Sophisticated Document Image Processing System with Unqiue Capabilities,* PR Newswire, 3 pages (Aug. 15, 1989).
*FSTC Check Image Interchange Project—Archive Storage and Retrieval Component Decomposition,* FSTC, pp. 1-20 (May 25, 1995).
Brown, *FSTC Image Interchange Project Pilot Phase-1A—Preliminary Architecture and Project Plan—Bank of Boston Huntington Bank,* IBM Corporation, pp. 1-34 (Jun. 30, 1995).
Wong et al., *FSTC Check Image Quality Subproject Status and Project Plan Update,* 6 pages (May 22, 1996).
Brown, *ANSI X9.46 Data Structure Reference,* IBM Corporation, pp. 1-16 (Jul. 31, 1995).
*FSTC Demonstrates Interbank Check Image Pilot; Multi-vendor System Speeds Check Clearing, Cuts Fraud,* FSTC Projects—Check Image Exchange Project, Press Release, http://www.fstc.org/projects/imaging/public/information.cfm, Downloaded Oct. 30, 2002, 2 pages.
Hanna, *FSTC Image Exchange,* POS Image Capture Pilot—Reader-Scanner Study, RDM Corp, 1 page (May 21, 1996).
*Image Quality Functional Requirements,* FSTC, Chase Manhattan Bank, pp. 1-19 (Jul. 26, 1995).
*FSTC Interbank Check Imaging Unisys Monthly Status Report,* pp. 1-7 (Jun. 26, 1996).
*FSTC Interbank Check Imaging Unisys Monthly Status Report,* pp. 1-9 (Jul. 22, 1996).
Stanley, *Pilot Overview,* FSTC, 8 pages (Apr. 3, 1995).
*Check Image Exchange Project—Project Participants,* FSTC Projects, FSTC, http://www.fstc.org/projects/imaging/participants.cfm, Downloaded Oct. 30, 2002, 1 page.
*The Bank Internet Payment System (BIPS): Leading the Way to Electronic Commerce,* FSTC Projects, FSTC, http://www.fstc.org/projects/bips/index.cfm, Downloaded Feb. 27, 2003, 3 page.
Garvey, *Check Processing Goes Digital—Chase Manhattan Bank to Store Checks Electronically, Saving Time and Money,* Informationweek, No. 648, p. 20 (Sep. 15, 1997).
Gawen, *PC Based Document Image Processing and Signature Verification,* OIS IMC91 Document Imaging, Proceedings of the Information & Image Management Conference, London, pp. 389-391 (Jul. 1991).
*Global Concepts—Payment Systems Consulting,* Global Concepts, Inc., http://www.globalconcepts.com/image_archive.htm, Downloaded Nov. 20, 2002, 1 page.
*National City, NCR Form Strategic Imaging Partnership,* AT&T News Release, http://www.att.com/news/1192/921109.nca.html, Downloaded Nov. 15, 2002, 3 pages.
Gullo, *NCR, Unisys Plan Check Imaging for IBM Systems,* American Banker, vol. 156, No. 249, p. 1(2) (Dec. 30, 1991).
*Unisys Integrates Retail/Wholesale Lockbox Solution for Remittance Processors,* Business Wire, p. 03251075 (Mar. 25, 1997).
*Unisys Solution will Support Check Processing at Vermont Federal,* Business Wire, p. 5201185 (May 20, 1996).
Helm, *Banks Check Into Image Processing,* Computers in Banking, vol. 7, No. 3, p. 25(7) (Mar. 1990).
Helm, *Who's Doing What in Image Processing* (includes definition of image processing), ABA Banking Journal, vol. 83, No. 1, p. 31(3) (Jan. 1991).
*MICR Technology Helps Eliminate POS Check Fraud,* Chain Store Age Executive, p. 79 (Sep. 1991).
Horine, *AT&T and Fiserv Team to Offer Imaging Solutions,* AT&T News Release, http://www.att.com/news/0995/950913.nca.html, Downloaded Nov. 15, 2002, 2 pages.
*Huntington Bancshares in the Forefront of Technology with Purchase of Unisys Check Imaging System,* PR Newswire, p. 1 (Oct. 11, 1989).
*IBM 3898 Image Processor,* Product Announcement, IBM, 3 pages (Mar. 19, 1990).
*IBM Proposal for FRB Phase Four: Image Archive System,* IBM Financial Document Processing, IBM, Nov. 7, 1991.
*Preface,* IBM Systems Journal, IBM, vol. 29, No. 3, pp. 302-303 (1990).
*IBM X9.49 Pilot Status—Summary,* 3 pages (no date available).
Schemers, III, *Ibnamed, A Load Balancing Name Server Written in Perl,* http://www.stanford.edu/~schemers/docs/Ibnamed/Ibnamed.html, Downloaded Oct. 15, 2002, 5 pages.
Schemers, III, *Ibnamed, A Load Balancing Name Server Written in Perl,* http://www.stanford.edu/~schemers/docs/Ibnamed/Ibnamed.html, Downloaded Nov. 27, 2002, 5 pages.
*ICI Project Security Work Session—May 10, 1996,* Agenda, 3 pages.
*Image Archive Forum—Payments Systems Task Force—Introduction and Flow Diagrams and Narratives,* Flow Nos. 1-13, 50 pages (no date available).
*Methodology and Value,* Image Archive Forum, 20 pages (Sep. 19, 1997).
*Image Archive Forum—Payments Systems Task Force—Economic Framework,* 33 pages (Jan. 27, 1998).
*Image Processing Survival Guide, vol. II—Sure-Fire Strategies for Implementing Image-Remittance,* Phillips Business Information, Inc., 48 pages (1996).
*Image Systems Garner NOAC Spotlight* (American Bankers' Association's National Operations and Automation Conference), Computers in Banking, vol. 6, No. 7, p. 8(4) (Jul. 1989).
*Imaging Products,* United States Banker, vol. 100, No. 8, p. 23(3) (Aug. 1990).
*Imaging Vendors Shape Processing,* Banking Management, vol. 69, No. 4, p. 29 (Apr. 1993).
*250 U.S. Banks to Use NCR, Cincinnati Bell Financial Systems,* AT&T News Release, http://www.att.com/news/0593/930504.ncd.html, Downloaded Nov. 15, 2002, 2 pages.
*Industry Security Leader Racal Supports Visa/Mastercard Proposal for Internet,* PR Newswire, 2 pages (Apr. 17, 1996).
*Item Processing Leaps Ahead with VisualImpact and Windows NT* (Sponsored Supplement: Unlock Your Back Office with Microsoft BackOffice), US Banker, vol. 105, No. 6, p. S4(3) (Jun. 1995).
Janusky, *FSTC Interbank Check Imaging,* 6 pages (Apr. 29, 1996).
Janusky, *FSTC Interbank Check Imaging,* 7 pages (May 22, 1996).
*Joint Marketing & Referral Agreement Between ACS Image Solutions, Inc. and JPMorgan Chase Bank,* 27 pages (no date available).
*Broadway & Seymore Announces Client/Server Product for Item and Image Processing,* Business Wire, p. 03201186 (Mar. 20, 1995).
*Broadway & Seymore Announces New VisualImpact Release,* Business Wire, p. 3291274 (Mar. 29, 1996).
*Terminal Data to Supply NCR with Document Microfilmers,* AT&T News Release, http://www.att.com/news/1093/931013.nca.html, Downloaded Nov. 15, 2002, 2 pages.
*Signet Bank Processes Over 2,500 Documents/Hour in Unisys Check Imaging Tests,* PR Newswire, p. 0409P8428 (Apr. 9, 1991).
Kniskern, *Engineering a Visionary Solution,* Datamation, vol. 36, No. 8, p. 90(2) (Apr. 15, 1990).

(56) References Cited

OTHER PUBLICATIONS

Kutler, *AT&T, IBM and Unisys Join Bank Resrearch Group* (Financial Services Technology Consortium), American Banker, vol. 159, No. 124, p. 14(1) (Jun. 29, 1994).
*Unisys Enters Image Processing Market with Two New Products and Major Financial and Industrial Customers* (product announcement), PR Newswire, p. 1011PH009 (Oct. 11, 1989).
Mantel, *Notes Gets in the Picture,* Datamation, pp. 87 & 88 (Jul. 15, 1992).
Marjanovic, *Payment Groups Square Off Over Electronic Check Plan,* American Banker, 1 page (May 8, 1996).
Marjanovic, *Mich. National Streamlines Imaging with IBM System* (check imaging), American Banker, vol. 160, No. 176, p. 14(1) (Sep. 13, 1995).
Marjanovic, *Home Loan Bank to Offer Check-image Statements to Members' Customers* (Federal Home Loan Bank of Pittsburgh)(Brief Article), American Banker, vol. 159, No. 248, p. 14(1) (Dec. 29, 1994).
*NCR and NYCH to Develop Image-based Check Notification System,* AT&T News Release, http://www.att.com/news/0892/920824.ncb.html, Downloaded Nov. 15, 2002, 2 pages.
*NCR Deposit Processing Technology Speeds Banking Operations,* AT&T News Release, http://www.att.com/news/1292/921207.ncc.html, Downloaded Nov. 15, 2002, 3 pages.
*Wachovia Tests NCR's New Imaging Item Processing System,* AT&T News Release, http://www.att.com/news/1091/911015.nca.html, Downloaded Nov. 15, 2002, 2 pages.
*NCR Signs DSI Alliance for Imaging Statement Processing,* AT&T News Release, http://www.att.com/news/0792/920720.nca.html, Downloaded Nov. 15, 2002, 2 pages.
*NCR, CKI to Market Image-based Credit Card Chargeback System,* AT&T News Release, http://www.att.com/news/0193/930106.ncb.html, Downloaded Nov. 15, 2002, 3 pages.
*Frost National Bank Selects NCR Over Old Mainframe Environment,* AT&T News Release, http://www.att.com/news/0493/930428.nca.html, Downloaded Nov. 15, 2002, 2 pages.
McGinn, *IBM ImagePlus High Performance Transaction System* (IBM Harness Image Processing to Make its 389x/XP Cheque Processors More Efficient)(Product Announcement), Computergram International, No. 1389, p. CG103210008 (Mar. 21, 1990).
*News Release, Retail Banking Solution Enhanced,* AT&T News Release, http://www.att.com/news/0590/900521.nca.html, Downloaded Nov. 15, 2002, 2 pages.
Messmer, *Hurdles Stand in Way of Electronic Checking,* Network World, p. 33 (Sep. 4, 1995).
*Microsoft Introduces SNA Server Version 3.0, Begins Beta Testing,* Microsoft PressPass—Information for Journalists, http://www.microsoft.com/presspass/press/1996/jun96/sna30pr.mspx, Downloaded Aug. 29, 2006, 4 pages.
Moore, *IBM, Unisys Test Check Systems for Fed Reserve,* Federal Computer Week, vol. 6, No. 21, p. 6(2) (Jul. 27, 1992).
Moreau, *Payment by Authenticated Facsimile Transmission—A Check Replacement Technology for Small and Medium Enterprise—Payment Processing Overview,* CONNOTECH, http://connotech.com/PAYPROC.HTM, Downloaded Nov. 25, 2006, 23 pages.
Murphy, *POD Check Imaging Faces New Challenges* (In 1995 vs 1996, banks raised investment in check imaging by 9% from $198 mil and $215 mil; new low cost POD technology keeps it down), Bank Technology News, vol. 10, No. 3, p. 23 (Mar. 1997).
*Imaging Technology: Generating New Bank Revenues in the Age of the Consumer,* NCR Reports—Financial Services Trends & Technologies, NCR Corporation, Issue 1, 4 pages (Jan. 1997).
*Implementing Imaging Payment Systems: Managing Change to Achieve Results,* NCR Reports—Financial Services Trends & Technologies, NCR Corporation, Issue 2, 3 pages (Feb. 1997).
*Integrated, Customer-focused Banking Architecture: Tomorrow's Competitive Edge,* NCR Reports—Financial Services Trends & Technologies, NCR Corporation, Issue 3, 6 pages (Mar. 1997).
NCR Reports—Financial Services Trends & Technologies, NCR Corporation, Issue 4, 6 pages (1997).
*Information Technology Outsourcing: Sharpening Management Focus in Financial Institutions,* NCR Reports—Financial Services Trends & Technologies, NCR Corporation, Issue 5, 6 pages (1997).
*What Is a Financial Transaction Switch?,* NCR Reports—Financial Services Trends & Technologies, NCR Corporation, vol. 1, Iss. 6, 6 pages (1997).
*Implementing National Electronic Payment System in Emerging Economies,* NCR Reports—Financial Services Trends & Technologies, NCR Corporation, vol. 1, Iss. 7, 12 pages (1997).
*Check Image Processing Delivers Truncation Benefits Today,* NCR Reports—Financial Services Trends & Technologies, NCR Corporation, vol. 1, Iss. 8, 13 pages (1997).
*7780—The Robust, Reliable Solution . . . for Processing Varying Volumes in Any Environment,* NCR Corporation, 8 pages (1998).
*7780 Mid-Range Item Processing—Technical Specifications,* NCR Corporation, http://www.ncr.com/products/hardware/hw_7780_ts_product.htm, Downloaded Nov. 15, 2002, 1 page.
*7780 Mid-Range Item Processing—Product Overview,* NCR Corporation, http://www.ncr.com/products/hardware/hw_7780_ts_product.htm, Downloaded Nov. 15, 2002, 4 pages.
*NCR Offers New Image-Based Document Management System,* AT&T News Release, http://www.att.com/news/0692/920623.ncb.html, Downloaded Nov. 15, 2002, 3 pages.
*NCR Unveils Client-Server Check Imaging* (NCR introduced NCR scalable image item processing solution, a client-server based system for image-based check processing), Bank Technology News, vol. 9, No. 3, p. 23 (Mar. 1996).
Nixon, *Is Check Imaging for You?* (automation in banking)(includes related articles), Savings & Community Banker, vol. 2, No. 10, p. 28(6) (Oct. 1993).
*Interbank Check Image Project,* FSTC, PowerPoint Presentation, no1016V4[1].ppt, 18 pages (no date available).
Behnke, *NSSDC's Mass Storage System Evolves,* NSSDC, http://nssdc.gsfc.gov/nssdc_news/march95/09_i_behnke_0395.html, Downloaded Oct. 15, 2002, 2 pages.
O'Heney, *Prepare for the Image Revolution* (Bankers and Vendors)(image processing; includes related article listing image processing products)(buyers guide), Computers in Banking, vol. 6, No. 10, p. 24(6) (Oct. 1989).
*On the Image Technology Front* (Unisys Corp is in an accord to Remarket Broadway & Seymore Inc's VisualImpact software, a midrange check-imaging system), American Banker, vol. CLXI, No. 68, p. 26 (Apr. 10, 1996).
*PACES—Paperless Automated Check Exchange & Settlement—Business Requirements,* FSTC, PACESBusReq3[1].doc, 7 pages (Apr. 3, 1998).
Roldan, *Project Overview—PACES Planning Meeting—New York City,* FSTC, PacesOverview40[1].ppt, 28 pages (Dec. 19, 1997).
*PACES—Paperless Automated Check Exchange & Settlement—Project Proposal,* FSTC, PACESPRO[1].doc, 25 pages (1997).
*PACES—Paperless Automated Check Exchange & Settlement—Requirements Document,* FSTC, PACESRequirements[1].doc, 25 pages (Apr. 3, 1998).
*Preliminary Invalidity Contentions of Defendants J.P. Morgan Chase & Co. and JPMorgan Chase Bank,* DataTreasury Corporation, 59 pages (Served Dec. 3, 2002).
*Cisco Partners with AT&T CMS on Network Switch Manufacturing,* Lucent Technologies, http://www.lucent.com/press/0995/950926.mma.html, Downloaded Oct. 4, 2002, 2 pages.
*NCR Document Management System Includes Kodak, Ricoh Products,* AT&T News Release, http://www.att.com/news/0493/930406.ncc.html, 3 pages (Apr. 6, 1993).
*NCR Introduces Scalable Image Item Processing Solution,* AT&T News Release, http://www.att.com/news/0196/960119.nca.html, 3 pages (Jan. 19, 1996).
*Regions Bank Selects ImageSoft to Provide Imaging Solution,* Business Wire, p. 9161220 (Sep. 16, 1997).
Rivest et al., *A Method for Obtaining Digital Signatures and Public-Key Cryptosystems,* pp. 1-15 (Sep. 1, 1997).
*Universal Card Purchases BancTec ImageFIRST System,* AT&T News Release, http://www.att.com/news/1292/921222.uca.html, Downloaded Nov. 15, 2002, 2 pages.

(56) References Cited

OTHER PUBLICATIONS

Roldan, Jr., *TITLE: Image Quality White Paper,* FSTC PACES Project Document, Chase Manhattan Bank, pp. 1-18 (Feb. 18, 1999).
*Paperless Automated Check Exchange and Settlement (PACES),* FSTC Projects, http://www.fstc.org/projects/paces/projstatus.cfm, Downloaded Oct. 30, 2002, 2 pages.
Schwartz, *Banks to Test Imaging for Clearing Checks,* CommunicationsWeek, p. 35 (Sep. 14, 1992).
*Softchec Licenses 'Envision' Image Solution to West Suburban Bank,* PR Newswire, p. 116SETU002 (Jan. 16, 1996).
Bartimo et al., *Fine Tuning the Terminal Picture,* ComputerWorld, Special Report, vol. XVII, No. 35, 48 pages (Aug. 29, 1983).
Spencer, *Scanning Goes Vertical: A Big Future for Specialized Check Scanning; Check Scanning Technology,* Advanced Imaging, pp. 42-44 (Oct. 1997).
*New ATM from AT&T GIS Features Automated Document Processing,* AT&T News Release, http://www.att.com/news/1194/941129.ucb.html, Downloaded Nov. 15, 2002, 4 pages.
*NCR and Cincinnati Bell Offer Image Processing Service,* AT&T News Release, http://www.att.com/news/0194/940111.nca.html, Downloaded Nov. 15, 2002, 2 pages.
*Norwest Bank Selects NCR Image-based Processing Systems,* AT&T News Release, http://www.att.com/news/0893/930802.nca.html, Downloaded Nov. 15, 2002, 3 pages.
*New Mexico Uses NCR Imaging Systems for Tax, Revenue Processing,* AT&T News Release, http://www.att.com/news/0793/930712.ncc.html, Downloaded Nov. 15, 2002, 2 pages.
*CashFlex Selects NCR Item Processing Systems for Lockbox,* AT&T News Release, http://www.att.com/news/0793/930712.ncd.html, Downloaded Nov. 15, 2002, 2 pages.
*NCR and Arkansas System Announce Strategic Alliance,* AT&T News Release, http://www.att.com/news/0793/930712.ncb.html, Downloaded Nov. 15, 2002, 2 pages.
*NCR and Signet Banking to Provide Item Processing Services,* AT&T News Release, http://www.att.com/news/0793/930713.ncb.html, Downloaded Nov. 15, 2002, 2 pages.
*SurePOS ACE Electronic Payment Support PRPQ for 4690 OS—User's Guide,* IBM Corporation, Version1, Release 5, 250 pages (Mar. 2002).
*The Check Information Age,* Vision Executive Summary Image Archive Forum, Payment System Task Force, 10 pages (Jan. 27, 1998).
*The Wachovia Story,* RDM Corporation, 1 page (Oct. 1993).
Tracey, *IBM Unveils First Stage of Image-check System* (product announcement), Computers in Banking, vol. 7, No. 4, p. 13(3) (Apr. 1990).
Tucker, *Broadway Rolls Out Check Imaging System for Community Banks* (Broadway & Seymour Inc.), American Banker, vol. 160, No. 61, p. 14(1) (Mar. 30, 1995).
*Understanding EDI,* 2 pages (Mar. 2, 1996).
*Unisys Enhances Check Imager* (Unisys Corp Makes Effort to Appeal to Wider Range of Financial Institutions), American Baker, vol. CLIX, No. 205, p. 15A (Oct. 24, 1994).
*New York Clearing House—A Proposal for an Image-based Return Item Processing System,* Unisys, Document No. PDC 1010-16, pp. 1-1 to 7-11 (Jun. 1991).
*Unisys Wins Contract to Supply Imaging Solution to Chase Manhattan/FISERV Check Processing Alliance,* Business Wire, p. 6121175 (Jun. 12, 1995).
*Unix-based Imge Statement Software* (Cincinnati Bell Information Systems Inc. introduces ImageBanc II computer software)(Brief Article), ABA Banking Journal, vol. 85, No. 2, p. 80(1) (Feb. 1993).
*Verifone Software Links PCs to the Point of Sale* (Brief Article), American Banker, vol. 158, No. 156, p. 13A(1) (Aug. 16, 1993).
Wagner, *Banc One Checks Out Web,* Computerworld, vol. 30, No. 35, p. 69 (Aug. 26, 1996).
*Western Bank Purchases NCR's Document Managing System,* AT&T News Release, http://www.att.com/news/0893/930831.nca.html, Downloaded Nov. 15, 2002, 3 pages.
*Technical Volume—Check Image Processing Archive and Retrieval System—Proposal,* BancTec, Inc., 469 pages (Jul. 8, 1994).
Plaintiff's Original Complaint for Patent Infringement and Jury Demand, *Data Treasury Corp.* vs. *Bank One Corp.,* Cause No. 3-03CV-0059-K, In the United States District Court for the Northern District of Texas Dallas Division, Filed Jan. 9, 2003, 4 pages.
Plaintiff's Original Complaint for Patent Infringement, *Data Treasury Corporation* vs. *First Data Corporation, First Data Merchant Services Corporation, and Telecheck Services, Inc. d/b/a Telecheck International, Inc.,* Cause No. 502CV094, In the United States District Court for the Eastern District of Texas Texarkana Division, Filed May 2, 2002, 4 pages.
Plaintiff's Original Complaint for Patent Infringement and Jury Demand, *Data Treasury Corp.* vs. *RDM Corp. a.k.a. Research Development and Manufacturing Corp.,* Cause No. 3-02CV2641-M, In the United States District Court for the Northern District of Texas Dallas Division, Filed Dec. 11, 2002, 4 pages.
Plaintiff's Original Complaint for Patent Infringement, *Data Treasury Corporation* vs. *Ingenico S.A., d/b/a Groupe Ingenico, and Ingenico, Inc.,* Cause No. 502CV095, In the United States District Court for the Eastern District of Texas Texarkana Division, Filed May 2, 2002, 4 pages.
Plaintiff's Original Complaint for Patent Infringement, *Data Treasury Corporation* vs. *J.P. Morgan Chase & Co., J.P. Morgan Chase Bank, and Affiliated Computer Services, Inc.,* Cause No. 502CV124, In the United States District Court for the Eastern District of Texas Texarkana Division, Filed Jun. 5, 2002, 4 pages.
Vermeire, *Prosecution of Check Image Patent,* Letter to Peter Hanna, 1 page (Jul. 11, 1997).
Dowdell, *Security—Overlap of E-check and Image Intercgange,* Email to fstc-image, 2 pages (Apr. 27, 1996).
*High-Volume Data Capture Sans the Paper,* Bank Systems & Technology, p. 35 (May 1996).
Atzel, *Article Order,* Email to Marshall J. Hambro, 1 page (Oct. 9, 2001).
Kingman et al., *Operational Image Systems: A New Opportunity,* IBM Systems Journal, vol. 29, No. 3, pp. 304-312 (1990).
Helms, *Introduction to Image Technology,* IBM Systems Journal, vol. 29, No. 3, pp. 313-332 (1990).
Hakeda, *The Image Object Conten Architecture,* IBM Systems Journal, vol. 29, No. 3, pp. 333- 342 (1990).
Plesums et al., *Large-Scale Image Systems: USAA Case Study,* IBM Systems Journal, vol. 29, No. 3, pp. 343-355(1990).
Avers et al., *ImagePlus as a Model for Application Solution Development,* IBM Systems Journal, vol. 29, No. 3, pp. 356-370 (1990).
Morris et al., *Image System Communication,* IBM Systems Journal, vol. 29, No. 3, pp. 371-383 (1990).
Harding et al., *Object Storage Hierarchy Management,* IBM Systems Journal, vol. 29, No. 3, pp. 384-397 (1990).
Anderson et al., *ImagePlus Workstation Program,* IBM Systems Journal, vol. 29, No. 3, pp. 398-407 (1990).
Ryman, *Personal Systems Image Application Architecture: Lessons Learned from the ImagEdit Program,* IBM Systems Journal, vol. 29, No. 3, pp. 408-420 (1990).
Dinan et al, *ImagePlus High Performance Transaction System,* IBM Systems Journal, vol. 29, No. 3, pp. 421-434 (1990).
Casey et al., *Intelligent Forms Processing,* IBM Systems Journal, vol. 29, No. 3, pp. 435-450 (1990).
Addink et al., *AS/400 ImagePlus System View,* IBM Systems Journal, vol. 29, No. 3, pp. 451-466 (1990).
Perry et al., *Experience Gained in Implementing ImagePlus,* IBM Systems Journal, vol. 29, No. 3, pp. 467-490 (1990).
*Technical Volume—Check Image Processing Archive and Retrieval System—Total System Solution Overview,* BancTec, Inc., 128 pages (Jul. 8, 1994).
*Interbank Check Imaging,* FSTC General Meeting—Orlando, Florida, 5 pages (Apr. 17, 1997).
*Company Background and Product Guide,* MagTek, 42 pages (no date available).
*MagTek Unveils Excella, a Dual-side Scanner for Check 21 Applications,* 1 page (May 10, 2004).

(56) References Cited

OTHER PUBLICATIONS

Roldan, *PACES—Paces Models—FSTC Project,* Chase Manhattan Bank,19 pages (Jul. 17, 1997).
Fricke, *PACES—Next Steps,* Chase Manhattan Bank, 10 pages (Aug. 12, 1997).
Meyerson, *PACES Redeposit Processing,* pp. 1-60 (no date available).
*MagTek Adds Enhanced Reading to MICRImageTM—New Reading Capability Supports Check Conversion with Higher Reliability,* MagTek Press Release, 3 pages (Jan. 9, 2003).
*MagTek Upgrades Its MICRImageTM Check Reader/Scanner—V. 34 Modem Supports High-Speed Image Archiving for Check Conversion,* MagTek Press Release, 3 pages (Jun. 12, 2002).
*MagTek's MICRImage Transmits Check Images at Speed of Ethernet,* MagTek Press Release, 2 pages (Feb. 14, 2002).
*The New Era of Check Scanning Technology—Introducing Excella, Specifically Designed to Meet the Processing Requirements of Check21,* MagTek, Inc., MagTek D-6, 22 pages (2005).
*Electronic Payment Systems Support/Check Processing Control System: Program Reference and Operations Manual,* IBM Corporation, 6 pages (Jun. 1986).
*PCT International Search Report,* regarding International Application No. PCT/US00/33010, dated Jun. 12, 2000, DataTreasury Corporation et al., 4 pages.
*FSTC—Financial Services Technology Consortium,* PowerPoint Presentation Ansi6v4[1].ppt, pp. 1-27 (no date available).
*Bank Automation News,* Phillips Business Information, vol. 9, Issue 6, 1 page (Apr. 2, 1997).
*You Have Requested Data From 32 Answers—Continue? Y/(N): Y,* INSPEC, pp. 175-198 (2001).
*Declaration of Richard Jesmajian,* In re the Patent of Claudio R. Ballard, Data Treasury Corporation, 3 pages (2005).
Element by Element Comparison of Claims 1-41 of the '988 Patent to the ANSI/ABA X9.46-1995 Document, Alone and in Combination with the Newly Cited and Previously Cited Prior Art, Document LA1714395v.2, pp. 1-22 (no date available).
Element by Element Comparison of Claims 42-45 of the '988 Patent to Minoli "Imaging in Corporate Environments," Document LA1714405v.1, pp. 1-4 (no date available).
Element by Element Comparison of Claims 1-41 of the '988 Patent to Campbell, et al. (U.S. Pat. No. 5,373,550), Document LA1716834v. 5, pp. 1-25 (no date available).
Element by Element Comparison of Claims 42-45 of the '988 Patent to Campbell, et al. (U.S. Pat. No. 5,373,550), Document LA1717430v. 1, pp. 1-4 (no date available).
Element by Element Comparison of Claims 46-50 of the '988 Patent to Geer, et al. (U.S. Pat. No. 5,930,788), Document LA1719647v.1, pp. 1-4 (no date available).
Element by Element Comparison of Claims 46-50 of the '988 Patent to Campbell, et al. (U.S. Pat. No. 5,373,550), Document LA1714416v. 1, pp. 1-3 (no date available).
*ImagePlusTM—Image Solutions—Capture your Imagination,* Brochure, IBM Corporation, 13 pages (1991).
*Citibank, New Castle Installation,* one page (no date available).
*JPMorgan Chase and DataTreasury Settle Patent Dispute,* Company Announcement, DataTreasury Corporation, http://www.finextra.com/fullpr.asp?pf=y&id=4989, downloaded Jul. 25, 2005, one page.
Padgett, T., *Melville, N.Y.-Based DataTreasury Fights J.P. Morgan Chase over Patent,* Newsday, Oct. 22, 2003, 4 pages.
*Check Technology Case Stays in Texas, IP Law Bulletin,* Oct. 13, 2005, 4 pages.
"*3174 Configuration,*" http://www.commercecomputer.com/3174.html, downloaded Oct. 7, 2002, Commerce Computer Corporation, 3 pages.
Ten Dyke, R.P., "Books," *IBM Systems Journal,* vol. 29, No. 1, pp. 489-490, 1990, 2 pages.
"*Check Clearing for the 21st Century Act: Frequently Asked Questions about Check 21,*" http://www.federalreserve.gov/paymentsystems/truncation/faqs.htm, downloaded Oct. 26, 2005, The Federal Reserve Board, 2 pages.
"Frequently Asked Questions on Drive Space Issues," *Drive Space FAQ,* date unknown, 1 page.
"Financial Services Technology Consortium—Interbank Check Imaging Project—White Paper (Draft)," *FSTC,* pp. 1-29, Jun. 20, 1994, 29 pages.
"IBM 3995 Optical Library Dataserver—Economical, high-capacity, removable optical storage," *IBM Corporation,* 1991, 4 pages.
"IBM's ImagePlus eases transformation of the Worker's Compensation Board," *IBM Corporation,* 1991, 2 pages.
"IBM ImagePlus Fact Sheet," *IBM Corporation,* 1991, 2 pages.
"IBM's ImagePlus key to improving Royal Trust's customer service,", *IBM Corporation,* 1991, 2 pages.
Cahill, T.P., "*Image Processing Applications at the Chase Manhattan Bank,*" date unknown, 2 pages.
"*Image Archive Forum—Payments System Task Force—Introduction,*" 1998, 52 pages.
"IBM's ImagePlus: Making USAA's 'Impossible Dream' a reality," *IBM Corporation,* 1991, 3 pages.
Graf, R.F., "*Modern Dictionary of Electronics,*" 6th Edition, 1997, 5 pages.
Nugent, W.R., "*Specifications for a Stack Droid: Robotics Required for Large Libraries of Digitized Images on Optical Disk,*" date unknown.
Kniskern, J.M., "*Strategic Rethinking,*" date unknown, 6 pages.
"Technical Volume: Check Image Processing Archive and Retrieval System," BancTec's Proposal to the Federal Reserve Bank of Boston, Jul. 8, 1994, 469 pages.
Brown, R.J., "FSTC Check Image Interchange Project Pilot Phase-1A: Preliminary Architecture and Project Plan", dated: Jun. 30, 1995, 34 pages.
"ANSI/ABA X9.46-1995, Draft version 0.13, American National Standard for Financial Image Interchange: Architecture, Overview and System Design Specification," American Bankers Association, American National Standards Institute, Inc., 1995, 229 pages.
"ANSI/ABA X9.46-1997, American National Standard for Financial Image Interchange: Architecture, Overview and System Design Specification." American Banker Association, American National Standards Institute, Inc., 1996, 245 pages.
"Imaging in Corporate Environments: Technology and Communication," Daniel Minoli, McGraw Hill, 1994.
"820 Payment Order/Remittance Advice" Version: X12-4010, pp. 1-61, Sep. 2005.
"835 Health Care Claim Payment/Advice" Version: 1.0 Final, pp. 1-70, Jul. 20, 2011.
"A Primer on HIPAA and the ACH Network," Banking Industry HIPAA Task Force, pp. 1-34.
"ACI Proactive Risk Manager™ for Enterprise Risk—Product Flyer," ACI Universal Payments, www.aciworldwide.com, 4 pages, 2016.
Arnold B. et al., "Increasing eBilling in the Healthcare Industry Without Running Afoul of Privacy Laws," 2011 Payments, pp. 1-29, Apr. 3-6, 2011.
"Authentication in an Internet Banking Environment," Federal Financial Institutions Examination Council, http://www.ffiec.gov/pdf/authentication_guidance.pdf, pp. 1-14, published 2005.
"CAQH Committee on Operating Rules for Information Exchange (CORE), Phase III CORE EFT & ERA Operating Rule Set," pp. 1-138, Jun. 2012.
Department of Health and Human Services, Federal Register, vol. 77, No. 6, pp. 1556-1590, Jan. 10, 2012.
"Guardian Analytics FraudDESK," Guardian Analytics, www.guardiananalytics.com, 2 pages, 2016.
Gwendolyn Lohse et al., "Federal Operating Rules for Healthcare Administrative Simplification," 2011 Payments, NACHA—The Electronic Payments Association, pp. 1-32, Apr. 3-6, 2011.
"Healthcare in the Electronic Environment, Payment, Information and Communication Within the Revenue Cycle," Alacriti Clearwave, 2011 Payments, pp. 1-30, Apr. 3-6, 2011.
Henry Ijams et al., "Evaluating ePayables Opportunities to Improve A/P Efficiencies," pp. 1-28, Jun. 22, 2011.

(56) References Cited

OTHER PUBLICATIONS

Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.
J. Estep, "Ninth National Medical Banking Institute, The Growing Collaboration of eHealth and Medical Banking, Banks Engaging in Healthcare Reform," pp. 1-20, Feb. 21, 2011.
J. Steven Stone et al., "Healthcare Reform: What Does It Really Mean for Banks?," NACHA, pp. 1-37, 2011.
J.P. Morgan, "Addressing the Administrative Cost Trajectory in a New Environment," Post-Reform Opportunities for Healthcare Payments, pp. 1-14, Apr. 27, 2010.
Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.
Matt Brodis et al., "Best Practices for Migrating Healthcare Payments to ACH," pp. 1-39, Apr. 3-6, 2011.
Matthew Smith and Victoria Terekhova, "Electronic Payments in Healthcare: Overcoming the Challenges," pp. 1-25, Apr. 3-6, 2011.
"Ninth National Medical Banking Institute, The Growing Collaboration of eHealth and Medical Banking, HIMSS G7 Operating Rules in Healthcare," pp. 1-11, Feb. 15, 2011.
"Payment Trends in the Healthcare Industry," A Survey of Healthcare Providers, pp. 5-38, Fall 2010.
Priya Malhotra, "Clearing House Enumerates e-Payment Ills," American Banker, 4 pages (Aug. 13, 2002).
Richard D. Marks, "Ninth National Medical Banking Institute, The Growing Collaboration of eHealth and Medical Banking, Health Record Banking: Changing the Game for Healthcare Information Technology, An Analysis of Checking Accounts for Health Information," pp. 1-13, Feb. 10, 2011.
Robert Hunter, "Letter Re: CMS-0024-IFC, Adoption of Standards for Health Care EFTs and Remittance Advice," pp. 1-10, Mar. 12, 2012.
Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.
Russ Waterhouse, "National Committee on Vital and Health Statistics (NCVHS) Subcommittee on Standards, Administrative Simplification Under the Patient Protection and Affordable Care Act, Standards and Operating Rules for Electronic Funds Transfer (EFT) and Remittances Advice (RA)," The Clearing House, pp. 1-5, Dec. 3, 2010.
Russ Waterhouse et al., "The Healthcare Payments Solution: What's in It for the Banking Industry," NACHA Payments 2011, pp. 1-17, Apr. 5, 2011.
"SAS® Fraud Management—Real-time scoring of all transactions for fast, accurate fraud detection," Product Brief, SAS, www.sas.com, 6 pages, 2015.
"Supplement to Authentication in an Internet Banking Environment," Federal Financial Institutions Examination Council, http://www.ffiec.gov/pdf/auth-its-final%206-22- 11%20(ffiec%20formated).pdf, pp. 1-12, published 2011.
"Suspicious Activity Monitoring—Anti-Money Laundering Solutions," NICE-Actimize, www.niceactimize.com, 4 pages, Mar. 15, 2014.
The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.
The Clearing House, "Healthcare EFT Enrollment, Stakeholder Meeting Materials," NACHA—The Electronic Payments Association, pp. 1-43, Mar. 25, 2011.
The Clearing House, "Healthcare EFT Enrollment, Stakeholder Meeting: Pre-read Materials," NACHA—The Electronic Payments Association, pp. 1-21, Mar. 25, 2011.
The Clearing House, "Mayo Clinic Interview," Healthcare EFT Enrollment, NACHA—The Electronic Payments Association, Healthcare EFT Enrollment, pp. 1-6, Mar. 14, 2011.
U.S. Office Action for U.S. Appl. No. 15/488,848 dated Aug. 7, 2019.
U.S. Appl. No. 14/926,112, filed Oct. 29, 2015 entitled "Secure Payment Processing".
U.S. Appl. No. 15/970,058, filed May 3, 2018 entitled "Bill Pay Service With Federated Directory Model Support".

* cited by examiner

ELECTRONIC PAYMENT CLEARING AND CHECK IMAGE EXCHANGE SYSTEMS AND METHODS

CROSS-REFERENCE TO RELATED APPLICATIONS

This application is a divisional of U.S. patent application Ser. No. 14/229,326 filed on Mar. 28, 2014, now U.S. Pat. No. 9,799,011, issued Oct. 24, 2017, which is a divisional of U.S. patent application Ser. No. 10/768,821, filed on Jan. 30, 2004, now U.S. Pat. No. 8,725,607, issued May 13, 2014, the disclosures of each of which are hereby incorporated by reference in their entirety, as if fully set forth herein.

BACKGROUND OF THE INVENTION

Field of the Invention

The present invention relates generally to electronic payment and check presentment systems and methods, and more particularly, to centrally accountable peer-to-peer payment clearing, electronic check presentment and the exchange of digital check images. The present invention also generally relates to a distributed system architecture for implementing these systems and methods.

Related Art

Various programs are being implemented by financial institutions to transition the traditional paper check collection and return process into an electronic process. Such efforts are being undertaken to reduce the costs, time delays, and other problems associated with the processing of the over 40 billion paper checks collected per year in the United States.

In the conventional, paper-based check collection system, most paper checks are physically delivered by the writer of the particular check (i.e., the payor) to the person or entity to whom the check is made out (i.e., the payee). The check is deposited in the payee's financial institution, which is referred to as the bank of first deposit or the depositary bank. The check is physically delivered by the depositary bank to the bank on which the check is drawn (i.e., the paying bank) and ultimately back to the payor. Generally, checks delivered to a paying bank are accompanied by a cash letter, which lists all of the checks being delivered and information about each check, including the amount of the check. Delivering the paper check from the depositary bank to the paying bank can involve numerous check sorting processes and multiple intermediary collecting banks as the check moves through the collection process. If the check for some reason is not honored by the paying bank, e.g., because the payor has insufficient funds, then the check travels back to the depositary bank and the payee.

This check collection system, in which billions of paper checks are physically shuffled back and forth among various entities, entails significant costs and time delays. Moreover, due to banking regulations, the collection process must take place within strict schedules. For example, the paying bank has only one to one and a half days from the time a check is presented to decide whether to return the check and recover its payment before the check is final. Also, the payee may lose interest for each day's delay in the collection process. Of course, the collection process is vulnerable to physical phenomenon, such as transportation delays caused by severe weather.

Electronic check presentment (ECP) is one type of electronic system that is being used to supplement the traditional paper check collection process. Currently, in ECP, the depositary bank or a collecting bank electronically reads from each paper check the account number, routing transit number (RTN), dollar amount and check number, which are printed on the check in a magnetic ink character recognition (MICR) line (this information is referred to as the "MICR information"), and possibly other information as well. This information is used to create a separate electronic record, referred to as an electronic check or cash letter, that is sent to the paying bank. The original paper checks are often sent at a later time.

For example, a depositary bank may electronically send an electronic cash letter for checks deposited on Monday, which will reach the paying bank by Monday evening. The paper checks usually arrive at the paying bank by the next day (Tuesday), in time for the returns process. After the paying bank receives the paper checks and reads the MICR data from them, it reconciles the paper checks with the electronic cash letter received earlier to determine missing or free items. The items to be returned, e.g., for lack of funds on deposit, are pulled and returned to the depositary bank. However, one disadvantage of this process is that it is not entirely paperless, that is, it still requires the movement of paper checks.

To reduce the movement of paper checks, check image exchange, also referred to as check truncation, has been generally proposed as an alternative. In check truncation, at some point in the check clearing process before the paper check reaches the check writer's bank, a digital image of the paper check is produced and sent in lieu thereof for further processing. The original paper check may then be stored and/or destroyed. However, check truncation has so far been limited in actual practice, for example, to imaging cancelled checks, and replacing conventional customer statements with on-line statements in which a check writer may view images of cancelled checks through the Internet, and if desired, selectively print them out. It would thus be desirable to have the checks truncated earlier in the clearing process, and specifically, to implement an ECP system with check truncation at the bank of first deposit, or at an intermediary bank, such as a clearing house or a Reserve Bank.

Another disadvantage relates to the architecture of the current ECP system. In particular, as shown in FIG. 1, one known and widely-used ECP system is based on a hub and spoke configuration. In this configuration, all electronic cash letters 100 are transmitted by the "spoke" depositary or collecting banks 102 (e.g., Bank A) to a central hub, switch 110, to be routed to "spoke" paying banks 104 (e.g., Banks B, C, and D). A number of cash letters 100, each of which is directed to a different paying bank 104, may be combined in a single electronic cash letter file 115 with a single file header 105. Upon receiving an electronic cash letter file 115, switch 110 deletes the file header 105, separates the combined file 115 into separate electronic cash letter files 120 for each paying bank, provides a new file header 125 for each file, and sends each file 120 into a separate queue 130 for each corresponding paying bank 104. The paying banks 104 then periodically retrieve the electronic cash letters 120 from their particular queue 130. Switch 110 also performs certain quality control functions, e.g., preventing processing of duplicate files, and reporting functions.

However, a hub and spoke configuration disadvantageously results in latency in the transfer of electronic cash letters due to processing time required at the central hub (switch). Such delays are particular significant if the electronic cash letter file is accompanied by check image data, as would be in an image exchange system. In addition, the operation of the central hub involves substantial redundant expense, because it must have the capacity to process every transaction in every file, even though each collecting and paying bank must process the transactions for its own purposes. Furthermore, this additional central processing is not necessary for the routing of transaction files, because modem telecommunications networks are capable of delivering files transmitted under protocols such as TCP/IP peer-to-peer, that is, without a central hub. In fact, such a central hub increases the risk of system wide failure for a payment clearing network because its failure would render the entire network unusable. To counter this vulnerability, payments network operators have had to create even more redundant systems at great expense.

Similar hub and spoke systems are used to clear other types of electronic payments (EP), including those initiated electronically or by use of credit or debit cards. These electronic payments are usually cleared in a manner similar to current ECP methods as described above. Payment system operators in the United States and most other countries operate separate, dedicated, specialized payment switches for each type of payment, including automated clearing house (ACH) entries, Giro transfers, credit card transactions and debit card transactions.

Most of these payment systems require the transmission of files including payment data, which may or may not be destined for multiple paying financial institutions, to a centralized payment switch. The payment switch separates transactions into distinct files for each paying institutions, which are then transmitted to the intended recipient or placed in a queue for later retrieval. Again, the use of a hub and spoke configuration in EP systems presents similar problems as described above in regard to ECP systems.

Accordingly, it would be desirable to have a system configuration that overcomes the problems associated with a hub and spoke configuration. Further, it would also be desirable to use such a system to process ECP data (with or without check images), EP data, or both.

SUMMARY OF THE INVENTION

It is an object of the present invention to overcome or mitigate the above problems associated with the prior electronic payment and electronic check presentment systems.

In one aspect of the present invention, a system and corresponding method are provided. The system includes a plurality of first entities (such as banks), each first entity communicatively connected to at least one distributed traffic agent (DTA), a second entity (such as a central facility) communicatively connected to a DTA, and a communication network communicatively connecting the DTAs. A payload containing a data file (such as electronic check presentment data, electronic payment data, or any other data type) is communicated from one first entity to another through their respective DTAs via the communication network. In addition, a transmittal containing control information corresponding to the payload is communicated from the one first entity to the second entity through their respective DTAs via the communication network.

These and other objects and aspects will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
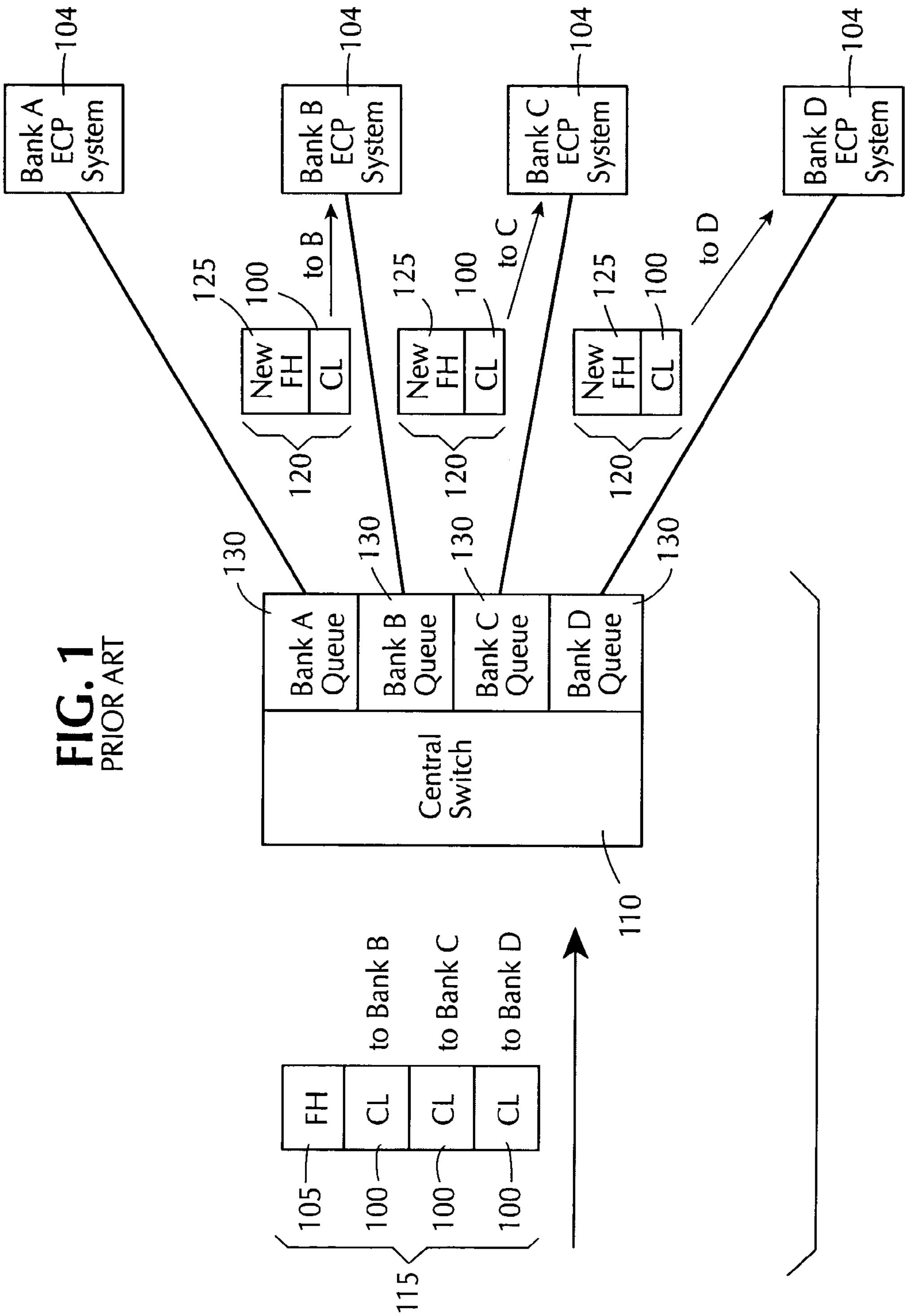
FIG. 1 is a block diagram of a known and conventional electronic check presentment (ECP) system in which electronic check letters are sent to a central switch for distribution to paying banks.

A "payload" is a file of data, and may include, as discussed below, a large account table file, any type of ECP data file, an electronic payment (EP) data file, or any other financial or non-financial-related data file, or any combinations thereof.

A "message" is a set of control and/or summary information used to control and to communicate information regarding transmission of payloads.

A "transmittal" is a message containing information associated with a payload, and specifically may contain information identifying the sender and receiver of the payload and/or summary information used to validate the integrity and contents of the payload.

The system of the present invention communicates payloads and corresponding transmittals using a distributed, intelligent architecture, to obtain the benefits of central control and coordination of the prior art central switch without the above-discussed disadvantages of a hub and spoke configuration. Payloads of electronic check data (with or without image data), electronic payment data, or any other type of data are exchanged peer-to-peer between participating banks or other entities, thus eliminating or reducing the latency associated with processing the same via a central switch, the redundant processing among the banks and central switch, and the risk of system-wide failure. Communicating transmittals containing control, tracking and like information, corresponding to the payloads, to a central control facility retains the centralized control and coordination benefits of the central switch.

In particular, each outgoing payload is designated for at least one receiving (or destination) bank or entity. A sending distributed traffic agent (sending DTA) accepts the outgoing payload from the payment and/or check processing computer system of a sending (or originating) bank or entity. A network address module obtains a network address for the destination bank. The outgoing payload is re-formatted according to a protocol of the network by the sending DTA, and transmitted with a transmittal via the network to the network address of the destination bank.

A receiving DTA receives an incoming payload via the network from a sending bank, re-formats it according to the format of the receiving bank's payment and/or check processing computer system, and passes the re-formatted payload thereto.

A sending/originating bank can also be a receiving/destination bank, and vice-versa, and the system can be implemented with both sending and receiving functionality.

The network address module may be configured to obtain network address of the destination bank from a central facility via the network, or from a routing transit number (RTN) of the destination bank. Conversely, the network address module may obtain the RTN of the originating bank from the central facility via the network, or from the network address of the originating bank.

The DTA may also divide each outgoing payload into a plurality of single destination outgoing payloads, in accordance to the respective destination banks, if the outgoing payload contains data destined for more than one destination bank. In addition, a priority may be assigned to the outgoing payloads. The priority determines the order in which the outgoing payloads are processed at the respective destination banks.

A network interface module may transmit control data via the network to a central facility, the control data being computed from the outgoing payload. The central facility may reconcile the control data computed from the outgoing payload with control data received from the originating bank.

More preferably, this control data is included in a separate transmittal message, as discussed above, which is uniquely associated with a payload. By using a transmittal message that is separate from the payload, the need for the central facility DTA to process payload data itself can be eliminated or reduced substantially. Control data can also be used for system-wide purposes such as management reporting, settlement and risk management, all without requiring centralized processing of the payload. The control data can also be used to prevent the transmission of duplicate files, files not consistent with defined business rules such as processing dates, deadlines or inter-bank exchange partnerships.

As used herein, the term "module" refers to any combination of computer hardware and software that is configured to carry out a specified function. For example, a module may be a portion of a software program, e.g., a subroutine, executing on a general purpose personal computer or workstation. A module may also may include hardware such as, for example, memory components (e.g., RAM, ROM, etc.), data buses, integrated circuits (ICs) for performing synchronous or asynchronous data input and output, ICs for performing computer network data transmission and reception, and application-specific integrated circuits (ASICs).

Figure 2:
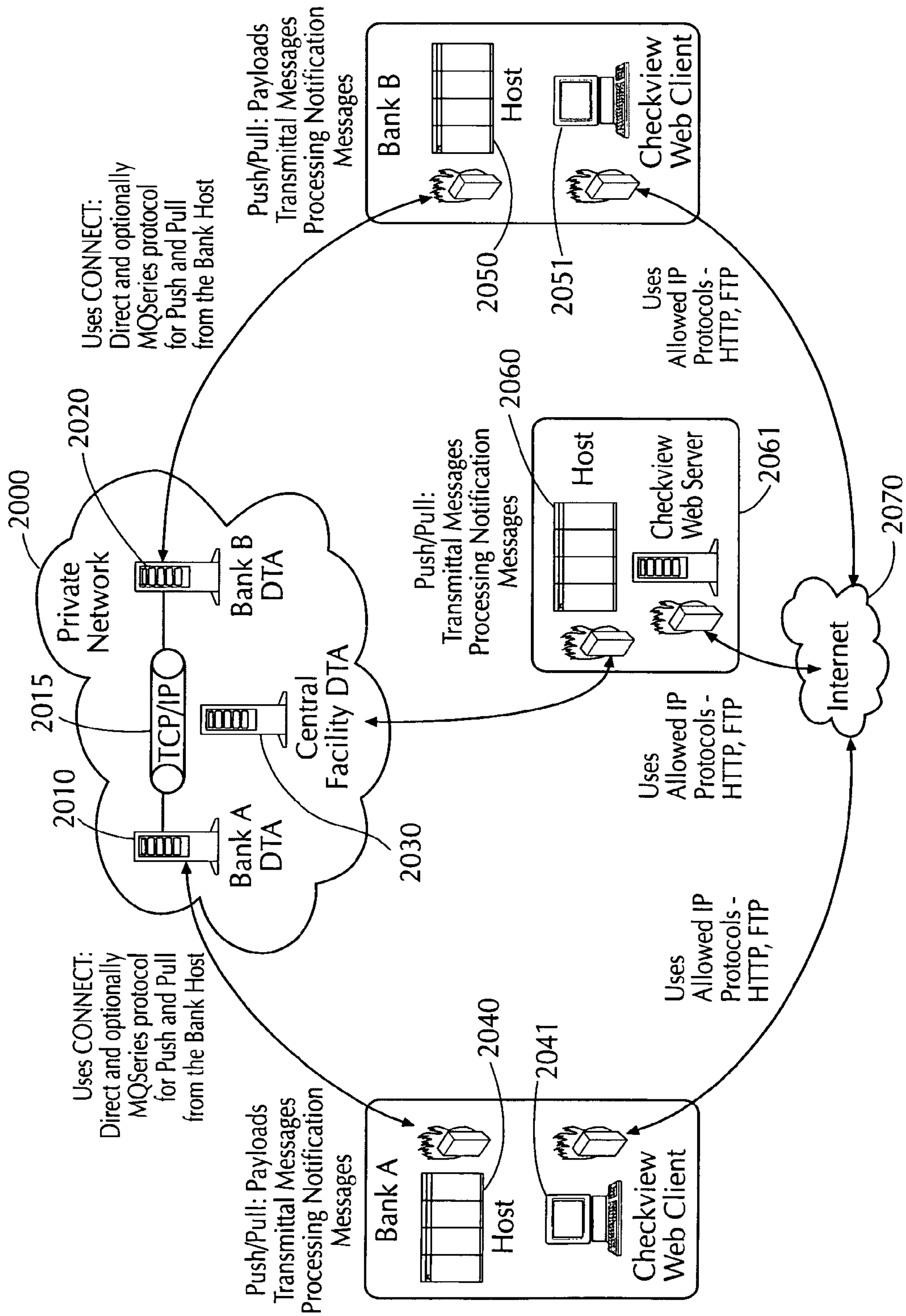
FIG. 2 depicts the architecture of an embodiment of the present invention.

The architecture of the system of the present invention is depicted in FIG. 2, and comprises a private network 2000 communicatively connecting the banks' systems (for example, Bank A's system 2040 and Bank B's system 2050) and the central facility system 2060. DTAs are the connecting points into the private network 2000. Each DTA is associated with a single entity (bank or central facility). However, there may be multiple DTAs assigned to each entity.

Bank A's system 2040 communicates payloads, transmittal messages, and processing notification messages to and/or from Bank A's DTA 2010 through a firewall. Similarly, Bank B's system 2050 communicates payloads, transmittal messages and processing notification messages to and/or from Bank B's DTA 2020 through a firewall. To send this information, each entity may access a DTA via a push/pull process, for example, using CONNECT:Direct (known software from Sterling Commerce used to perform file transfers between member banks and the private network; messages may be transferred if written as files). Messages (only) may be optionally moved with MQSeries send/receive queues. Bank A's DTA 2010 and Bank B's DTA 2020 communicate the payloads to each other, through, for example, a TCP/IP link 2015.

The banks DTAs 2010 and 2020 also transmit transmittal messages and processing notification messages to and/or from the central facility DTA 2030 via the TCP/IP link 2015. These messages in turn are communicated to/from the central facility system 2060, also via the push/pull process (e.g., via Connect:Direct) or via the MQ Series send/receive queues.

As is readily apparent to those skilled in the art, this system does not use a hub and spoke configuration, nor has its attendant disadvantages, as the relatively large payloads of data are neither transmitted through nor processed by a central hub. They are instead transmitted bank to bank via the network. Further, only a relatively small amount of control information, via transmittal and processing notification messages, are communicated to and from a central facility and to the banks, which provides the central control and coordination benefits of the hub and spoke system. In addition, because this system does not require centralized processing of the payload data itself, it can also accommodate different types of payload data (ECP, EP, or any other data) without requiring significant reprogramming or changes in the basic communication and control process.

To allow the banks to view of control data of the transmittal/processing notification messages, and information generated therefrom, a Checkview web server 2061 is operatively connected to the central facility system 2060 and, through a firewall, to a public network (Internet) 2070. Bank systems 2040 and 2050 each have a Checkview web client, respectively 2041 and 2051, operatively connected thereto, and through a firewall, to the Internet 2070. The communication links to the Internet 2070 use standard IP protocols, such as HTTP, FTP, etc. The Checkview web server 2061 provides the control data and related information via the Internet to the Checkview web clients 2041 and 2051 for bank access and viewing of the same.

Figure 3:
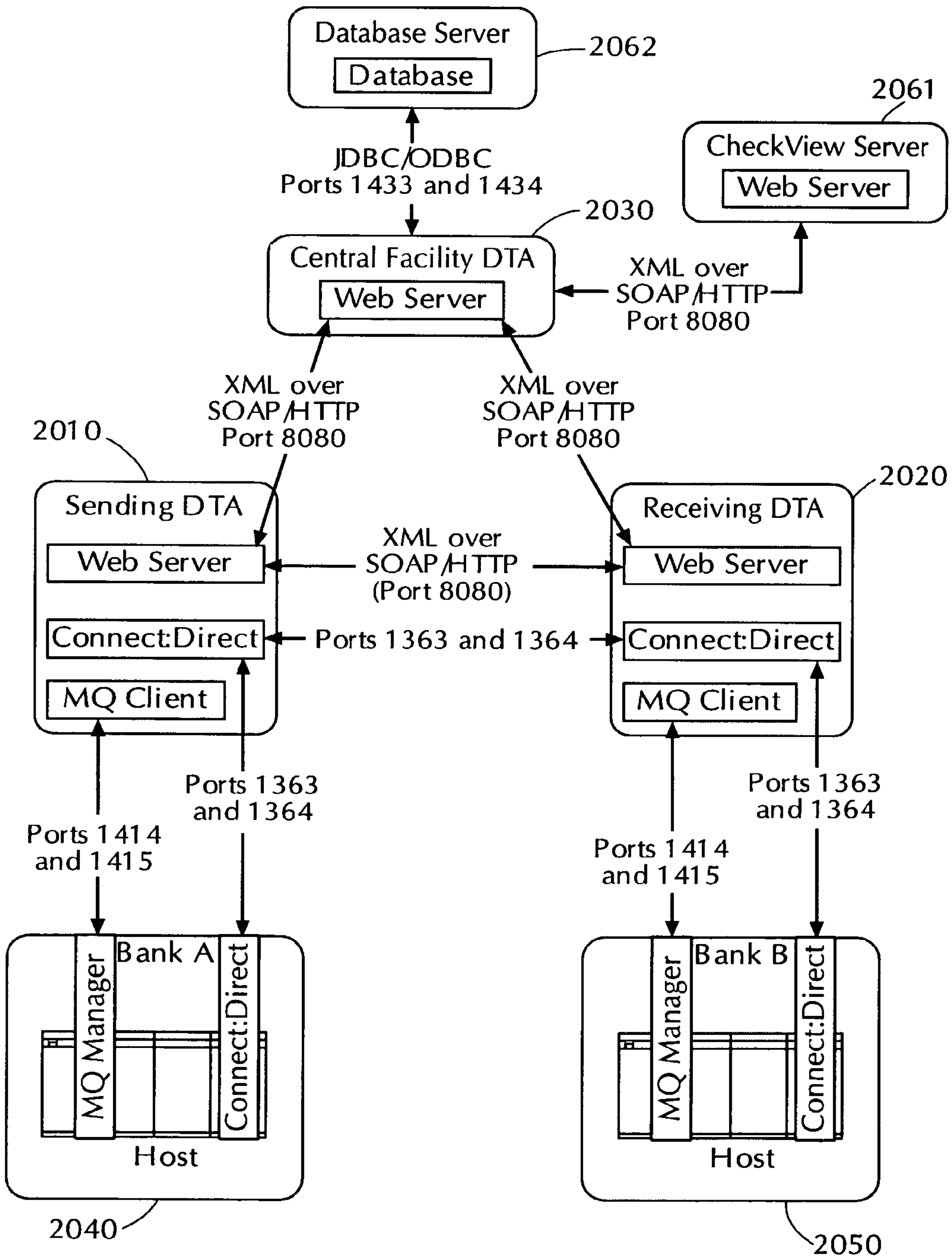
FIG. 3 depicts the communication protocols of an embodiment of the present invention.

FIG. 3 depicts exemplary communication languages and protocols among Bank A's DTA 2010 (configured as a sending DTA), Bank B's DTA 2020 (configured as a receiving DTA), central facility DTA 2030, Bank A's system 2040, Bank B's system 2050, as well as between the central facility DTA 2030 and the central facility system's database server 2062, and between the central facility DTA 2030 and the central facility system's Checkview server 2061.

Figure 4:
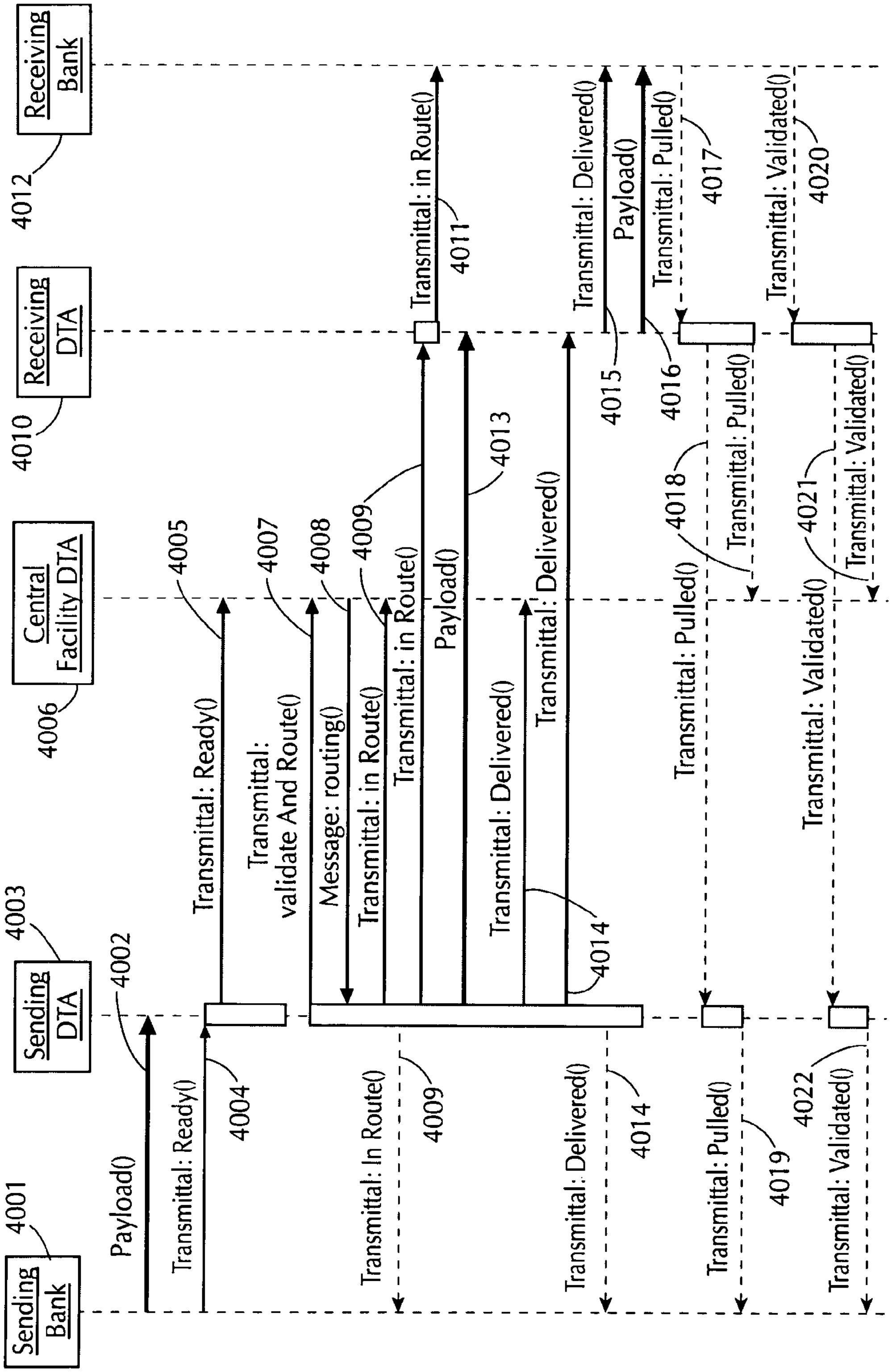
FIG. 4 depicts the payload and transmittal flow of an embodiment of the present invention.

FIG. 4 depicts the payload and transmittal events and flows in a preferred embodiment of the present invention. The sending bank 4001 is a financial institution that initiates the sending of a new payload 4002. The new payload is sent by the sending bank 4001 to the sending DTA 4003 associated with the sending bank 4001, via a bank-developed Connect:Direct script. Once a payload has been transmitted to the sending DTA 4003, the sending bank 4001 must also send a transmittal message 4004, via a bank-developed Connect:Direct script or via an MQSeries message queue, to the sending DTA 4003 to initiate the transfer of the payload 4002. (Not shown are the processing notification messages associated with the payload/transmittal that are communicated back to the sending bank 4001 as discussed above. These processing notification messages are used to notify the sending bank of any problems associated with the transmittal during validation, or of any problems associated with communications to other DTAs in the private network.)

Once the new transmittal has been recognized by the DTA software application, a notice 4005 of new transmittal (and associated payload) entering the system is sent to the central facility DTA 4006. The central facility DTA 4006 is used to track all the activity within the private network. Control totals and activity times are tracked to provide for processing flow activity and settlement information. After the sending DTA 4003 validates that a payload can be transmitted, a request 4007 is sent to the central facility DTA 4003 to do final validation (e.g., duplicate checking), and to get the assigned routing for the receiving DTA 4010 (the DTA associated with the receiving bank 4012 which is to receive the new payload) to send the transmittal 4004 and associated payload 4002. The central facility DTA 4006 returns to the sending DTA 4003 the routing information 4008.

After the sending DTA 4003 has received the routing information 4008, the sending DTA 4003 generates and "inRoute" transmittal message 4009, which is sent to the sending bank 4001, the central facility DTA 4006, and the receiving DTA 4010, thereby signaling that the payload 4002 is in route to the receiving DTA 4010. In flow 4011, the receiving bank 4102 pulls up the inRoute transmittal message 4009 via Connect:Direct, or via an MQSeries message queue monitored by the receiving bank. In flow 4013, the payload 4002 is sent to the receiving DTA 4010 by the sending DTA 4003 via Connect:Direct.

After the payload has been successfully sent to the receiving DTA 4010, the sending DTA 4003 sends a "delivered" transmittal message 4014 to the sending bank 4001, the central facility DTA 4006, and the receiving DTA 4010 (which point in time may be defined as "check presentment"). In flow 4015, the receiving bank 4012 pulls up the delivered message via Connect:Direct, or via an MQSeries message queue monitored by the receiving bank. This is the signal to the receiving bank 4012 that a payload is ready for pull-up. In flow 4016, the payload is received from the receiving DTA 4010 by the receiving bank and pulled up via Connect:Direct. After successful completion of the transfer of the payload from the receiving bank DTA to the receiving bank's internal server, the receiving bank 4012 generates a "pulled" transmittal message 4017. This is basically the same transmittal message as "delivered", with the transmittal type changed from "delivered" to "pulled." Transmittal message 4017 is pushed to the receiving DTA 4010 via a Connect:Direct script, or via an MQSeries message queue. In flow 4018, the "pulled" transmittal message is forwarded on to the central facility DTA 4006 and the sending DTA 4001. In flow 4019, the sending bank 4001 pulls up the "pulled" transmittal message via Direct:Connect or via an MQSeries message queue monitored by the sending bank.

After successful completion of the payload validation process internal to the receiving bank 4012, the receiving bank generates a "validated" transmittal message 4020. This is basically the same transmittal message as "delivered", with the transmittal type changed from "delivered" to "validated." Transmittal message 4020 is pushed to the receiving DTA 4010 via a Connect:Direct script, or via an MQSeries message queue. In flow 4021, the "validated" transmittal message is forwarded on to the central facility DTA 4006 and the sending DTA 4001. In flow 4022, the sending bank 4001 pulls up the "validated" transmittal message via Direct: Connect or via an MQSeries message queue monitored by the sending bank.

Figure 5A:
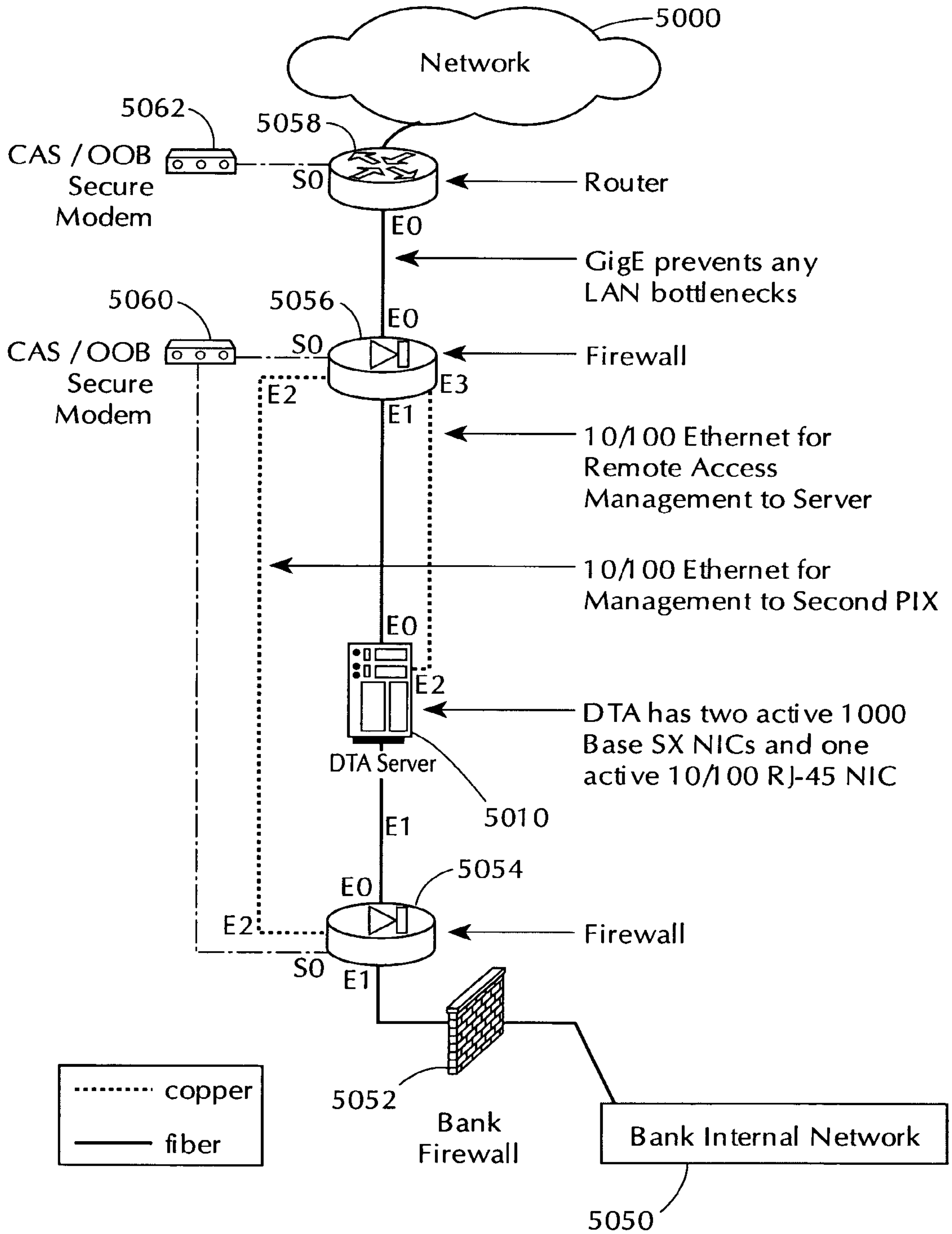
FIGS. 5*a*-5*f* depict various hardware configurations for embodiments of the present invention.
Figure 5B:
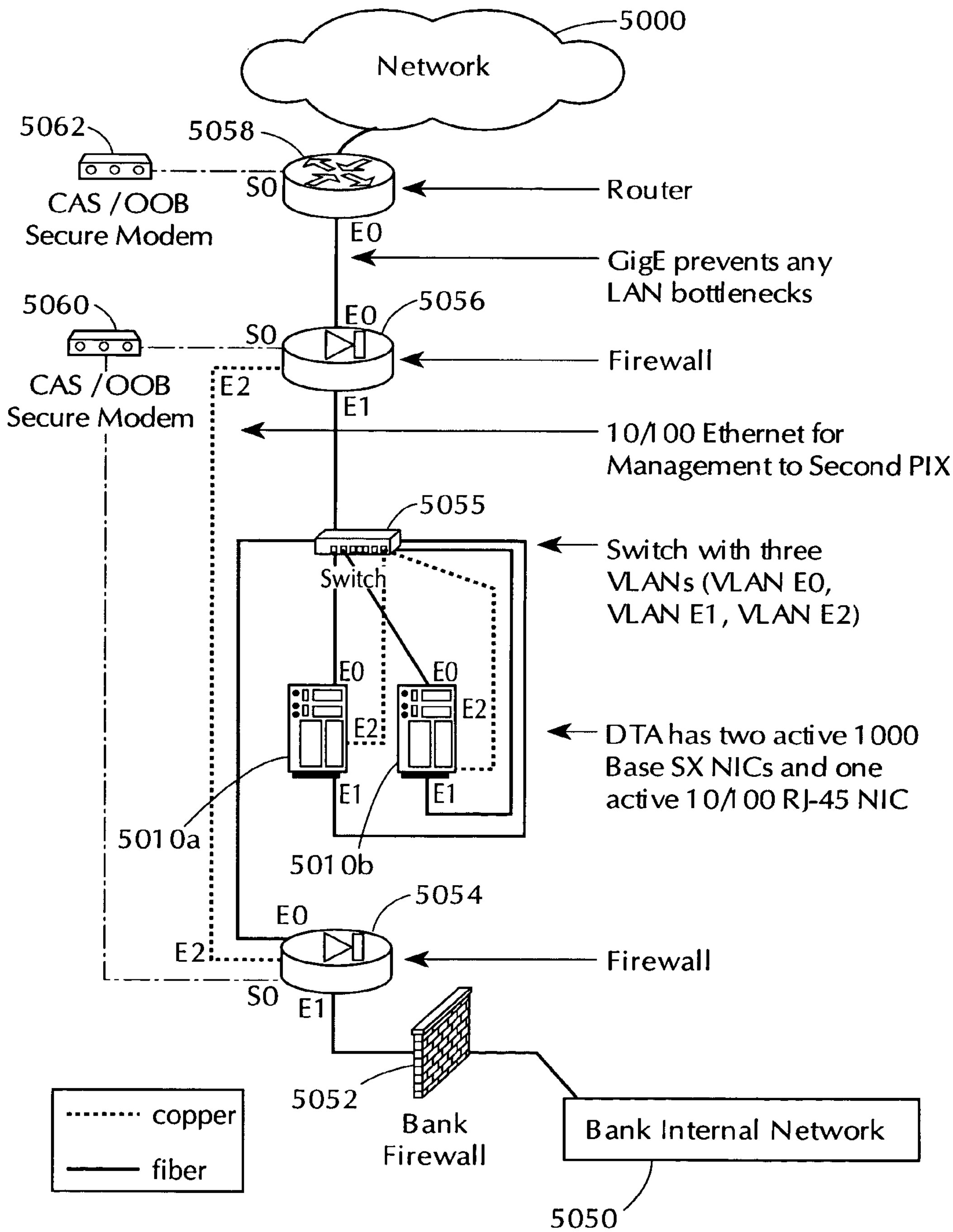
Figure 5C:
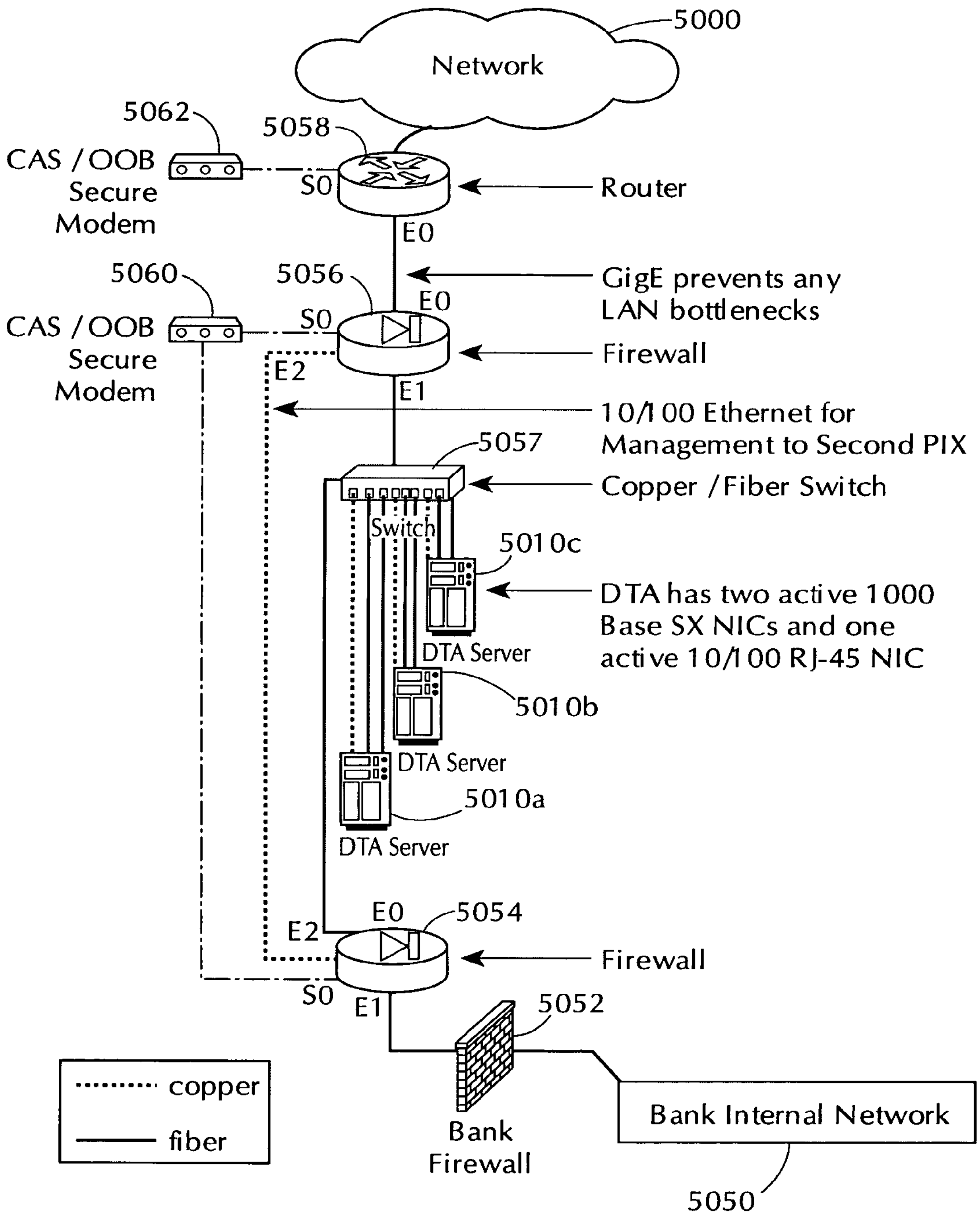
Figure 5D:
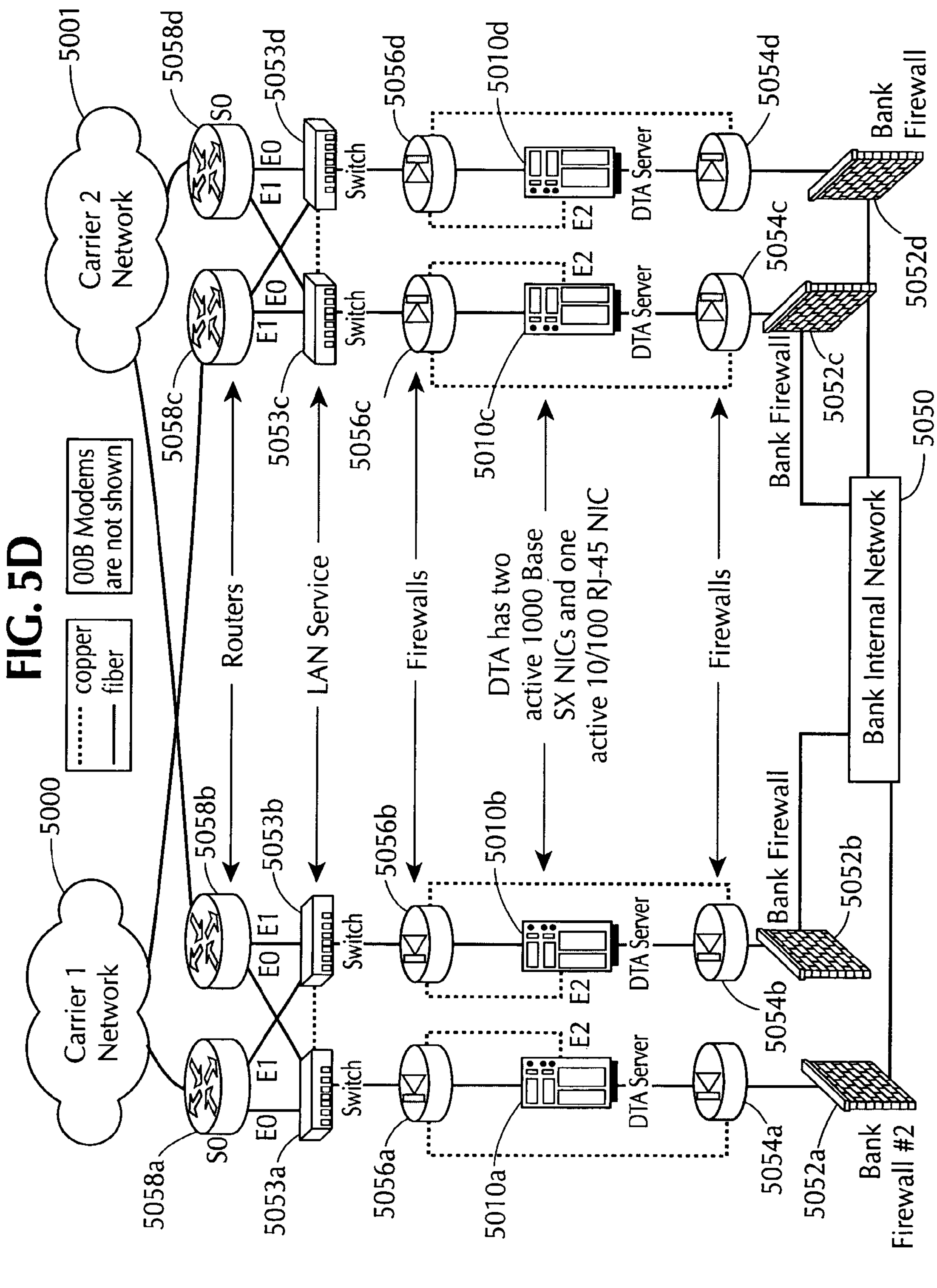
Figure 5E:
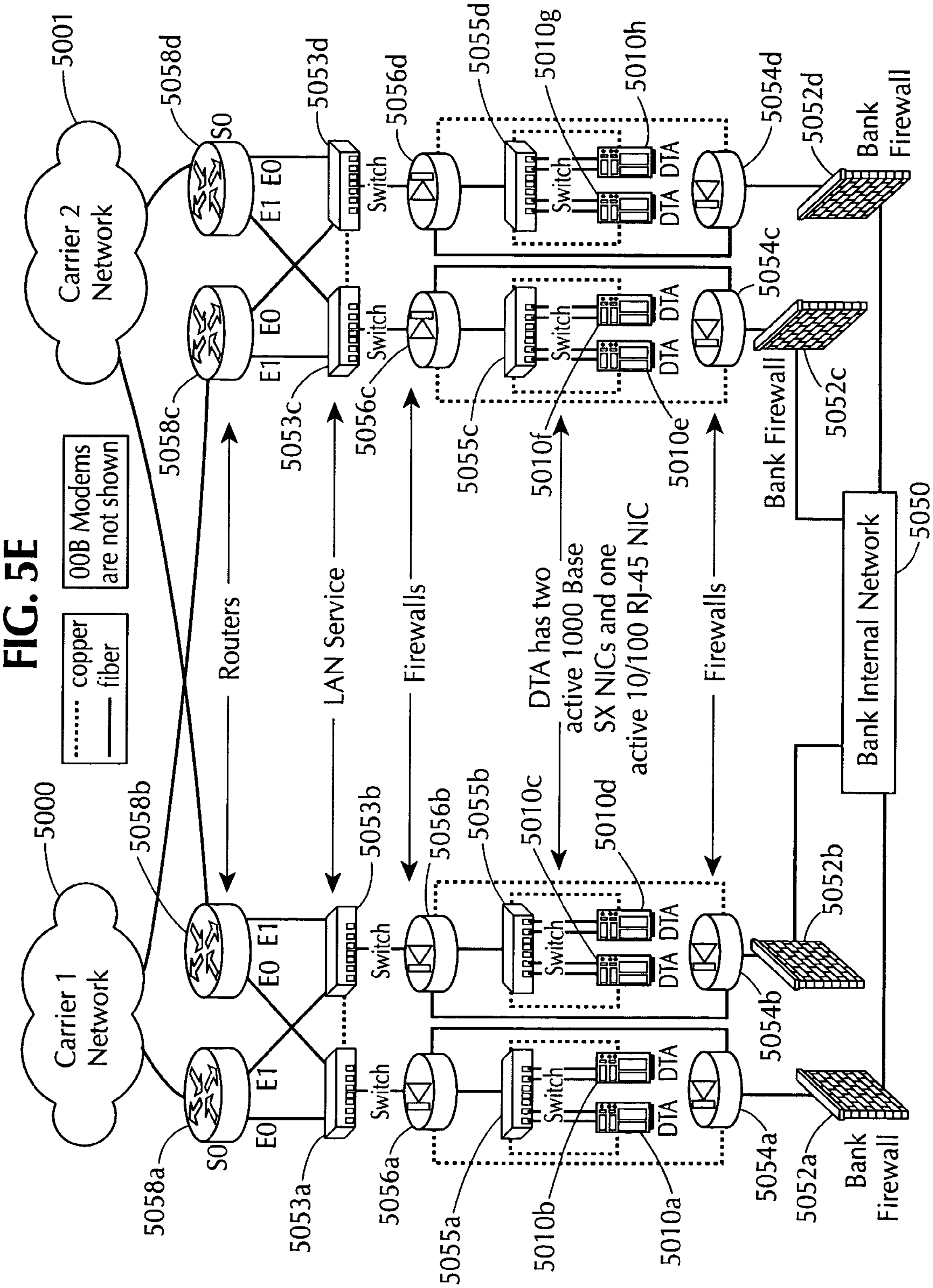
Figure 5F:
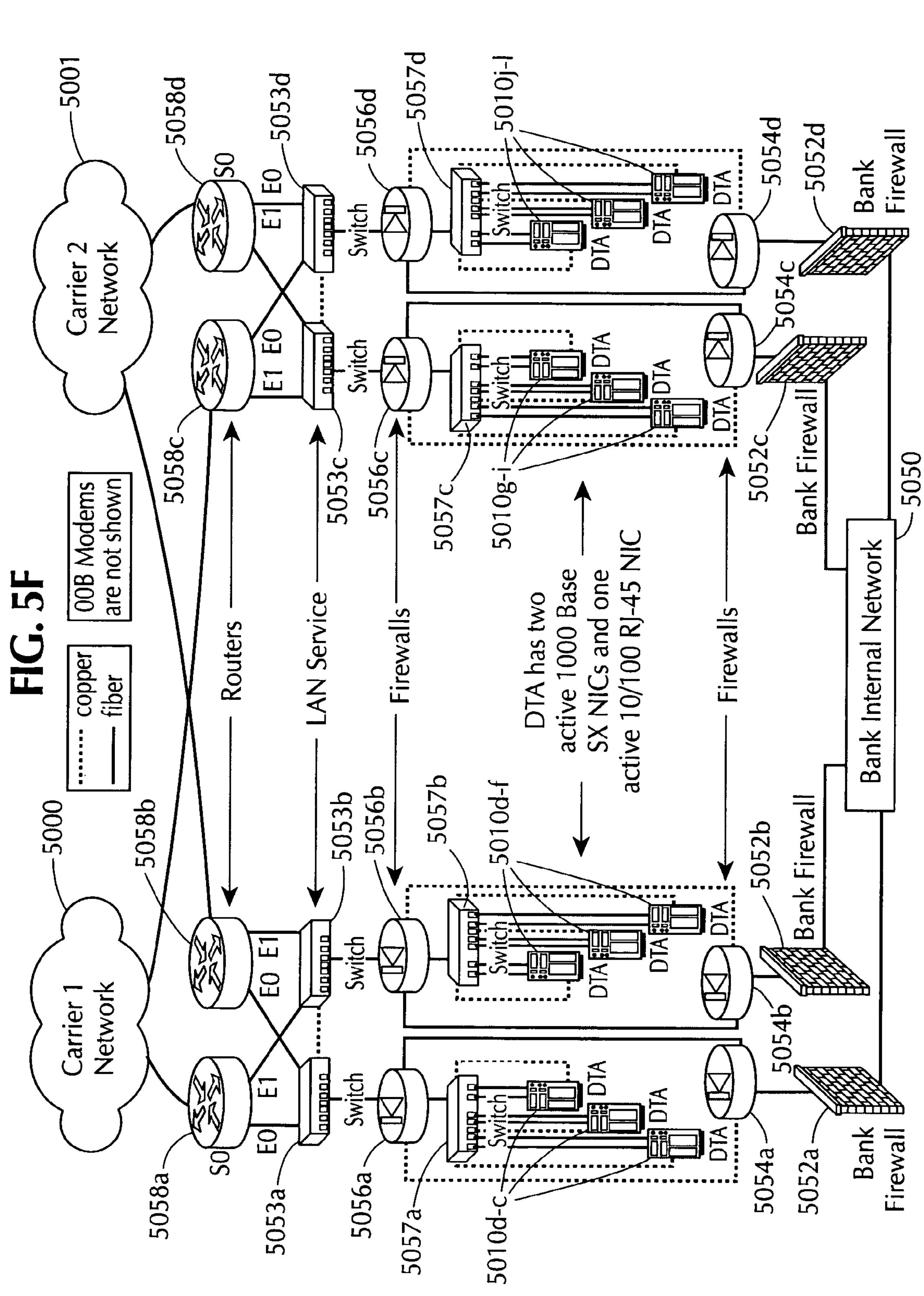

FIGS. 5*a*-5*f* depict preferred configurations for the DTA hardware and other network and communication hardware for a carrier's network 5000. In FIG. 5*a*, the bank's internal system 5050 (or network) is connected to a bank firewall 5052 using 1000 Base SX fiber ("fiber"), which in turn is connected, again via fiber, to a first network firewall 5054. The network firewall 5054 is connected via fiber to the DTA server 5010, which has two active 1000 Base SX NICs and one active 10/100 RJ-45 MC. The DTA server 5010 is connected to a second network firewall 5056, again via fiber. In addition, network firewalls 5054 and 5056 are connected via a 10/100 copper (Cat 5) Ethernet for management to second PIX, and the DTA server and the second network firewall are connected via 10/100 copper Ethernet for remote access management to the server. Both network firewalls 5056 and 5054 are communicatively connected to a CAS/OOB secure modem 5060. The second network firewall 5056 is connected via fiber to a network router 5058, which is also communicatively connected to a CAS/OOB secure modem 5062. The network router 5058 is connected to the carrier's network 5000. This hardware configuration represents a single carrier per data center, and a single DTA server per site. Other possible hardware configurations that may used in the present invention include for a single carrier per data center, two (FIG. 5*b*) or three (FIG. 5*c*) DTA servers per site, or for two carriers per data center, two (FIG. 5*d*), four (FIG. 5*e*) or six DTA servers per site. In these figures, components 5053, 5055, and 5057 are switches. As will be appreciated by one skilled in the art, other hardware configurations may be used.

For electronic check presentment (ECP), one implementation of the above system is provided in which ECP data are exchanged between banks via a network. In this system, a check processing device is provided for processing paper checks, including sorting the checks and generating ECP data. A check processing computer is connected to the check processing device to accept the ECP data and to generate outgoing payloads of ECP data files.

Figure 6:
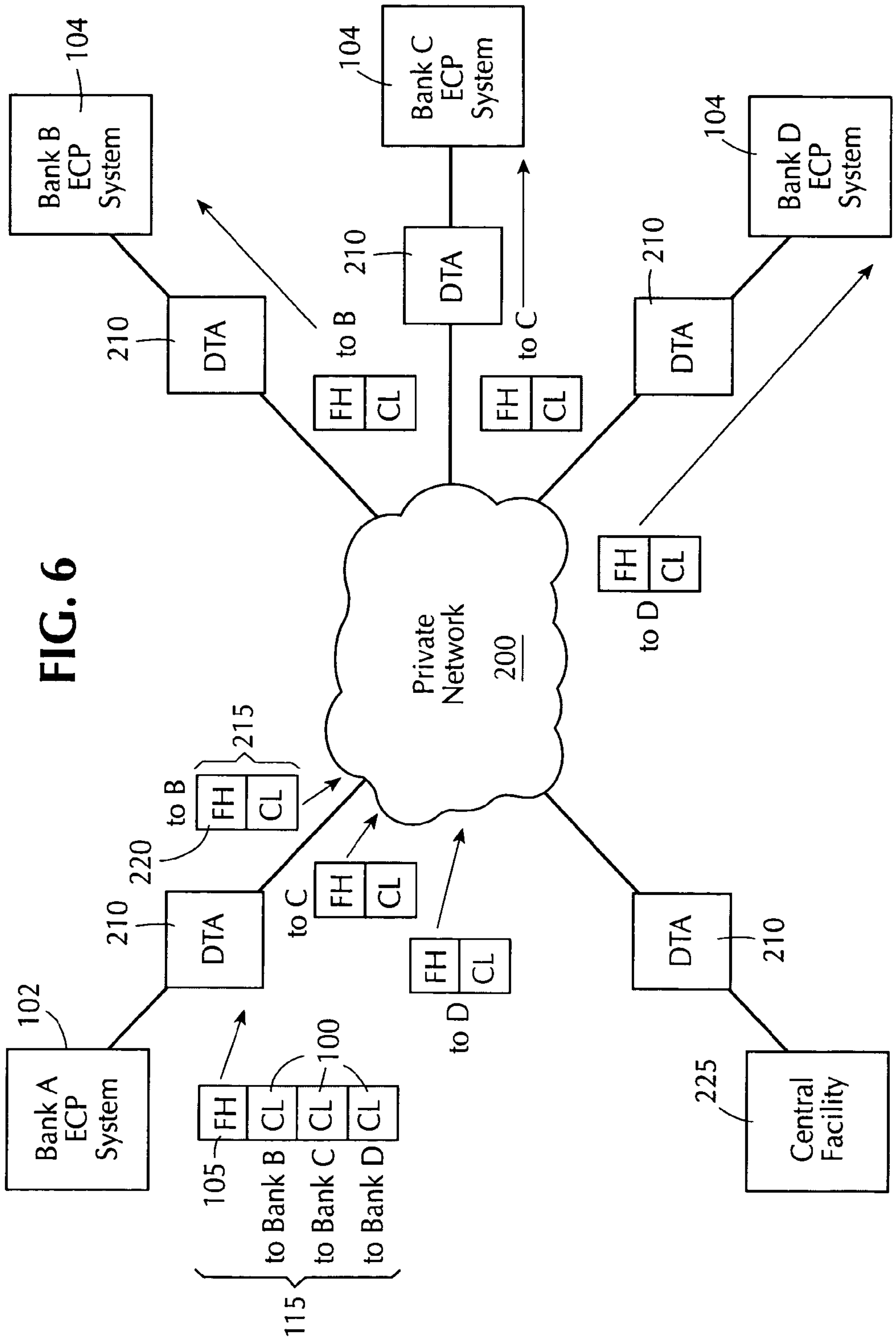
FIG. 6 is a block diagram of an ECP system with image exchange capability, in which electronic check letters and check image data are sent to paying banks via a private network.

As used herein, the term "ECP data" refers to any form of data representing encoded or printed information read from a paper check, e.g., the account number, routing transit number (RTN), dollar amount and check number, using magnetic ink character recognition (MICR), optical character recognition, or any other means of reading information from paper. The ECP data may include an electronic check letter that lists check information for checks drawn on the destination bank. The ECP data may also include image data read from a paper check, such as a digital image read from a paper check using an optical scanner. It is to be understood that the term "ECP data" encompasses any of the above data, even though the terms such as "ECP data with image data" or "ECP and image data" may be used herein. The term "ECP data file" refers to a data structure containing ECP data. An "ECP data file" may or may not contain check image data, and may or may not be formatted in accordance with ANSI DSTU X9.37-2003. "ECP-I" files refer to ECP image files that contain actual check images, as well as corresponding check data. "ECP-D" files refer to ECP disposition files that contain, for example, three cash letters used to inform a collecting bank in the disposition of certain types of checks, and specifically used to identify return items, reversals and holdover items. A specific implementation of the ECP system is shown in FIG. 6. FIG. 6 is directed to an electronic check presentment (ECP) system with image exchange capability. In this system, banks exchange ECP and check image data on a peer-to-peer basis through a shared, private network 200. Each bank 102 and 104 has a distributed traffic agent (DTA) 210 that acts as a network interface and network node. Data may be transferred between these network nodes using any commonly known manner of network transmission of digital data, for example, in the from of packets using Internet protocol (IP). In such a case, each data packet has a header with a source and destination IP address, which correspond to the unique IP address of the sending DTA and the receiving DTA, respectively. The payload of data packets travel through the private network 200 to get from the sending bank's DTA to the receiving bank's DTA, rather than being received and queued by a central switch. This eliminates central switch latency associated with the conventional hub and spoke configuration described with reference to FIG. 1.

In the example of FIG. 6, the depositary bank 102, Bank A, sendsECP data, such as a group of electronic cash letters 100, to paying banks 104, e.g., Banks B, C, and D. These cash letters 100 initially may be grouped in a single combined cash letter file 115. As further described below, the DTA 210 of Bank A separates these cash letters 100 according to the paying bank into separate cash letter files 215 with new file headers 220. The individual electronic cash letter files 215 are transmitted through the network 200 as payloads directly to the respective paying banks 104.

Prior to transmission, electronic cash letter files 215 are formatted according to the data protocol of the network. For example, in an IP-based network, the DTA 210 partitions each of these individual cash letters 215 into IP data packets and applies IP header information to each packet. The packets are routed through the network 200 according to their IP headers and are received by the DTA 210 of respective paying bank 104. The DTA 210 of the paying bank 104 reassembles the IP packets into their original form and the data is received as an electronic cash letter by the ECP computer system at the paying bank 104. The DTAs 210 of the depositary bank 102 and the paying banks 104 also sends a transmittal containing control and other information relating to the cash letter transmission to a central facility 225 that performs various monitoring and quality control functions.

Because the DTA 210 acts as a network interface to convert the cash letter to and from the form of IP data packets, the EP network is transparent to the ECP systems of Banks A, B C, and D. Thus, this network is compatible with existing ECP systems, such as those described above with respect to FIG. 1, although modifications may be necessary to handle new ECP data formats.

Figure 7:
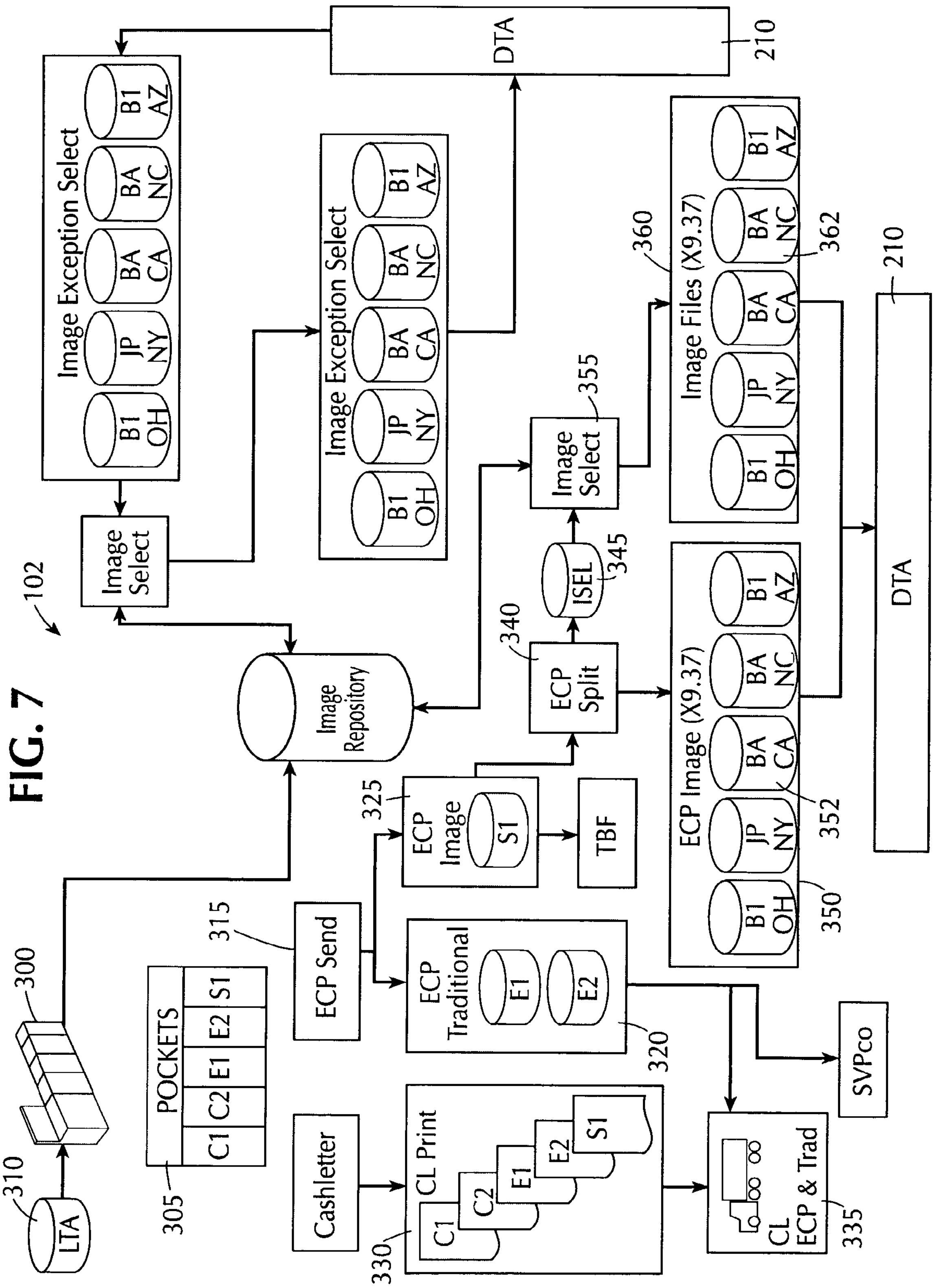
FIG. 7 is a block diagram of the ECP system showing receipt and processing of deposited checks by the collecting bank.

As shown in FIG. 7, paper checks presented for payment at a depositary or collecting bank 102 are processed by a high-speed sorting/imaging machine 300 that reads the MICR information, sorts the checks into pockets 305 depending on how the check is to be handled, and produces a digital image of the checks. The sorting is performed based on the large account table (LAT) 310, which is a data file containing routing and account numbers and an indication of how checks for each account are to be processed, e.g., whether the checks are to be truncated.

Following the processing of the paper checks, the resulting data and sorted checks are prepared for presentment, which entails the sending 315 of the ECP data 320 to the paying banks. The ECP data 320 may be in the form of an electronic cash letter generated from the MICR data, which includes a listing of the checks being sent to the paying bank 104 and their associated account numbers and amounts. The ECP data 320 may include check image data 325 produced by the sorting/imaging machine 300. Paper cash letters are printed 330 for the non-truncated items, i.e., checks drawn on accounts that are not marked for truncation. These paper cash letters 330 and their associated items, are sent 335 to the paying banks by conventional means.

The electronic cash letters are handled depending upon whether the paying bank has the capability to receive ECP with image data, as indicated by the LAT 310. If the paying bank 104 does not have ECP with image data handling capability, then the electronic cash letters are sent in the traditional manner, e.g., by routing the electronic cash letters through a central switch to the paying bank as discussed above with respect to FIG. 1.

If the paying bank 104 has ECP with image data handling capability, then the ECP data is split 340 and sent to a data processor that puts the data in a standard ECP format, such as ANSI DSTU X9.37-2003, and stores it in the image select (ISEL) database 345 for image selection processing. The ECP data is also stored in a database 350, which may have individual database files 352 corresponding to each paying bank 104. The ECP data is transferred from the database 350 for transmission to the paying bank 104 by the DTA 210 for posting. The collecting bank 102 (and the paying banks 104) may have one or several DTAs (two DTA blocks are depicted in FIG. 3, but these functional blocks may represent the same DTA device). Multiple DTAs may be used for redundancy, or the various functions performed by the DTA may be split between several units. For example, separate DTAs may be used for incoming and outgoing ECP data files.

The ECP data in the ISEL database 345 is matched with its corresponding image data in the image repository by the image select module 355. The image data is then stored in an image database 360, which may have individual files 362 corresponding to each paying bank 104.

The collecting bank 102 may send two files to the paying bank for each image exchange cash letter. The first file, which contains ECP data but not images, is generated and sent in an expedited fashion. The second file is for the same transactions as the first file, but includes the associated images. The second file is sent once the associated images are gathered and formatted into the proper format for transmission. The two files are delivered within agreed upon deadlines.

Figure 8:
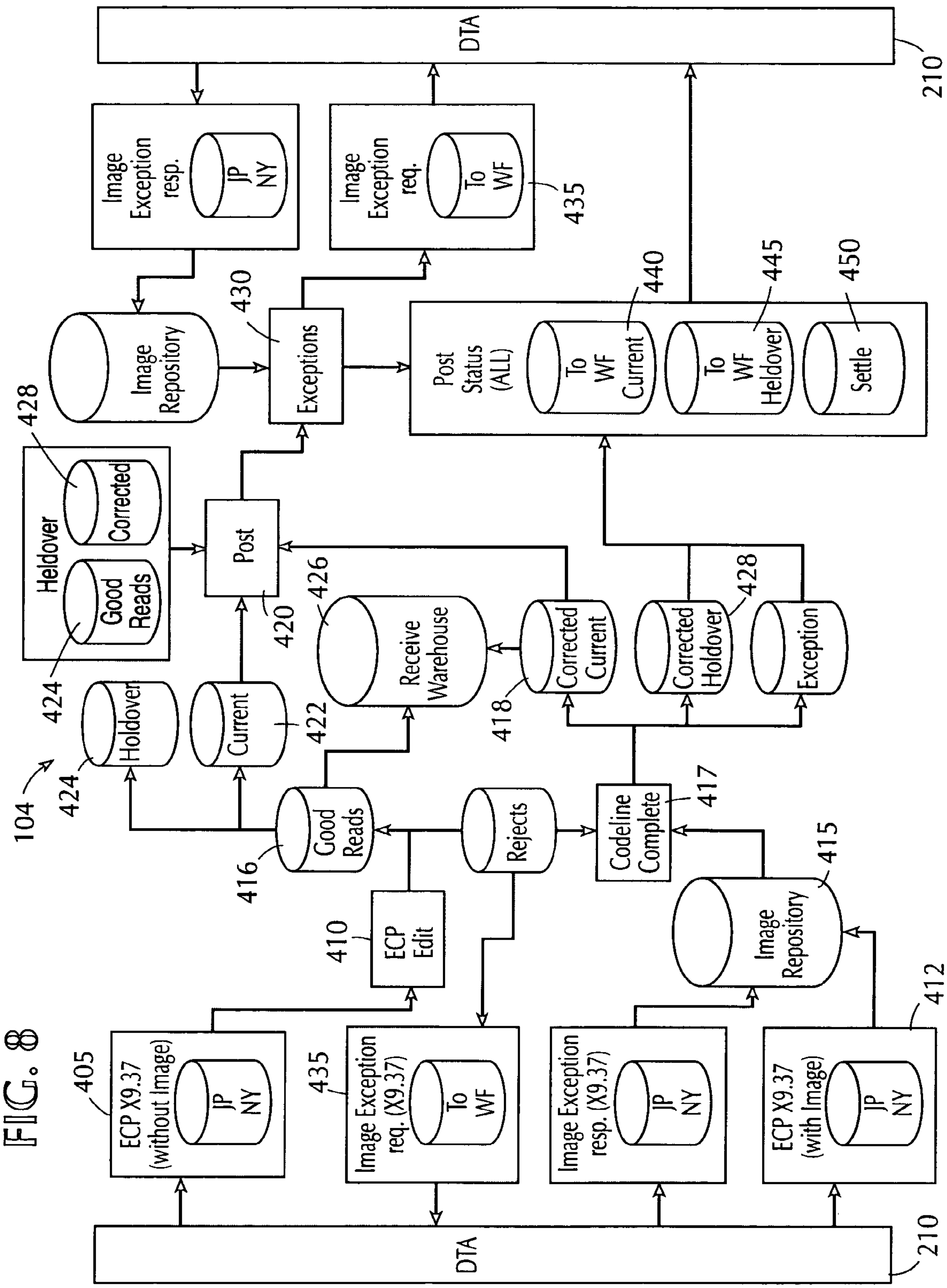
FIG. 8 is a block diagram of the ECP system showing receipt and posting of ECP with image data at the paying bank.

The ECP data and ECP with image data are sent via the DTA 210 as payloads, transmitted through the network 200 and received by the DTA 210 at the paying bank 104, shown in FIG. 8. The DTA 210 at the paying bank 104 separates the data depending upon whether it includes image data. ECP data without image data 405 is processed by an ECP edit 410 program, which performs error analysis on the ECP data to identify incorrectly read MICR data. ECP image data 412 sent subsequent to the sending of the ECP data is stored in an image repository 415. The stored image data may be used to perform codeline correction 417 for items rejected during the ECP edit 410 process. For example, an operator may manually correct codeline data based on a visual inspection of a check image. Alternatively, image data for an individual item or group of items may be requested from the collecting bank through an image exception process prior to the receipt of the ECP with image file.

The current items from the good reads 416 of the ECP edit 410 process and the current items 418 from the codeline correction 417 process, are forwarded to the posting process 420. In addition, the good reads 416 (both current 422 and holdover 424) and corrected current items 418 may be stored in a receive "warehouse" database 426 for archival purposes. Holdover items 424, which are items that do not meet the appropriate deadlines, are separated from the current items 422 prior to posting 420 and stored for further processing according to holdover workflow procedures. Previously heldover items, including good read holdovers 424 and codeline corrected holdover items 428, are also forwarded to the posting process 420.

Prior to posting and storage, all items to be posted are sent through an exceptions sorting process 430, which generates image exception requests 435 if, for example, the image is of such poor quality that the codeline data cannot be corrected by visual inspection of the image. The image exception data items 435 are stored and returned via the DTA 210 to the collecting bank 102. The items that pass the exceptions process are stored according to their post status: current items 440 to be returned to the collecting bank, heldover items 445 to be returned to the collecting bank, and settled items 450. These return data items are then separately transferred in an ECP image return item disposition file via the DTA 210 to the corresponding collecting bank 102. Each return data item includes an associated reason for return, e.g., insufficient funds.

Figure 9:
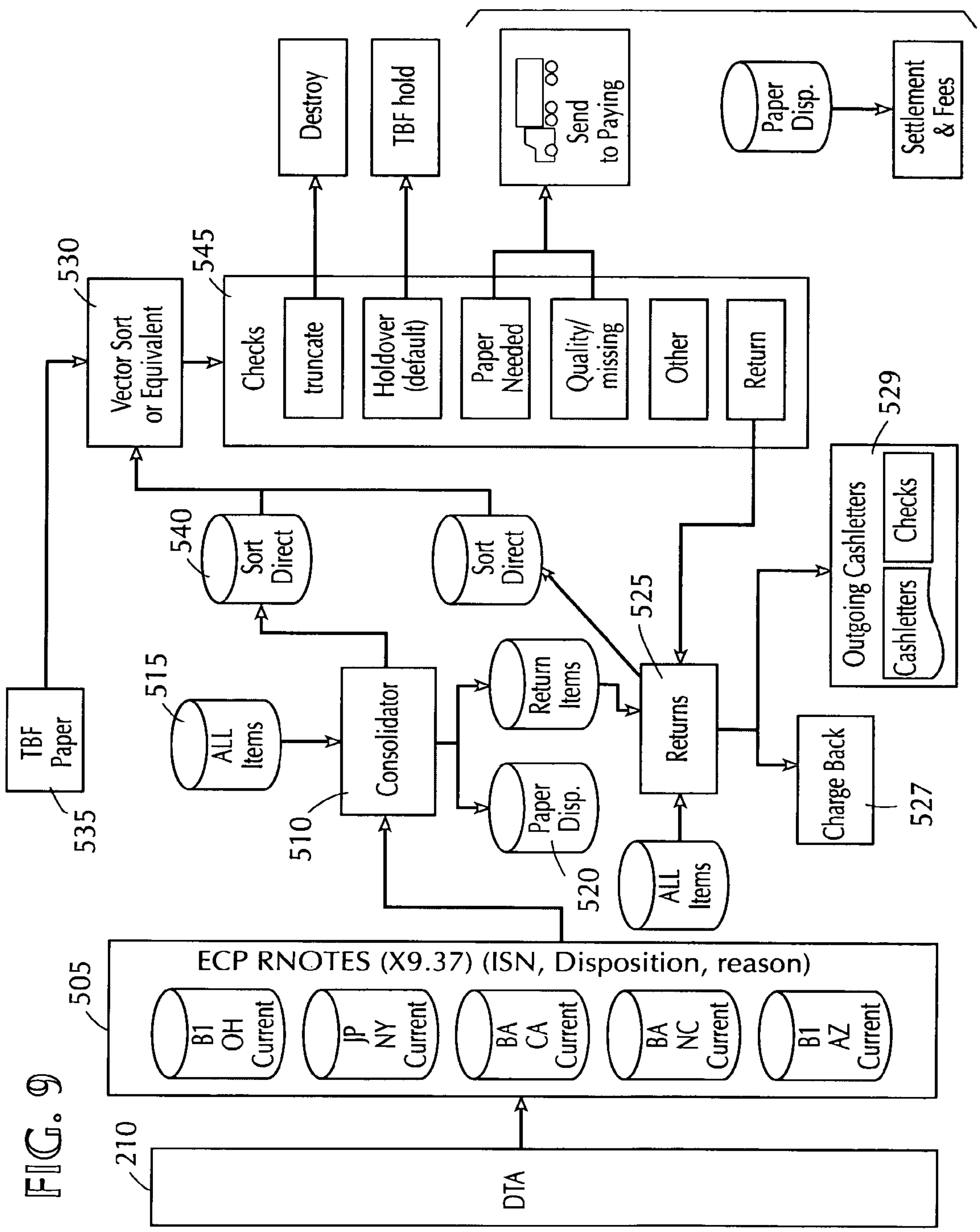
FIG. 9 is a block diagram of the ECP system showing disposition of truncated paper items and receipt of return ECP data at the collecting bank.

As shown in FIG. 9, ECP image return item disposition data files 505 from various paying banks 104 are received by the collecting bank 102 via a DTA. These return data items are combined in a consolidation process 510 with their associated entries in the previous day's all items data file 515. The consolidation process provides a number of different outputs. Some of the return data items are stored for paper disposition 520, which means that settlement information will need to be exchanged between the collecting bank 102 and paying bank 104. Other return data items are forwarded to a returns process 525, where they are charged back 527 to the payor or matched with the paper checks, which are sent out in a conventional cash letter 529.

Figure 10:
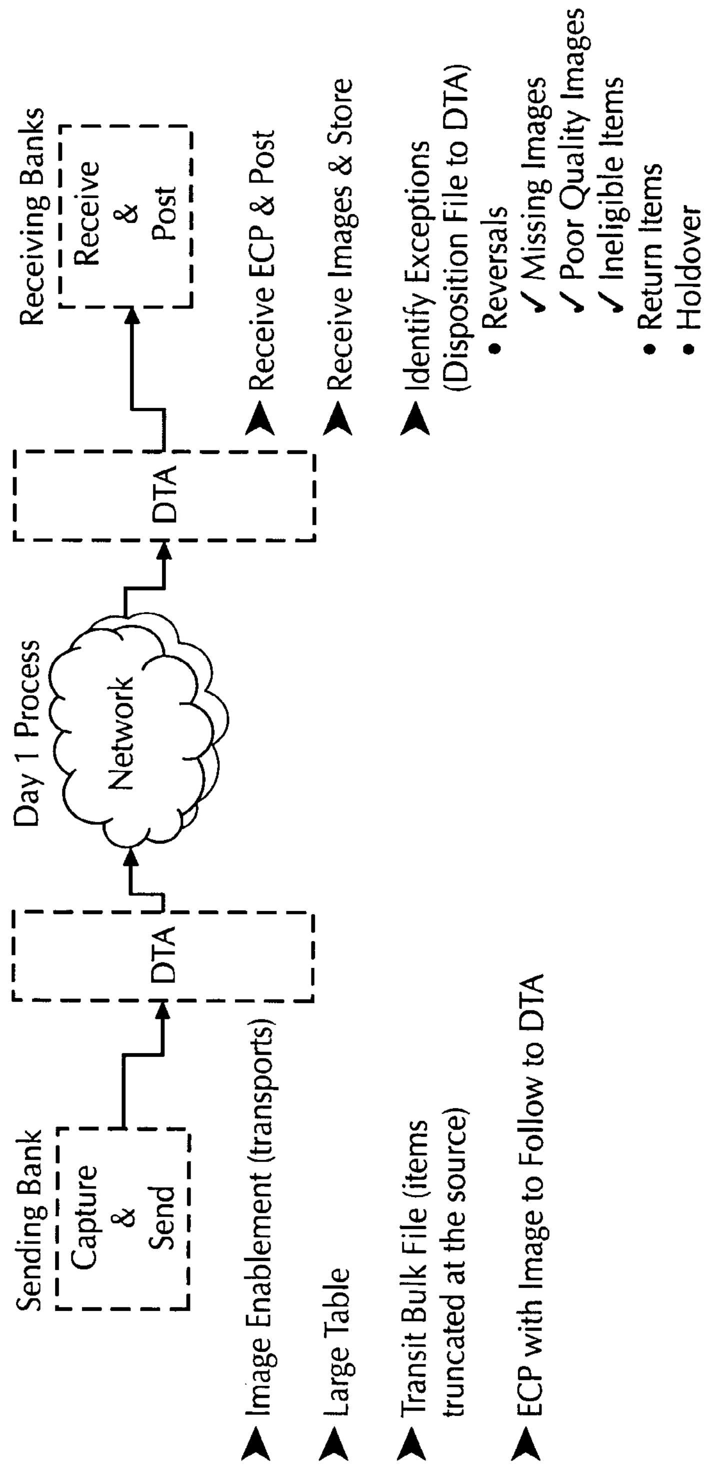
FIG. 10 depicts an example of the Day 1 process of an embodiment of the present invention.
Figure 11:
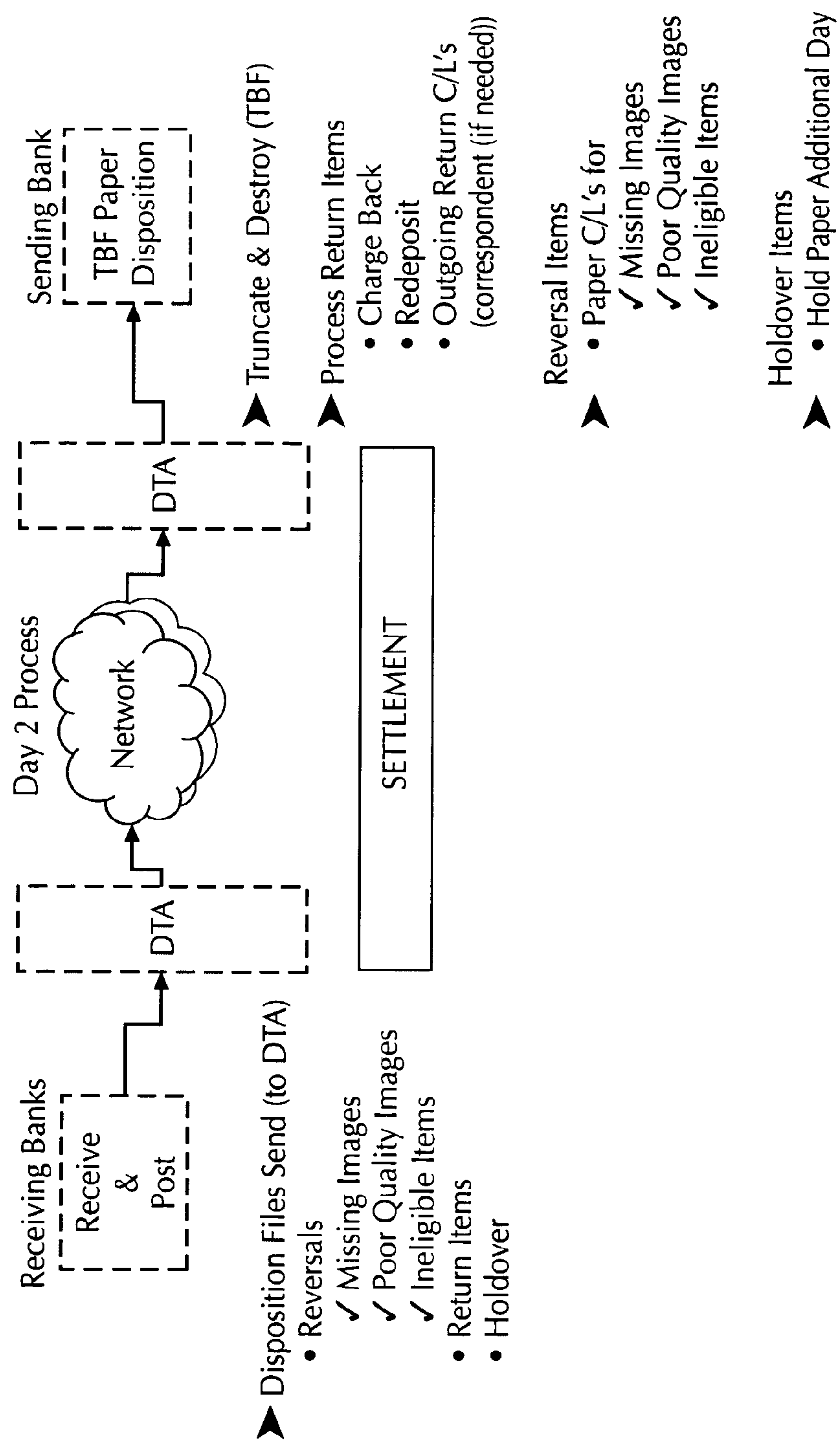
FIG. 11 depicts an example of the Day 2 process of an embodiment of the present invention.

An example of a Day 1 process and a Day 2 process are shown in FIGS. 10 and 11. In FIG. 10, on Day 1, the sending bank captures and sends to its DTA an ECP data file as a payload. In this example, the ECP data file consists of ECP data, with the corresponding ECP image data file to follow. The sending bank DTA sends this payload (with the corresponding transmittal message), to the appropriate receiving banks' DTAs via the network. The receiving banks receive the ECP data payloads and post. They later receive the ECP image data file payloads, and store the check images. The receiving bank identifies exceptions, to create a payload consisting of a ECP disposition file. The ECP disposition file contains data regarding reversals (missing images, poor quality images, and ineligible items), return items, and holdovers.

As shown in FIG. 11, on Day 2, the receiving banks send the ECP disposition file payloads to their respective DTAs for transmission, via the private network, to the sending bank's DTA, as part of the settlement process. The sending bank separates out for eventual destruction the truncated checks in the transit bulk file (as explained in more detail below), processes returned items (charge back, redeposit, and outgoing cash letter), processes reversal items (paper cash letters for missing images, poor quality images and ineligible items), and holds paper for an additional day for holdover items.

In particular, as shown in FIG. 9, the matching of physical paper checks to return data items is achieved by performing a sorting operation 530, e.g., a vector sort, on the paper checks received in the transit bulk file (TBF) 535. The sorting process 530 is controlled using sorting data 540 from the consolidation 510 and return 525 processes discussed above, such that the paper checks are divided according to their eventual disposition. For example, in the sorting output 545 truncated items are separated from the TBF 535 to be destroyed after a predetermined time period. Other items marked as paper needed, poor quality, or image missing are separated from the TBF 535 to be sent to the paying bank. As discussed above, return items are separated from the TBF 535 and returned to the payor or sent out in a conventional cash letter 529.

Implementation of ECP with image exchange, as described above, may require banks to upgrade or replace certain equipment to perform high speed check imaging. Banks having medium to large volume operations may image-enable existing high-speed transports (i.e., paper check sorting and handling machines) so that MICR and check image capture occur during prime pass capture, which is the first pass of the paper check through the processing equipment. Alternatively, image capture may be performed using high speed capture of bulk transit items on a repass or rehandle basis. By acquiring images from subsequent passes, rather than the prime pass, a banking institution may be able to lower costs by maximizing utilization of fewer image-enabled transports, as only the items to be truncated would need to be imaged. During the image capture process, items destined for banks capable of image exchange are sorted out based on the LAT. In addition, as further described below, some of these image exchange items may be identified as image quality rejects, which are referred to as image exceptions. Such items are sorted out and turned over to an image repair and re-entry process for resolution.

Banks having low to medium volume operations may use slower transports to perform MICR and image capture during prime pass capture or on a repass or rehandle basis. Some institutions may use a combination of transports to capture transit images from different sources such as POD, ATM, inclearings or pre-encoded cash letters. As in the high-speed processes, items destined for banks capable of image exchange are sorted out based on the LAT, and image quality rejects are sorted out from the image exchange items.

Some institutions may opt not to perform image capture on the prime pass and may instead selectively image items that meet image exchange criteria. This would likely be accomplished by performing image capture on a rehandle basis after on-us items and non-truncated transit items have been sorted out. Such a procedure may reduce costs by requiring image capture of fewer items.

Regardless of whether an institution performs image capturing on prime pass or on a rehandle basis, there may be image exceptions to be dealt with. Items that are identified as either having a missing image or a suspect image can be recaptured or re-scanned and replaced with a corrected images or an image replacement document (IRD). Image exceptions may be caused by, for example, transport jams, piggy-backed items, and original documents that are of poor quality or are not image-ready.

Image repair may include a combination of the following processes. If feasible, unacceptable items, e.g., missing items, poor quality items, or items with streaks, may be identified during capture and excluded prior to sending an image exchange cash letter. These unacceptable items then can be sent as a paper cash letter or recaptured as an image exchange cash letter (usually the next day). If unacceptable items cannot be identified or deleted prior to sending the image exchange cash letter, then the collecting bank awaits an image exception notification (adjustment) from the paying bank.

Items not meeting the ECP codeline edit requirements may be corrected by sorting out the item as a prime or rehandle reject in the conventional manner. Alternatively, an operator may view the image on the editing system while the item is being processed and correct the codeline in real time while maintaining the original capture sequence. An item must at minimum have a correct routing number to be eligible for this function, otherwise it will be classified as a normal reject item.

Although check processing platforms typically offer some ability to review images for quality, the options vary greatly from vendor to vendor. Institutions wishing to participate in image exchange will need to implement an image quality assurance program using, for example, vendor-provided image quality tools, third-party tools, or manual periodic sampling methods to inspect images. One common mechanical cause of poor image quality is inadequate sorter camera maintenance by the sorter operator and/or the sorter vendor. For example, a dust spot on the camera lens can cause streaks across captured images until this quality defect is identified, which may result in the generation of thousands of poor quality images.

In a paper check processing environment, MICR data is embedded in and magnetically read from paper checks. In an image exchange environment, it becomes necessary for the paying bank to verify the MICR line data read from the paper check against MICR data read from the check image. This verification function ensures that each item is represented by a complete and correct set of MICR data fields along with front and back image views for the corresponding item. If the MICR line data does not match the image-MICR data, the paying bank may reverse the item.

Checks drawn on accounts marked for truncation are retained in a transit bulk file (TBF) and eventually destroyed by the depositary or collecting bank. Only the images of these truncated items are sent on to the paying banks and ultimately the payor. The image data may be temporarily stored in an image repository for further processing and transmission prior to being sent to the paying banks. Checks that are not truncated are stored in a separate TBF and are later sent to the paying bank by conventional means, e.g., delivered by a combination of air and ground transportation.

Figure 12:
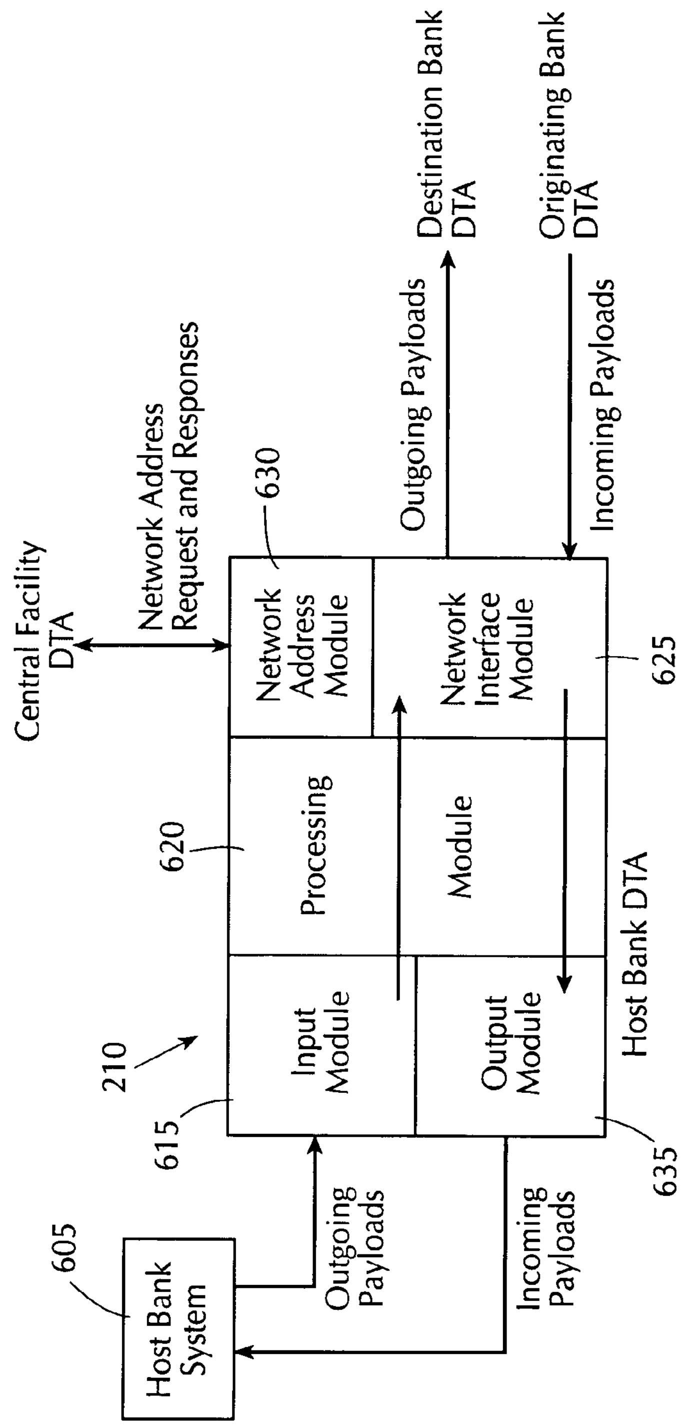
FIG. 12 is a block diagram of a distributed traffic agent (DTA) installed at a host bank.

As discussed above, the distributed traffic agent (DTA) 210 is responsible for the reception and transmission of ECP and ECP with image data files. FIG. 12 shows a block diagram of a DTA 210 connected to the ECP system of a host bank 605, which is the portion of the bank's computer system that generates ECP data from deposited checks and processes ECP data received from other banks. In the preferred embodiment, the DTA 210 is implemented using software that is configured to execute on a general purpose, server-class personal computer. The various functions of the DTA 210 may be described in terms of software/hardware modules.

The DTA 210 has an input module 615 that accepts outgoing ECP data files generated by the host bank ECP system 605 from checks deposited at the host bank. Each of these ECP data files (as a payload) is destined for a particular paying bank (i.e., destination bank). As discussed above, the ECP data files may include image data in a standard format, such as ANSI DSTU X9.37-2003. The input module is designed to interface and perform any necessary handshaking with the bank's primary ECP file transfer application, e.g., "Connect:Direct", which runs over a TCP/IP connection. The outgoing ECP data file is passed to the processing module, which performs various functions to prepare the data for transmission, such as verification of the data format and division of multiple-destination cash letter files into single-destination cash letter files. Alternatively, the functions of the processing module may be incorporated into the input module 615.

The outgoing ECP data file, that is the payload, is then passed to the network interface module 625, which, as described above, partitions each of these individual cash letters 215 into IP data packets and applies IP header information to each packet. The IP address for the destination bank is obtained from the network address module 630, which obtains the network address information from the DTA of the central facility via the private network 200. The network address module 630 also may maintain a database of such addresses, which may be updated periodically from the DTA of the central facility.

The DTA 210 has an output module 635 that performs essentially the opposite function to the input module 615. The DTA 210 receives incoming ECP data files (payloads) from collecting banks (i.e., originating banks) for checks written on the host bank. Such files are received though the private network 200 by the network interface module 630, which reassembles received IP packets into the data file transmission format. In an alternative embodiment, the functions of the input module 615 and output module 635 may be performed by a single combined input/output module. Furthermore, although the incoming and outgoing ECP data files are depicted in FIG. 12 as occurring on separate communication lines, such communication could readily be performed on a single bi-directional communication link. In such a case, the incoming and outgoing data is routed to the input module 615 and from the output module 635 as appropriate or is handled by a combined input/output module.

The incoming ECP data files are passed to the processing module 620, which performs functions such as format verification and acknowledgment transmission, and then to the output module 635. The output module 635 interfaces with the host bank's ECP file transfer application, e.g., Connect:Direct, and performs any necessary format conversion so that the files can be accepted by the bank application. The output module 635 also performs any handshaking that may be necessary with the bank application.

Each DTA preferably includes a computer platform that is an Intel-based (or equivalent), dual processor, server-class machine running at least 1.8 GHz. The DTA preferably has a minimum of 2 GB of memory, a CD-ROM drive, a minimum of 72 GB of available disk space using RAID-0 (disk mirroring) or RAID-5 (disk striping) disk redundancy implementations, a tape backup, and at least one network interface card supporting 100 megabit or gigabit Ethernet connectivity. The operation of each DTA supports a high degree of parallelism, such that multiple files can be sent, received, and validated concurrently.

Figure 13:
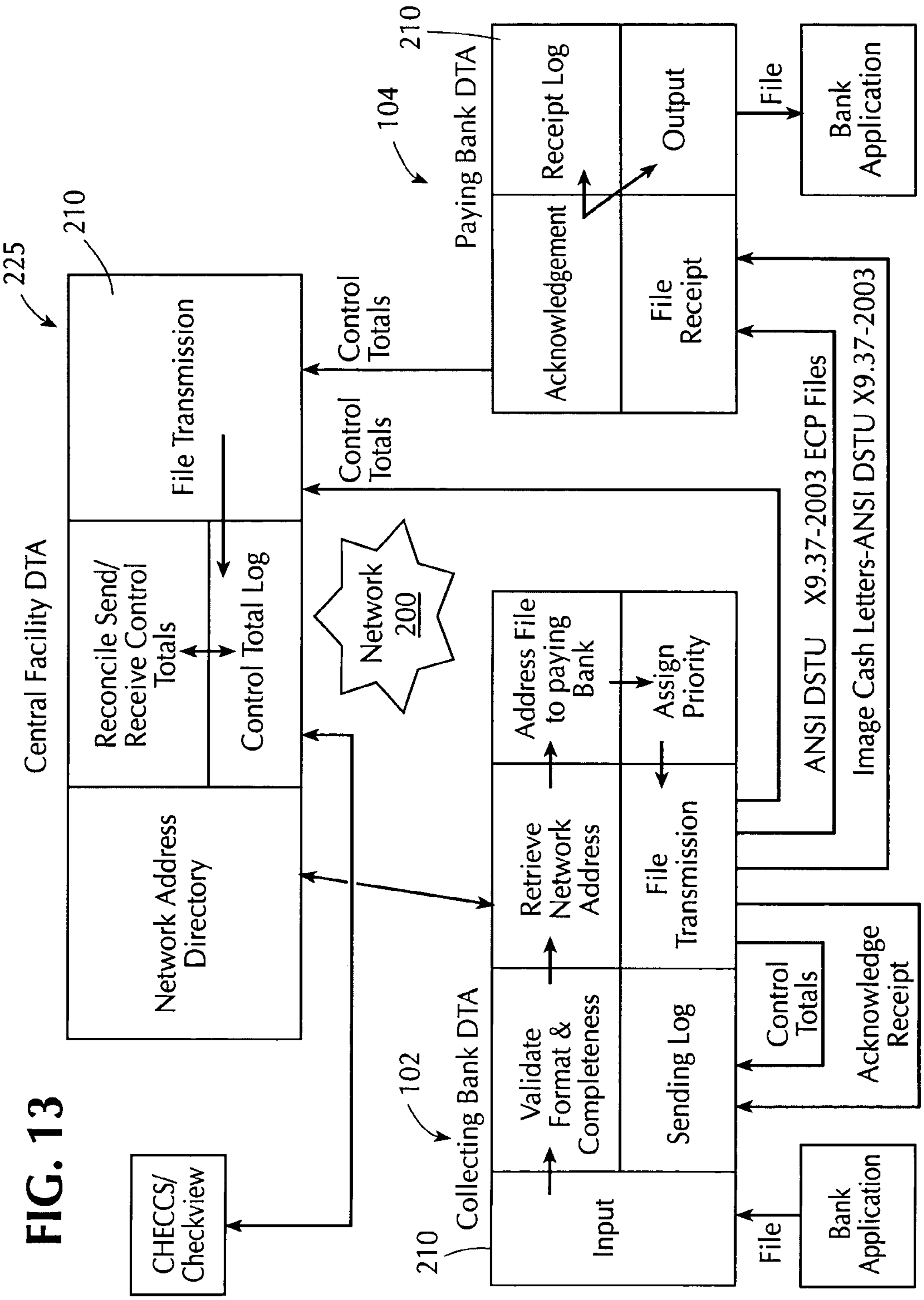
FIG. 13 is a block diagram of the functions performed by the DTAs of the collecting bank, the paying bank, and the central facility.

In addition to the reception and transmission of ECP and large account table (LAT) files as payloads, the DTA 210, as shown in FIG. 13, performs a number of other functions relating to the handling of ECP and image data in the private network. Prior to sending a file, the DTA 210 at the sending bank 102 (e.g., the collecting bank) validates the file for correct format and completeness and prepares the file for transmission to the receiving bank 104 (e.g., the paying bank). The format verification ensures that the file adheres to the standard file structure for the particular type of file. This verification includes the capability to verify that an ECP data record (e.g., data read from a check MICR strip) exists for each ECP with image data record. This allows the DTA 210 to identify any extra images in the file (i.e., those images not associated with a ECP data record). The completeness verification ensures that the number of records in the file matches a control total. The DTA 210 also may check the total file size and compare it to control values for the particular file type.

The DTA 210 prepares the file for transmission by retrieving from a secure server the network IP address of the bank to which the file is to be sent. For example, the collecting bank 102 DTA 210 may retrieve the network IP address of the paying bank from a network address directory stored on the DTA 210 at a central facility 225, such as Electronic Clearing Services (ECS$^{SM}$), which is a division of the Small Value Payments Company (SVPCo$^{SM}$). The bank receiving the file may have more than one network address, each associated with a different type of file to be received. For example, a LAT file may be sent to a different address than an ECP with image data file. Using multiple network addresses can help improve processing efficiency at the receiving DTA by allowing files to be sorted by type prior to processing. Alternatively, the network address associated with a file type may be directed to a DTA that is specifically configured to process that file type.

The DTA 210 also assigns a priority to the file prior to sending, based on criteria such as the following: receiving bank deadline, file type, file size, file value, and the most efficient use of telecommunications capacity. The priority of the file may be determined using a master table of bank-established parameters corresponding to each of the above criteria. Such a table may be maintained by the DTA 210 of the central facility 225 and may be replicated on each bank's DTA 210. In addition, it may be possible for each bank to establish its own prioritization parameters in the master table. Files with the highest priority are delivered first. File priority may be automatically overridden by an algorithm, to ensure that all files are delivered by their associated deadlines.

The DTA 210 at the receiving bank 104 is responsible for receiving the various types of payloads sent by the sending banks. In addition, the receiving DTA generates bank address responses, file receipt acknowledgment messages, and reconcilement discrepancy advices, etc. Upon receiving a file, the DTA 210 sends an acknowledgment receipt to the sending bank 102 DTA 210 and delivers the file to the appropriate banking application on the receiving bank's 104 computer system. The delivery may be accomplished by notifying the application that the file is ready for retrieval, e.g., by passing a token to the application.

The sending and receiving of payloads by the DTAs through the private network is subject to a sophisticated file tracking system. The DTA at each bank maintains a log having entries for each file sent or received. The log entries include such information as: sending bank address or identification number, receiving bank address or identification number, and file priority. The log also records the date and time that each file was delivered by the sending application to the sending DTA, sent by the DTA to the network, received by the receiving DTA, and delivered by the receiving DTA to the receiving application. In addition, the log maintains control totals for the value of the items in the file, the number of items, and the file size in bytes. A copy of this information, including file time stamps, sender and receiver identification, and control totals, is also sent to the DTA of the central facility via a transmittal. The DTA at each bank also receives and stores in the log acknowledgments received from receiving banks for each file sent.

The file tracking system is used to help reconcile discrepancies in the information maintained at the sending 102 and receiving banks 104. Via the use of transmittals, the DTA 210 at the central facility 225, as described above, receives control and tracking information from both the sending 102 and receiving 104 banks for all files that are transmitted through the private network 200. The central facility 225 DTA 210 attempts to reconcile each file transmission by matching the control totals received from the sending 102 and receiving 104 banks. If there is a disagreement between the sending 102 and receiving 104 bank's control and tracking information, then the central facility 225 DTA 210 send a reconcilement discrepancy advice to the DTAs 210 at the sending 102 and receiving 104 banks.

The DTA 210 at each bank is configured to receive reconcilement discrepancy notifications from the central facility 225 DTA 210. The bank's DTA provides tools for correcting these discrepancies. Corrections are sent to the sending bank 102, the receiving bank 104, and the central facility 225 and are stored as addenda to the logs stored on each location.

As stated above, a transmittal message is used by the file tracking system to communicate between the banks and the central facility regarding the files that are being transmitted through the private network. In the preferred embodiment, a transmittal message is received by the originating financial institution's DTA before any file is sent. The message is defined using XML (eXtensible Markup Language), an international standard method for representing data, and the following is a sample XML schema for a transmittal message:

```
<?xml version="1.0"?>
<transmittal xsi:noNamespaceSchemaLocation="transmittal.xsd"
    xmlns:xsi="http://www.w3.org/2001/XMLSchema-instance">
<transmittal_type>payload|notice|confirmation</transmittal_type>
  <trarismittal_id>222222222-40001287</transmittal_id>
  <control>
    <message_id>1234-4234-42134</message_id>
    <sender type="ep">222222222</sender>
    <receiver type="dta">bank-a-node-1</receiver>
    <time_of_message>2003-07-02T02:54:42Z</time_of_message>
  </control>
  <file>
    <file_name>SVPCO.DTA.ECP.G0001V00</file_name>
    <file_type>ECP|LATF</file_type>
    <file_size>192837465</file_size>
    <codepage>437<codepage>
  </file>
  <ecp type="data|image|disp" usage="P|T" resend="N|Y">
    <key_data>
      <file_id_modifier>A</file_id_modifier>
      <create_date>20030701</create_date>
      <create_time>2145-0500</create_time>
      <origin_routing>333388889</origin_routing>
      <destination_routing>222277775</destination
    </key_data>
    <summary>
      <ansi_std_level>03</ansi_std_level>
      <cash_letter_count>1</cash_letter_count>
      <file_item_count>18434<file_item_count>
      <file_record_count>18454</file_record_count>
      <file_total_amount>127645697</file_total_amount>
      <origin_name>First Bank</origin_name>
```

-continued

```
      <originator_contact_name/>
      <originator_phone>
      <destination_name/>
      <country_code/>
      <user_field>
    </summary>
    <cash-letters>
      <cash-letter id="90001234">
        <collection_type>00|03|05<collection_type>
        <return_type>R|E|H</retum_type>
        <origin_routing>333388889</origin_routing>
  <destination_routing>222277775</destination_routing>
        <origin_name>First Bank</origin_name>
        <destination_name/>
        <business_date>20030701</business_date>
        <settlement_date>20030701</settlement_date>
        <create_date>20030701</create_date>
        <create_time>2130-0500</create_time>
        <record_type>E|F</record_type>
        <doc_type>C|G|K</doc_type>
        <originator_contact_name/>
        <originator_phone/>
        <fed_work_type/>
        <user_field/>
        <bundle_count>65</bundle_count>
        <item_count>18435</item_count>
        <total_amount>127645697</total_amount>
      </cash-letter>
    </cash-letters>
  </ecp>
  <dta-control>
    <file_size>192837465</file_size>
    <payload type="primary|copy"/>
    <dta_nodes>
      <dta_node type="sender">
        <name>bank-a-node-1</name>
        <hostname>node1.banka.svpco.pvt</hostname>
        <ip_addr>10.10.1.2</ip_addr>
        <start>2003-07-02T02:54:54Z</start>
        <stop>2003-07-02T02:59:28Z</stop>
        <arrival>2003-07-02T02:54:40Z</arrival>
      </dta_node>
      <dta_node type="receiver">
        <name>bank-b-node-1</name>
        <hostname>node1.bankb.svpco.pvt</hostname>
        <ip_addr>10.10.2.2</ip_addr>
        <start>2003-07-02T02:54:54Z</start>
        <stop>2003-07-02T02:59:28Z</stop>
        <arrival>2003-07-02T02:59:28Z</arrival>
      </dta_node>
    </dta_nodes>
  </dta-control>
</transmittal>
```

File types for this example are:

ECP=electronic check presentment data file

LATF=large account table file

ECP file types for this example are:

DATA=ECP data without image data

IMAGE=ECP data with image data

DISP=ECP disposition file for returned, rejected and held over items

An ECP validation request message is sent to the DTA at the central facility to request validation of ECP data based on the receipt of a new transmittal message. Once the message is validated, then certain values are checked against the DTA at the central facility. The following is an example of an XML schema for an ECP validation request message:

```
<?xml version="1.0"?>
<ecp_validation_request
    xsi:noNamespaceSchemaLocation="ecp_validation_request.xsd"
    xmlns:xsi="http://www.w3.org/2001/XMLSchema-instance">
  <control>
    <message_id>1234-4234-42134<message_id>
    <sender type="dta">bank-a-node-1</sender>
    <receiver type="dta">svpco-node-1</receiver>
    <time_of_message>2003-07-02T02:54:42Z</time_of_message>
  </control>
  <ecp type="data|image|disp" usage="P|T" resend="N|Y">
    <key_data>
      <file_id_modifier>A</file_id_modifier>
      <create_date>20030701</create_date>
      <create_time>2145-0500</create_time>
      <origin_routing>333388889</origin_routing>
      <destination_routing>222277775</destination
    </key_data>
    <summary>
      <cash_letter_count>1</cash_letter_count>
      <file_item_count>18434</file_item_count>
      <file_record_count>18454</file_record_count>
      <file_total_amount>127645697</file_total_amount>
    </summary>
  </ecp>
  <transmittal_id>222222222-40001287</transmittal_id>
</ecp_validation_request>
```

An ECP validation response message is sent from the DTA at the central facility as a response to a request for validation of ECP data. Receipt of this message indicates that the request passed all validation checks. If the request fails validation, an exception message will be sent identifying the details of the failure. The following is an example of an XML schema for an ECP validation response message:

```
<?xml version="1.0"?>
<ecp_validation_response
    xsi:noNamespaceSchemaLocation="bank_address_response.xsd"
    xmlns:xsi="http://www.w3.org/2001/XMLSchema-instance">
  <control>
    <message_id>1234-4234-42134</message_id>
    <sender type="dta">svpco-node-1</sender>
    <receiver type="dta">bank-a-node-1</receiver>
    <time_of message>2003-07-02T02:54:42Z</time_of_message>
  </control>
  <transmittal_id>222222222-40001287</transmittal_id>
<ecp_validation_response>
```

A file transfer status message may be from a host bank DTA to the DTA at the central facility to provide status information about the state of a transmittal in progress. The following is an example of XML schema for a file transfer status message:

```
<?xml version="1.0"?>
<file_transfer_status
    xsi:noNamespaceSchemaLocation="file_transfer_status.xsd"
    xmlns:xsi="http://www.w3.org/2001/XMLSchema-instance">
  <control>
    <message_id>1234-4234-42134<message_id>
    <sender type="dta">bank-a-node-1<sender>
    <receiver type="ip">222222222<receiver>
    <time_of_message>2003-07-02T02:54:42Z</time_of_message>
  </control>
  <file_type>ECP|ECPI|DISP|LATF</file_type>
  <file_size>435435345</file_size>
  <sending_node>bank-a-node-1</sending_node>
<receiving_node>bank-b-node-1</receiving_node>
<transmittal_id>222222222-40001287</transmittal_id>
  <status
    state="I|V|F|L|R|B|T|C|W|M|A|SM|SA"
    process="processing|errors|delayed|completed"
    connect_direct="H|W|T|E" />
</file_transfer_status>
```

Valid values for the State indicator in this example are:
I=process initialized
V=validating
F=validation failed
L=updating log files
R=requesting bank address
B=building bank ECP application process
T=transmitting
C=sending file process completed
W=waiting for file send completion
M=creating messages to be sent to other DTA
A=creating messages to be sent to banking application
SM=sending messages to other DTA
SA=sending messages to banking application Valid values for the Process Status in this example are:
Processing
Errors
Delayed
Completed Valid values for the bank application, e.g., Connect: Direct, status indicator in this example are:
H=hold
W=wait
T=timer
E=executing File types for this example are:
ECP=electronic check presentment data file without image data
ECPI=ECP data file with image data
DISP=ECP disposition file for returned, rejected and held over
LATF=large account table file The following is an example of an XML schema for a file posting status message, which is sent by a DTA upon receiving an ECP data file or large account table (LAT) file, or any other payload type:

```
<?xml version="1.0"?>
<posting_file_status
      xsi:noNamespaceSchemaLocation=" posting_file_status.xsd"
      xmlns:xsi="http://www.w3.org/2001/XMLSchema-instance">
   <control>
      <message_id>1234-4234-42134</message_id>
      <sender type="ip">333344445</sender>
      <receiver type="ip">222222222</receiver>
      <time_of_message>2003-07-02T02:54:42Z</time_of_message>
   </control>
   <file_type>ECP|ECPI|DISP|LATF</file_type>
   <sending_node></sending_node>
   <receiving_node></receiving_node>
   <transmittal_id></transmittal_id>
   <status value="accepted|not_accepted|not_posted|discrepancy" />
</posting_file_status>
```

Figure 14:
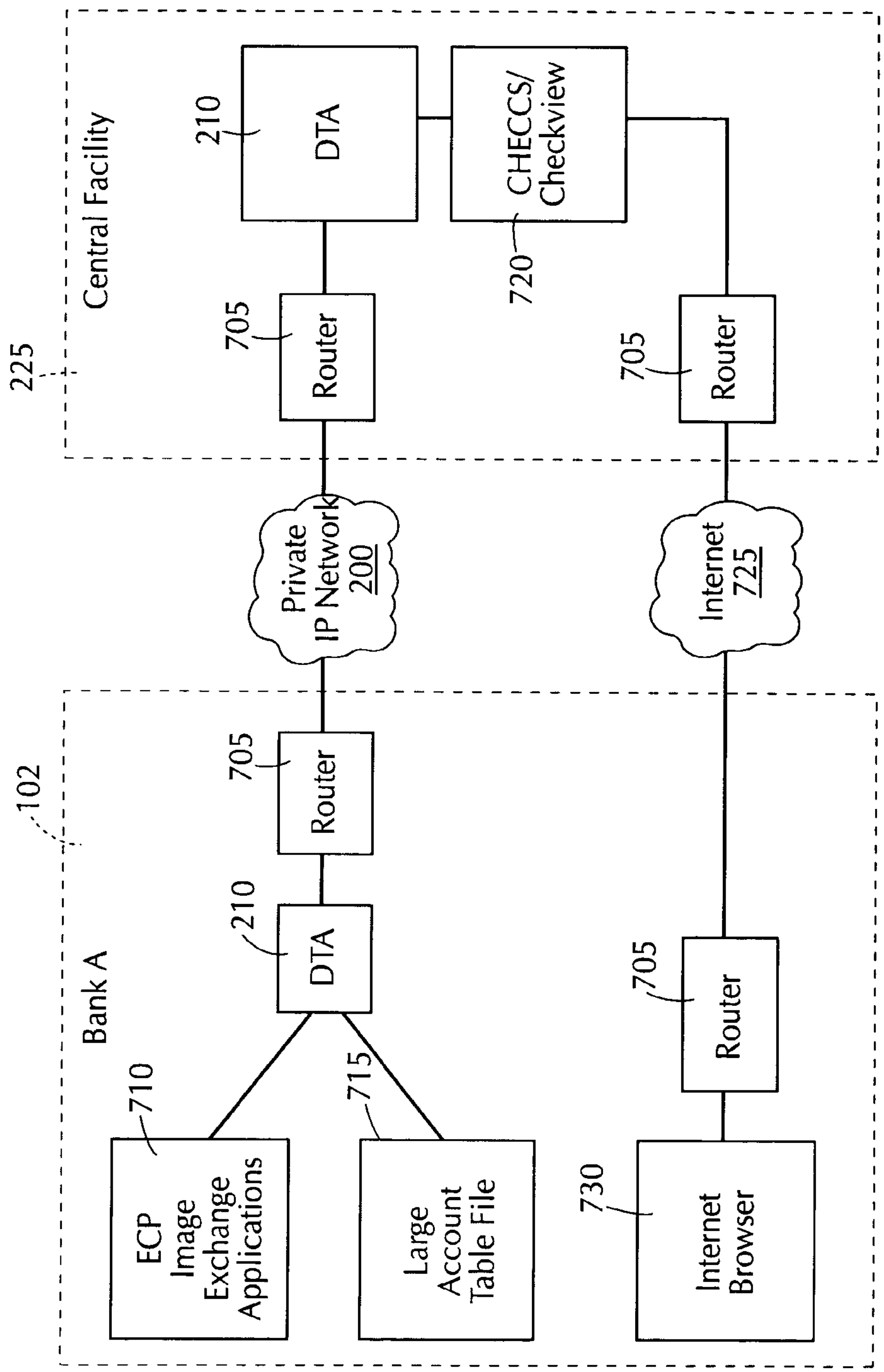
FIG. 14 is a block diagram of the interconnection of the ECP system with a monitor and control system.

Valid values for the file application status indicator are:
File accepted
File not accepted
File not posted
Reconcilement discrepancy correction As discussed above, the DTA or DTAs at each host bank are responsible for sending and receiving files relating to the bank's ECP system and large account table (LAT) system. As shown in FIG. 14, the DTA 210 at each bank, e.g., Bank A, sends and receives payload data through a router 705 connected to the private network. The DTA 210 is in turn connected to the bank's ECP image exchange application 710 and large account table (LAT) application 715, which is the computer program that handles the sending and receiving of LAT data. As discussed above, the LAT data includes routing and account numbers and information on how checks drawn on particular accounts are to be handled by the collecting bank.

Each LAT file contains three sections. The first identifies the source bank for the LATF, the second section identifies the accounts that are eligible for truncation (i.e., accepts ECP with image data), and the last section maps the bank routing numbers in the second section to pre-defined end-point IDs and cutoff times for delivery of the ECP files. The LAT file may be defined using XML. The following is a sample XML schema for a LAT file:

```
<?xml version="1.0"?>
<latf xsi:noNamespaceSchemaLocation="latf.xsd"
      xmlns:xsi="http://www.w3.org/2001/XMLSchema-instance">
   <control>
      <originator_id>333388889</originator_id>
      <date>20030701</date>
      <time>2330</time>
   </control>
   <accounts>
      <account include="y">
         <routing_id>0320000059</routing_id>
         <account_id>29384374389</account_id>
      </account>
      <account include="y">
         <routing_id>0320000059</routing_id>
         <account_id>4545453989</account_id>
         <dollar_limit>100000.00</dollar_limit>
      </account>
      <account_range include="n">
         <routing_id>0320000059</routing_id>
         <account_start>393040000</account_start>
         <account_end>393049999</account_end>
      </account>
   </accounts>
   <endpoints>
      <endpoint id="333388889">
         <cutoff_times>
            <cutoff day="mon" time="23:30:00"/>
            <cutoff day="tue" time="23:30:00"/>
            <cutoff day="wed" time="23:30:00"/>
            <cutoff day="thu" time="23:30:00"/>
            <cutoff day="fri" time="22:30:00"/>
            <cutoff day="sat" time="16:30:00"/>
            <cutoff day="sun" time="16:30:00"/>
         </cutoff_times>
         <routing_ids>
            <routing_id>0320000059<routing_id>
            <routing_id>0320000062<routing_id>
            <routing_id>0320000023<routing_id>
         </routing_ids>
      <endpoint>
   </endpoints>
</latf>
```

As discussed above, the central facility 225 has a DTA 210, or several DTAs that receive control information via transmittal messages regarding all ECP and LAT files that are transmitted through the private network. This information may also be made available to participating banks using a monitor and control system 720, such as the well-known CHECCS/Checkview system, which is a separate system to which the DTA 210 at the central facility 225 is connected. The monitor and control system includes a Checkview web server 720 that is connected to a public network, e.g., the Internet 725, through a router 705 and configured to distribute information to the participating banks, as well as ECP and image exchange information. The server 720 is accessed in a secure manner by the participating banks using a computer 730 connected to the Internet 725 through a router 705 and equipped with an Internet browser (Checkview web client).

The monitor and control system 720 interfaces with the DTAs via a messaging layer that is configurable to allow member banks, at the discretion of the central facility 225, to configure, monitor, and control the DTAs at each respective member bank. To users of the system, the DTA 210 functions as a "black box," as there is no direct user interface with the DTA 210 in the preferred embodiment, although such an interface could be provided. Rather, there is an indirect user interface through the monitor and control system 720.

The above electronic systems can be readily modified for electronic payment clearing. In this instance, rather than generating an ECP data file via a check processing computer, an electronic payment (EP) data file is instead generated by a payment processing computer, which is then communicated as a payload, with a transmittal, from a sending bank to one or more receiving banks via their respective DTAs and the network. As will be appreciated by those skilled in the art, certain parts of the above-described ECP system are not needed in a dedicated EP system. Alternatively, EP and ECP may be combined in a single system.

As used herein, the term "EP data" or "electronic payment data" refers to any form of data representing an electronic payment, including but not limited to one initiated by check, initiated by credit or debit payment card, initiated electronically, initiated by computer, initiated by telephone or other verbal authorization, initiated by written payment order or initiated by other means.

The systems of the present invention may provide fast and efficient transfer of EP, ECP, and other financial or non-financial data between depositary, collecting and paying banks or other entities, in an environment that maintains centralized accountability and control to ensure the integrity of the payment and/or check collection processes. In addition, transportation savings may be significant due to the high volume of transit items, for example, checks and check letters, that no longer need to be sent between banks. Additional transportation savings may be realized as the number of participating banks increases.

Moreover, an ECP system with image exchange may result in significant reduction of float due to the acceleration of posting by the paying bank. For example, by eliminating the need to deliver checks to the paying bank before a designated deadline for presentment, the volume of checks that can be included in ECP transmissions for accelerated posting may increase. In addition, the paying bank may realize a reduction in the cost of funds. There may be some improvement in clearing times for collecting banks as well. For example, two day availability items may receive next day availability, and items that are captured too late to meet dispatch deadlines may be dispatched electronically the same evening. Also, fraud reduction may be achieved due to expedited forward and return presentment.

As discussed above, electronic payments are similar to check image exchange, in that there is a need to exchange data in addition to the transaction record itself. Whereas the check image provides additional information to support the clearing of checks, certain electronic payments convey additional supporting data, such as addenda records associated with ACH transactions, details associated with commercial transactions such as invoice or purchase order references, images of electronic versions of trade documents, and proof of authorization such as signature images or cryptographically secured digital signatures. The system of the present invention conveys electronic payments with their supporting data efficiently and reliably. Thus, benefits and efficiencies similar to those described above for ECP and image exchange may also be achieved for electronic payment processing. In particular, the system of the present invention supports the clearing and exchange of multiple types of payments, eliminating the complexity and expense of maintaining separate, dedicated payment systems. Because such a system does not require centralized processing of transaction files, it can accommodate multiple different types of payment files without requiring significant reprogramming or changes in the basic process.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A method comprising the steps of:

communicating a payload containing a data file and a transmittal containing control information corresponding to the payload, from a first entity to a first distributed traffic agent (DTA) communicatively connected to the first entity;

through a network, communicating the transmittal from the first DTA to a central DTA communicatively connected to a central entity; and through the network, communicating the payload from the first DTA to a second DTA communicatively connected to a second entity, wherein in response to the first DTA receiving the payload from the first entity, the first DTA automatically converts the payload according to a first network protocol, wherein in response to the second DTA receiving the payload from the first DTA, the second DTA automatically converts the payload according to a second network protocol that is distinct from the first network protocol, and wherein at least one of the DTAs comprises a server computer.

2. A method according to claim 1, further comprising the step of communicating the payload from the second DTA to the second entity.

3. A method according to claim 1, further comprising the step of communicating the transmittal from the first DTA to the second DTA through the network.

4. A method according to claim 3, further comprising the step of communicating the transmittal from the second DTA to the second entity.

5. A method according to claim 1, further comprising the step of communicating the transmittal from the central DTA to the central entity.

6. A method according to claim 1, wherein the data file comprises electronic check presentment data or electronic payment data.

7. The method of claim 1, further comprising assigning a priority to the data file.

8. The method of claim 7, wherein at least one of the first DTA and the second DTA assigns the priority based on at least one of a bank deadline, a size of at least one data file, a type of at least one data file, a value of at least one data file, and a communication capacity.

9. The method of claim 7, further comprising determining the control information based on the data file.

10. The method of claim 7, further comprising the central facility reconciling the control information with the data file.

11. The method of claim 1, wherein the data file includes a cash letter.

12. The method of claim 1, wherein the data file includes a cash letter and check image data.

13. The method of claim 1, wherein at least one of the first and second DTAs comprises:

an input module and an output module configured to communicate the payload;

a network address module configured to obtain a network address of at least one of the first and second entities; and a network interface module configured to convert the data file.

14. The method of claim 1, further comprising generating at least one of a receipt acknowledgment and a reconcilement discrepancy advice.

15. The method of claim 1, further comprising maintaining a log for data files, in at least one of the first and second DTAs.

16. The method of claim 15, wherein the log includes at least one of a bank address, file priority, or a file delivery time.

17. The method of claim 15, wherein the log includes control totals for a value of items in at least one of the data files, and a number of the items.

18. The method of claim 13, further comprising obtaining a routing number based on the network address.

19. The method of claim 1, wherein the first network protocol is in accordance with a protocol of the first entity.

20. The method of claim 1, wherein the data file includes a cash letter without check image data.

* * * * *